United States Patent
Madison et al.

(10) Patent No.: US 11,391,834 B2
(45) Date of Patent: Jul. 19, 2022

(54) METHOD AND DEVICE FOR INTERFEROMETRIC RANGE MEASUREMENTS

(71) Applicant: Illusense, Inc., Vancouver (CA)

(72) Inventors: Kirk W. Madison, Vancouver (CA); Kyzyl Herzog, Vancouver (CA)

(73) Assignee: ILLUSENSE, INC., Vancouver (CA)

( * ) Notice: Subject to any disclaimer, the term of this patent is extended or adjusted under 35 U.S.C. 154(b) by 813 days.

(21) Appl. No.: 16/288,951

(22) Filed: Feb. 28, 2019

(65) Prior Publication Data

US 2019/0265351 A1 Aug. 29, 2019

Related U.S. Application Data

(60) Provisional application No. 62/721,344, filed on Aug. 22, 2018, provisional application No. 62/636,422, filed on Feb. 28, 2018.

(51) Int. Cl.
*G01S 7/285* (2006.01)
*G01S 17/10* (2020.01)
(Continued)

(52) U.S. Cl.
CPC .......... *G01S 13/865* (2013.01); *G01S 7/285* (2013.01); *G01S 7/4917* (2013.01); *G01S 13/10* (2013.01);
(Continued)

(58) Field of Classification Search
CPC ........ G01S 7/285; G01S 7/4917; G01S 13/10; G01S 17/32; G01S 13/288
See application file for complete search history.

(56) References Cited

U.S. PATENT DOCUMENTS

| 5,535,004 | A | 7/1996 | Johnston et al. |
| 7,734,194 | B2 * | 6/2010 | Yonenaga .......... H04B 10/5055 398/208 |

(Continued)

FOREIGN PATENT DOCUMENTS

| EP | 2766745 B1 | 8/2016 |
| JP | 2005045721 A | 2/2005 |

OTHER PUBLICATIONS

International Search Report and Written Opinion for International Application No. PCT/IB2019/000193 dated Jun. 25, 2019.

*Primary Examiner* — Erin F Heard
*Assistant Examiner* — Taher Al Sharabati
(74) *Attorney, Agent, or Firm* — Alexander Akhiezer; Erik A. Huestis; Foley Hoag LLP

(57) ABSTRACT

Apparatus for determining a range to one or more targets are provided. In various embodiments, the apparatus comprises a field transceiver module and a computing node in communication with each other. The field transceiver module is configured to generate an electromagnetic probe carrier field; under the control of the computing node, phase-modulate the carrier probe field according to a time-periodic probe modulation waveform having a probe modulation phase that includes a probe modulation frequency and a probe modulation phase offset, thereby generating a modulated probe field; direct the modulated probe field at one or more targets and to receive a modulated reflected probe field from one or more targets; demodulate the modulated reflected probe field and generate a probe signal corresponding to the probe modulation waveform. The computing node is configured to generate a control signal corresponding to the probe modulation waveform; receive the probe signal from the field transceiver module; compute a product of the probe signal and a time periodic reference waveform having a reference phase that includes a reference frequency and a (Continued)

reference phase offset; compute an amplitude or a power of the product; determine one or more reference waveforms corresponding to extrema of the amplitude or the power of the product; and determine the range to the one or more targets based on the extrema of the amplitude or the power of the product.

16 Claims, 33 Drawing Sheets

(51) Int. Cl.
*G01S 13/10* (2006.01)
*G01S 17/32* (2020.01)
*G01S 13/86* (2006.01)
*G01S 7/4912* (2020.01)
*G01S 13/28* (2006.01)

(52) U.S. Cl.
CPC .............. *G01S 17/10* (2013.01); *G01S 17/32* (2013.01); *G01S 13/288* (2013.01)

(56) References Cited

U.S. PATENT DOCUMENTS

| | | | |
|---|---|---|---|
| 7,738,115 B2* | 6/2010 | Ocelic | G11B 7/005 356/501 |
| 8,289,523 B2* | 10/2012 | Le Floch | G01B 9/02003 356/486 |
| 9,923,631 B1 | 3/2018 | Moilanen et al. | |
| 2002/0154372 A1 | 10/2002 | Chung et al. | |
| 2016/0320298 A1 | 11/2016 | Li et al. | |

* cited by examiner

METHOD AND DEVICE FOR INTERFEROMETRIC RANGE MEASUREMENTS

CROSS-REFERENCE TO RELATED APPLICATIONS

This application claims the benefit of U.S. Provisional Application Nos. 62/636,422, filed Feb. 28, 2018, and 62/721,344, filed Aug. 22, 2018, which are hereby incorporated by reference in their entirety.

BACKGROUND

Light and radio detection and ranging (LIDAR/RADAR) are technologies that can be used to measure distances to remote targets. Typically, a LIDAR/RADAR system includes a light source and a detector. The light source or radio wave can be, for example, a laser or an oscillator which emits an electro-magnetic wave (e.g., light) having a particular operating wavelength or a range thereof. A LIDAR/RADAR may operate, for example, in the millimeter wave, microwave, infrared, visible, or ultraviolet portions of the electromagnetic spectrum. The light or radio-wave source emits an electromagnetic wave (field) toward a target, which then scatters (reflects) the field. Some of the scattered (reflected) field is received by the detector. The system determines the distance to (the range of) the target based on one or more characteristics associated with the field received by the detector. For example, the system may determine the distance to the target based on the time of flight of a reflected field pulse.

There remains a need in the art for achieving high acquisition rates and low range uncertainties characteristic of phase based range measurements with a high modulation frequency over a larger dynamic range in input signal levels than is tolerable by phase based detection schemes.

BRIEF SUMMARY

According to embodiments of the present disclosure, apparatus for determining a range to one or more targets are provided. The apparatus comprises a field transceiver module and a computing node in communication with each other. The field transceiver module is configured to generate an electromagnetic probe carrier field; under the control of the computing node, phase-modulate the carrier probe field according to a time-periodic probe modulation waveform having a probe modulation phase that includes a probe modulation frequency and a probe modulation phase offset, thereby generating a modulated probe field; direct the modulated probe field at one or more targets and to receive a modulated reflected probe field from one or more targets; demodulate the modulated reflected probe field and generate a probe signal corresponding to the probe modulation waveform. The computing node is configured to generate a control signal corresponding to the probe modulation waveform; receive the probe signal from the field transceiver module; compute a product of the probe signal and one or more time periodic reference waveform, each having a reference phase that includes a reference frequency and a reference phase offset; compute an amplitude or a power of the product; determine one or more reference waveforms corresponding to extrema of the amplitude or the power of the product; and determine the range to the one or more targets based on the extrema of the amplitude or the power of the product.

In some embodiments, the field transceiver module includes: an electromagnetic carrier field source, configured to generate the source carrier field; and an interferometer. The interferometer comprises: a probe arm having a probe detector; a reference arm having a reference detector; a carrier field phase modulator under the control of the processing unit. The interferometer is configured to: receive the source carrier field and divide the source carrier field into a carrier probe field and a carrier reference field, phase-modulate the carrier probe field according to the probe modulation time-periodic waveform and to generate the modulated probe field, direct the modulated probe field to the one or more targets and to receive a modulated reflected probe field from the one or more targets, direct the modulated reflected probe field to the probe detector and the carrier reference field to the reference detector, thereby generating a modulated reflected probe signal and a carrier reference signal. The field transceiver module further comprises a demodulator module, configured to: receive the modulated reflected probe signal and the carrier reference signal, demodulate the modulated reflected probe signal, and generate a modulated carrier signal corresponding to the probe modulation waveform.

In some embodiments, the carrier field phase modulator comprises an electro-optical modulator. In some embodiments, the probe modulation waveform and the reference waveform are sinusoidal. In some embodiments, the carrier field source comprises a laser. In some embodiments, the carrier field source comprises a light-emitting diode.

In some embodiments, the probe modulation frequency is substantially equal to the reference frequency, and the probe modulation phase offset and the reference phase offset constant and substantially equal to each other, the apparatus being further configured to vary the probe modulation frequency and the reference frequency over time, and wherein the computing node is configured to determine the probe modulation frequency and the reference frequency corresponding to the extrema of the amplitude or the power of the product signal.

In some embodiments, the computing node is further configured to determine two successive extrema of the amplitude or the power of the product signal, and to determine the probe modulation frequencies and the reference frequencies corresponding to said extrema.

In some embodiments, the probe modulation frequency and the reference frequency are substantially constant and substantially equal to each other, the apparatus being further configured to vary over time the difference between the probe modulation phase offset and the reference phase offset, and wherein the computing node is configured to determine the difference between the probe modulation phase offset and the reference phase offset corresponding to the extrema of the amplitude or the power of the product signal.

In some embodiments, the computing node is further configured to change the probe modulation frequency and the reference frequency, and to determine two extrema of the amplitude or the power of the product signal, and to determine the probe modulation frequency and the reference frequency corresponding to said extrema.

In some embodiments, the apparatus is configured to vary over time the difference between the probe modulation phase and the reference phase, and wherein the computing node is configured to determine the difference between the probe modulation phase and the reference phase corresponding to the extrema of the amplitude or the power of the product signal.

In some embodiments, the computing node is further configured to change the probe modulation frequency or the reference frequency, to determine two extrema of the amplitude or the power of the product signal, and to determine the probe modulation frequency or the reference frequency corresponding to said extrema.

In some embodiments, the computing node is further configured to measure an oscillation frequency of a periodic waveform corresponding to the amplitude or the power of the product signal at its extrema, and to determine a Doppler shift of the reflected modulated probe field based on said oscillation frequency.

In some embodiments, the computing node is further configured to add to the reference phase a DC offset, and to measure a phase change of the periodic waveform corresponding to the amplitude or the power of the product signal at its extrema, and to determine the velocity of the one or more targets based on the oscillation frequency and the phase change of the periodic waveform corresponding to the amplitude or the power of product signal.

In some embodiments, the computing node is further configured to apply a fast Fourier transform to the probe signal, thereby extracting amplitudes and phases of a frequency component of the probe modulation waveform, and wherein the one or more reference waveforms is determined based on said amplitudes and phases.

According to embodiments of the present disclosure, methods of and computer program products for determining a range to one or more targets are provided. An electromagnetic carrier probe field is generated. A control signal is generated corresponding to a time-periodic probe modulation waveform having a probe modulation phase that includes a probe modulation frequency and a probe modulation phase offset, thereby generating a modulated probe field. The carrier probe field is phase-modulated according to the probe modulation waveform. The modulated probe field is directed at one or more targets and receiving a modulated reflected probe field from one or more targets. The modulated reflected probe field is modulated and generating a probe signal corresponding to the probe modulation waveform. The probe signal is received. A product is computed of the probe signal and one or more time periodic reference waveform, each having a reference phase that includes a reference frequency and a reference phase offset. An amplitude or a power of the product is computed. One or more reference waveforms is determined corresponding to extrema of the amplitude or the power of the product. The range to the one or more targets is determined based on the extrema of the amplitude or the power of the product.

In some embodiments, the method further comprises: receiving a source carrier field and dividing the source carrier field into a carrier probe field and a carrier reference field, phase-modulating the carrier probe field according to the probe modulation time-periodic waveform and generating the modulated probe field, directing the modulated probe field to the one or more targets and receiving a modulated reflected probe field from the one or more targets, directing the modulated reflected probe field to the probe detector and the carrier reference field to the reference detector, thereby generating a modulated reflected probe signal and a carrier reference signal; receiving the modulated reflected probe signal and the carrier reference signal, demodulating the modulated reflected probe signal, and generating a modulated carrier signal corresponding to the probe modulation waveform.

In some embodiments, the probe modulation frequency is substantially equal to the reference frequency, and the probe modulation phase offset and the reference phase offset constant and substantially equal to each other. In some such embodiments, the method further comprises varying the probe modulation frequency and the reference frequency over time determining the probe modulation frequency and the reference frequency corresponding to the extrema of the amplitude or the power of the product signal.

In some embodiments, the method further comprises determining two successive extrema of the amplitude or the power of the product signal, and determining the probe modulation frequencies and the reference frequencies corresponding to said extrema.

In some embodiments, the probe modulation frequency and the reference frequency are substantially constant and substantially equal to each other. In some such embodiments, the method further comprises varying over time the difference between the probe modulation phase offset and the reference phase offset, and determining the difference between the probe modulation phase offset and the reference phase offset corresponding to the extrema of the amplitude or the power of the product signal.

In some embodiments, the method further comprises changing the probe modulation frequency and the reference frequency, and determining two extrema of the amplitude or the power of the product signal, and determining the probe modulation frequency and the reference frequency corresponding to said extrema.

In some embodiments, the method further comprises varying over time the difference between the probe modulation phase and the reference phase, and determining the difference between the probe modulation phase and the reference phase corresponding to the extrema of the amplitude or the power of the product signal.

In some embodiments, the method further comprises changing the probe modulation frequency or the reference frequency, to determine two extrema of the amplitude or the power of the product signal, and determining the probe modulation frequency or the reference frequency corresponding to said extrema.

In some embodiments, the method further comprises measuring an oscillation frequency of a periodic waveform corresponding to the amplitude or the power of the product signal at its extrema, and determining a Doppler shift of the reflected modulated probe field based on said oscillation frequency.

In some embodiments, the method further comprises adding to the reference phase a DC offset, and measuring a phase change of the periodic waveform corresponding to the amplitude or the power of the product signal at its extrema, and determining the velocity of the one or more targets based on the oscillation frequency and the phase change of the periodic waveform corresponding to the amplitude or the power of product signal.

In some embodiments, the method further comprises applying a fast Fourier transform to the probe signal, thereby extracting amplitudes and phases of a frequency component of the probe modulation waveform, and wherein the one or more reference waveforms is determined based on said amplitudes and phases.

According to embodiments of the present disclosure, apparatus for determining a range of one or more targets are provided. The apparatus comprises an electromagnetic field source, the field source configured to generate a source field; an interferometer, comprising a probe arm, a reference arm, and a detector. The interferometer is configured to: receive the source field and divide the source field into a probe field, having a probe phase, and a reference field, having a reference phase, direct the probe field to the one or more targets and to receive a reflected probe field from the one or more targets, and direct the reflected probe field and the reference field to the detector. The interferometer further comprises a probe phase modulator, configured to modulate the probe phase, and a reference phase modulator, configured to modulate the reference phase. The detector is configured to detect the reflected probe field and the reference field and to generate a detector signal corresponding to a product of the reflected probe field and the reference field, the detector signal having a DC component and an AC component. A power meter is configured to measure the AC component. A computing node is in communication with the probe phase modulator, the reference phase modulator, and the power meter. The computing node is configured to: cause the probe phase modulator to modulate the probe phase according to a probe time-periodic waveform having a probe modulation phase that includes a probe modulation frequency and a probe modulation phase offset; cause the reference phase modulator to modulate the reference phase according to a reference time-periodic waveform having a reference modulation phase that includes a reference modulation frequency and a reference modulation phase offset; generate a representation of the power of the AC component corresponding to the one or more time-periodic waveforms; determine a difference between the probe modulation phase and the reference modulation phase corresponding to the extrema of the representation of the power of the AC component; and determine the range to the one or more targets based on the extrema of the power of the AC component.

In some embodiments, at least one of the probe phase modulator or the reference phase modulator comprises an electro-optical modulator.

In some embodiments, the probe time-periodic waveform and the reference time-periodic waveform are sinusoidal.

In some embodiments, the probe phase modulator and the reference phase modulator, each comprises a moveable mirror.

In some embodiments, the electromagnetic field source comprises a laser.

In some embodiments, the electromagnetic field source comprises a light-emitting diode.

In some embodiments, the probe phase modulator and the reference phase modulators are configured to have the probe modulation frequency substantially equal to the reference modulation frequency, and the probe phase offset and the reference phase offset constant and substantially equal to each other, and are further configured to vary the probe modulation frequency and the reference modulation frequency over time, and wherein the computing node is configured to determine the probe modulation frequency and the reference modulation frequency corresponding to extrema of the representation of the power of the AC component.

In some embodiments, the computing node is further configured to determine two successive extrema of the representation of the power of the AC component, and to determine the probe modulation frequencies and the reference modulation frequencies corresponding to said extrema.

In some embodiments, the probe phase modulator and the reference phase modulators are configured to have the probe modulation frequency and the reference modulation frequency substantially constant and substantially equal to each other, and to vary over time the difference between the probe phase offset and the reference phase offset, and wherein the computing node is configured to determine the difference between the probe phase offset and the reference phase offset corresponding to extrema of the representation of the power of the AC component.

In some embodiments, the computing node is further configured to change the probe and the reference modulation frequencies, and to determine two extrema of the representation of the power of the AC component, and to determine the probe modulation frequency and the reference modulation frequency corresponding to said extrema.

In some embodiments, the probe phase modulator and the reference phase modulators are configured to vary over time the phase difference between the probe modulation phase and the reference modulation phase, and wherein the computing node is configured to determine the difference between the probe modulation phase and the reference modulation phase corresponding to extrema of the representation of the power of the AC component.

In some embodiments, the computing node is further configured to change the probe modulation frequency or the reference modulation frequency, to determine two extrema of the representation of the power of the AC component, and to determine the probe modulation frequency or the reference modulation frequency corresponding to said extrema.

In some embodiments, the source electromagnetic field is in a radio frequency (RF) band.

In some embodiments, the computing node is further configured to measure an oscillation frequency of a periodic waveform corresponding to the power of the AC component at the extrema of the representation of said power, and to determine a Doppler shift of the probe field based on said oscillation frequency.

In some embodiments, the computing node is further configured to cause the reference phase modulator to add to the reference phase a DC offset, and to measure a phase change of the periodic waveform corresponding to the power of the AC component at the extrema of the representation of said power, and to determine the velocity of the one or more targets based on the oscillation frequency and the phase change of the periodic waveform corresponding to the power of the AC component.

According to embodiments of the present disclosure, methods of and computer program products for determining a range of one or more targets are provided. In some such embodiments, the method comprises: generating a source electromagnetic field; dividing said source field into a probe field, having a probe phase, and a reference field, having a reference phase; modulating the probe phase according to a probe time-periodic waveform having a probe modulation phase that includes a probe modulation frequency and a probe modulation phase offset; modulating the reference phase according to a reference time-periodic waveform having a reference modulation phase that includes a reference modulation frequency and a reference modulation phase offset; directing the probe field to the one or more targets; receiving a reflected probe field from the one or more targets; detecting the reflected probe field and the reference field and generating a detector signal corresponding to a product of the reflected probe field and the reference field, the detector signal having a DC component and an AC component; generating a representation of a power of the AC component corresponding to the probe time-periodic waveform and the reference time-periodic waveform; determining a difference between the probe modulation phase and the reference modulation phase corresponding to extrema of the representation of the power of the AC component; and determining the range to the one or more targets, based on the extrema of the power of the AC component.

In some embodiments, modulating the probe phase and the reference phase includes keeping the probe and the reference modulation frequencies substantially equal to each other, while varying said modulation frequencies over time, and wherein determining the modulation phase corresponding to extrema of the representation of the power of the AC component includes determining the probe and the reference modulation frequencies.

In some embodiments, the method further comprises determining two successive extrema of the representation of the power of the AC component, and determining the probe and the reference modulation frequencies corresponding to said extrema.

In some embodiments, modulating the probe phase and the reference phase includes keeping the probe and the reference modulation frequencies constant and substantially equal to each other, while varying the difference between the probe phase offset and the reference phase offset over time, and wherein determining the modulation phase corresponding to extrema of the representation of the power of the AC component includes determining the difference between the probe phase offset and the reference phase offset corresponding to extrema of the representation of the power of the AC component.

In some embodiments, the method further comprises changing the probe and the reference modulation frequencies, determining two extrema of the representation of the power of the AC component, and determining the probe modulation frequency and the reference modulation frequency corresponding to said extrema.

In some embodiments, modulating the probe phase and the reference phase includes varying over time the phase difference between the probe modulation phase and the reference modulation phase, and wherein determining the modulation phase corresponding to extrema of the representation of the power of the AC component includes determining the difference between the probe modulation phase and the reference modulation phase corresponding to extrema of the representation of the power of the AC component.

In some embodiments, the method further comprises changing the probe modulation frequency or the reference modulation frequency, determining two extrema of the representation of the power of the AC component, and determining the probe modulation frequency or the reference modulation frequency corresponding to said extrema.

In some embodiments, the source electromagnetic field is in a radio frequency (RF) band.

In some embodiments, the method further comprises measuring an oscillation frequency of a periodic waveform corresponding to the power of the AC component at the extrema of the representation of said power, and determining a Doppler shift of the probe field based in said oscillation frequency.

In some embodiments, the method further comprises adding to the reference phase a DC offset; measuring a phase change of the periodic waveform corresponding to the power of the AC component at the extrema of the representation of said power; and determining the velocity of the one or more targets based on the oscillation frequency and the phase change of the periodic waveform corresponding to the power of the AC component.

According to embodiments of the present disclosure, apparatus for determining a range of one or more targets are provided. The apparatus comprises: an electromagnetic field source, the field source configured to generate a source field; an interferometer, comprising a probe arm and a reference arm. The interferometer is configured to: receive the source field and divide the source field into a probe field, having a probe phase, and a reference field, having a reference phase, direct the probe field to the one or more targets and to receive a reflected probe field from the one or more targets, and combine the reflected probe field and the reference field into a combined field corresponding to a sum of the reflected probe field and the reference field. The interferometer further includes: a probe phase modulator, configured to modulate the probe phase; a reference phase modulator, configured to modulate the reference phase. The apparatus further comprises: a detector, configured to detect the combined field and to generate current having a DC component and an AC component. A power meter is configured to measure the AC component. A computing node is in communication with the probe phase modulator, the reference phase modulator, and the power meter. The computing node is configured to: cause the probe phase modulator to modulate the probe phase according to a probe time-periodic waveform having a probe modulation phase that includes a probe modulation frequency and a probe modulation phase offset; cause the reference phase modulator to modulate the reference phase according to a reference time-periodic waveform having a reference modulation phase that includes a probe modulation frequency and a probe modulation phase offset; generate a representation of the power of the AC component corresponding to the time-periodic waveforms; determine a difference between the probe modulation phase and the reference modulation phase corresponding to the extrema of the representation of the power of the AC component; and determine the range to the one or more targets based on the extrema of the power of the AC component.

In some embodiments, the probe phase modulator and the reference phase modulators are configured to have the probe modulation frequency substantially equal to the reference modulation frequency, and the probe phase offset and the reference phase offset constant and substantially equal to each other, and are further configured to vary the probe modulation frequency and the reference modulation frequency over time, and wherein the computing node is configured to determine the probe modulation frequency and the reference modulation frequency corresponding to extrema of the representation of the power of the AC component.

In some embodiments, the computing node is further configured to determine two successive extrema of the representation of the power of the AC component, and to determine the probe modulation frequencies and the reference modulation frequencies corresponding to said extrema.

In some embodiments, the probe phase modulator and the reference phase modulators are configured to have the probe modulation frequency and the reference modulation frequency substantially constant and substantially equal to each other, and to vary over time the difference between the probe phase offset and the reference phase offset, and wherein the computing node is configured to determine the difference between the probe phase offset and the reference phase offset corresponding to extrema of the representation of the power of the AC component.

In some embodiments, the computing node is further configured to change the probe and the reference modulation frequencies, and to determine two extrema of the representation of the power of the AC component, and to determine the probe modulation frequency and the reference modulation frequency corresponding to said extrema.

In some embodiments, the probe phase modulator and the reference phase modulators are configured to vary over time the phase difference between the probe modulation phase and the reference modulation phase, and wherein the computing node is configured to determine the difference between the probe modulation phase and the reference modulation phase corresponding to extrema of the representation of the power of the AC component.

In some embodiments, the computing node is further configured to change the probe modulation frequency or the reference modulation frequency, to determine two extrema of the representation of the power of the AC component, and to determine the probe modulation frequency or the reference modulation frequency corresponding to said extrema.

In some embodiments, the computing node is further configured to measure an oscillation frequency of a periodic waveform corresponding to the power of the AC component at the extrema of the representation of said power, and to determine a Doppler shift of the probe field based on said oscillation frequency.

In some embodiments, the computing node being further configured to cause the reference phase modulator to add to the reference phase a DC offset, and to measure a phase change of the periodic waveform corresponding to the power of the AC component at the extrema of the representation of said power, and to determine the velocity of the one or more targets based on the oscillation frequency and the phase change of the periodic waveform corresponding to the power of the AC component.

In some embodiments, the detector comprises an array of detector elements, the array having a characteristic size that is greater than a coherence area of the reflected probe field, each detector element having a characteristic size that is smaller than the coherence area of the reflected probe field, each detector element configured to generate a detector element current, the apparatus further including a channel adder adapted to add the detector element currents and to generate the current corresponding to the sum of the detector element currents.

In some embodiments, at least one of the probe phase modulator or the reference phase modulator comprises an electro-optical modulator.

In some embodiments, the probe time-periodic waveform and the reference time-periodic waveform are sinusoidal.

In some embodiments, the probe phase modulator and the reference phase modulator, each comprises a moveable mirror.

In some embodiments, the electromagnetic field source comprises a laser.

In some embodiments, the electromagnetic field source comprises a light-emitting diode.

According to embodiments of the present disclosure, methods of and computer program products for determining a range of one or more targets are provided. The method comprises: generating a source electromagnetic field; dividing said source field into a probe field, having a probe phase, and a reference field, having a reference phase; modulating the probe phase according to a probe time-periodic waveform having a probe modulation phase that includes a probe modulation frequency and a probe modulation phase offset; modulating the reference phase according to a reference time-periodic waveform having a reference modulation phase that includes a reference modulation frequency and a reference modulation phase offset; directing the probe field to the one or more targets; receiving a reflected probe field from the one or more targets; combining the reflected probe field and the reference field into a combined field corresponding to a sum of the reflected probe field and the reference field; generating current corresponding to the combined field, the current having a DC component and an AC component; generating a representation of a power of the AC component corresponding to the probe time-periodic waveform and the reference time-periodic waveform; determining a difference between the probe modulation phase and the reference modulation phase corresponding to extrema of the representation of the power of the AC component; and determine the range to the one or more targets, based on the extrema of the power of the AC component.

In some embodiments, modulating the probe phase and the reference phase includes keeping the probe and the reference modulation frequencies substantially equal to each other, while varying said modulation frequencies over time, and wherein determining the modulation phase corresponding to extrema of the representation of the power of the AC component includes determining the probe and the reference modulation frequencies.

In some embodiments, the method further comprises determining two successive extrema of the representation of the power of the AC component, and determining the probe and the reference modulation frequencies corresponding to said extrema.

In some embodiments, modulating the probe phase and the reference phase includes keeping the probe and the reference modulation frequencies constant and substantially equal to each other, while varying the difference between the probe phase offset and the reference phase offset over time, and wherein determining the modulation phase corresponding to extrema of the representation of the power of the AC component includes determining the difference between the probe phase offset and the reference phase offset corresponding to extrema of the representation of the power of the AC component.

In some embodiments, the method further comprises including changing the probe and the reference modulation frequencies, determining two extrema of the representation of the power of the AC component, and determining the probe modulation frequency and the reference modulation frequency corresponding to said extrema.

In some embodiments, modulating the probe phase and the reference phase includes varying over time the phase difference between the probe modulation phase and the reference modulation phase, and wherein determining the modulation phase corresponding to extrema of the representation of the power of the AC component includes determining the difference between the probe modulation phase and the reference modulation phase corresponding to extrema of the representation of the power of the AC component.

In some embodiments, the method further comprises changing the probe modulation frequency or the reference modulation frequency, determining two extrema of the representation of the power of the AC component, and determining the probe modulation frequency or the reference modulation frequency corresponding to said extrema.

In some embodiments, the method further comprises measuring an oscillation frequency of a periodic waveform corresponding to the power of the AC component at the extrema of the representation of said power, and determining a Doppler shift of the probe field based in said oscillation frequency.

In some embodiments, the method further comprises adding to the reference phase a DC offset; measuring a phase change of the periodic waveform corresponding to the power of the AC component at the extrema of the representation of said power; and determining the velocity of the one or more targets based on the oscillation frequency and the phase change of the periodic waveform corresponding to the power of the AC component.

In some embodiments, generating the current corresponding to the combined field includes: directing the reflected probe field to an array of detector elements, the array having a characteristic size that is greater than a coherence area of the reflected probe field, each detector element having a characteristic size that is smaller than the coherence area of the reflected probe field, each detector element configured to generate a detector element current; and adding the detector element currents and generating the current corresponding to the sum of the detector element currents.

According to embodiments of the present disclosure, apparatus for determining a range of one or more targets are provided. The apparatus includes an electromagnetic field source, the field source configured to generate a source field, the source field having a source phase; a source phase modulator, configured to modulate the source phase; an interferometer, comprising a probe arm, a reference arm, and a detector. The interferometer is configured to: receive the source field and divide the source field into a probe field, and a reference field; direct the probe field to the one or more targets and to receive a reflected probe field from the one or more targets; and direct the reference field and the reflected probe field at the detector. The detector us configured to detect the reflected probe field and the reference field and to generate a detector signal corresponding to a product of the reflected probe field and the reference field, the detector signal having a DC component and an AC component. A power meter is configured to measure the AC component of the detector signal. A computing node is in communication with the source phase modulator and the power meter. The computing node is configured to: cause the source phase modulator to modulate the source phase according to a time-periodic waveform having a modulation phase that includes a modulation frequency and a modulation phase offset; generate a representation of the power of the AC component corresponding to the time-periodic waveform; determine the modulation phase corresponding to extrema of the representation of the power of the AC component; and determine the range to the one or more targets based on the extrema of the power of the AC component.

In some embodiments, the source phase modulator is configured to vary the modulation frequency over time, and wherein the computing node is configured to determine the modulation frequency corresponding to extrema of the representation of the power of the AC component.

In some embodiments, the computing node is further configured to determine two successive extrema of the representation of the power of the AC component, and to determine the modulation frequencies corresponding to said extrema.

In some embodiments, the source electromagnetic field is in a radio frequency (RF) band.

In some embodiments, the computing node is further configured to measure an oscillation frequency of a periodic waveform corresponding to the power of the AC component at the extrema of the representation of said power, and to determine a Doppler shift of the probe field based on said oscillation frequency.

In some embodiments, the computing node is further configured to cause the reference phase modulator to add to the reference phase a DC offset, and to measure a phase change of the periodic waveform corresponding to the power of the AC component at the extrema of the representation of said power, and to determine the velocity of the one or more targets based on the oscillation frequency and the phase change of the periodic waveform corresponding to the power of the AC component.

In some embodiments, the phase modulator comprises an electro-optical modulator.

In some embodiments, the time periodic waveform is sinusoidal.

In some embodiments, the phase modulator comprises a moveable mirror.

In some embodiments, the electromagnetic field source comprises a laser.

In some embodiments, the electromagnetic field source comprises a light-emitting diode.

According to embodiments of the present disclosure, apparatus for determining a range of one or more targets are provided. The apparatus comprises an electromagnetic field source, the field source configured to generate a source field, the source field having a source phase, the source is adapted to modulate the source phase; an interferometer, comprising a probe arm, a reference arm, and a detector. The interferometer is configured to: receive the source field and divide the source field into a probe field, having a probe phase, and a reference field, having a reference phase; direct the probe field to the one or more targets and to receive a reflected probe field from the one or more targets; and direct the reflected probe field and the reference field at the detector. The detector is configured to detect the reflected probe field and the reference field and to generate a detector signal corresponding to a product of the reflected probe field and the reference field, the detector signal having a DC component and an AC component. A power meter is configured to measure the AC component of the detector signal. A computing node is in communication with the electromagnetic field source and the power meter. The computing node configured to: cause the source to modulate the source phase according to a time-periodic waveform having a modulation phase that includes a modulation frequency and a modulation phase offset; generate a representation of the power of the AC component corresponding to the time-periodic waveform; determine the modulation phase corresponding to extrema of the representation of the power of the AC component; and determine the range to the one or more targets based on the extrema of the representation of the power of the AC component.

In some embodiments, the field source is configured to vary the modulation frequency over time, and wherein the computing node is configured to determine the modulation frequency corresponding to extrema of the representation of the power of the AC component.

In some embodiments, the computing node is further configured to determine two successive extrema of the representation of the power of the AC component, and to determine the modulation frequencies corresponding to said extrema.

In some embodiments, the source is adapted to modulate the source phase by varying a current to a light-emitting diode.

In some embodiments, the source electromagnetic field is in a radio frequency (RF) band.

In some embodiments, the computing node is further configured to measure an oscillation frequency of a periodic waveform corresponding to the power of the AC component at the extrema of the representation of said power, and to determine a Doppler shift of the probe field based on said oscillation frequency.

In some embodiments, the computing node being further configured to cause the reference phase modulator to add to the reference phase a DC offset, and to measure a phase change of the periodic waveform corresponding to the power of the AC component at the extrema of the representation of said power, and to determine the velocity of the one or more targets based on the oscillation frequency and the phase change of the periodic waveform corresponding to the power of the AC component.

In some embodiments, the time-periodic waveform is sinusoidal.

In some embodiments, the electromagnetic field source comprises a laser.

In some embodiments, the electromagnetic field source comprises a light-emitting diode.

According to embodiments of the present disclosure, methods of and computer program products for determining a range of one or more targets are provided. In some such embodiments, the method comprises: generating a electromagnetic source field, the source field having a source phase; dividing the source field into a probe field and a reference field; modulating the source phase according to a time-periodic waveform having a modulation phase that includes a modulation frequency and a modulation phase offset; directing the probe field to the one or more targets; receiving a reflected probe field from the one or more targets; detecting the reflected probe field and the reference field and generating a detector signal corresponding to a product of the reflected probe field and the reference field, the detector signal having a DC component and an AC component; generating a representation of a power of the AC component corresponding to the time-periodic waveform; determining the modulation phase corresponding to extrema of the representation of the power of the AC component; and determining the range to the one or more targets, based on the extrema of the power of the AC component.

In some embodiments, modulating the source phase includes varying the modulation frequency over time, and wherein determining the modulation phase corresponding to extrema of the representation of the power of the AC component includes determining the modulation frequency.

In some embodiments, the method further comprises determining two successive extrema of the representation of the power of the AC component, and determining the modulation frequencies corresponding to said extrema.

In some embodiments, the source electromagnetic field is in a radio frequency (RF) band.

In some embodiments, the method further includes measuring an oscillation frequency of a periodic waveform corresponding to the power of the AC component at the extrema of the representation of said power, and determining a Doppler shift of the probe field based in said oscillation frequency.

In some embodiments, the method further includes adding to the reference phase a DC offset; measuring a phase change of the periodic waveform corresponding to the power of the AC component at the extrema of the representation of said power; and determining the velocity of the one or more targets based on the oscillation frequency and the phase change of the periodic waveform corresponding to the power of the AC component.

According to embodiments of the present disclosure, apparatus for determining a range of one or more targets are provided. The apparatus comprises a radiofrequency (RF) electromagnetic probe field source, the probe field source configured to generate a probe field, the probe field having a probe field amplitude, the probe field source adapted to modulate the probe field amplitude; a radiofrequency (RF) electromagnetic reference field source, the reference field source configured to generate a reference field, the reference field having a reference field amplitude, the reference field source adapted to modulate the reference field amplitude; a probe detector; a reference detector; a combining module; a power meter; and a computing node in communication with the probe field source, the reference field source, and the power meter. The probe field source is configured to direct the probe field to the one or more targets, thereby generating a reflected probe field. The probe detector is configured to receive the reflected probe field from the one or more targets and to generate a probe detector signal corresponding to the reflected probe field. The reference field source is configured to direct the reference field to the reference detector. The reference detector is configured to detect the reference field and to generate a reference detector signal corresponding to the reference field. The combining module is configured to receive the probe detector signal and the reference detector signal and to generate a combined signal representing the difference between the probe detector signal power and the reference detector signal power, the combined signal having a DC component and an AC component. The power meter is configured receive the combined signal and to measure the AC component. The computing node is configured to: cause the probe field source to modulate the probe field amplitude according to a probe time-periodic waveform having a probe modulation phase that includes a probe modulation frequency and a probe modulation phase offset; cause the reference field source to modulate the reference field amplitude according to a reference time-periodic waveform having a reference modulation phase that includes a reference modulation frequency and a reference modulation phase offset; generate a representation of the power of the AC component corresponding to the time-periodic waveforms; determine a difference between the probe modulation phase and the reference modulation phase corresponding to the extrema of the representation of the power of the AC component; and determine the range to the one or more targets based on the extrema of the power of the AC component.

In some embodiments, the probe amplitude modulator and the reference amplitude modulators are configured to have the probe modulation frequency substantially equal to the reference modulation frequency, and the probe phase offset and the reference phase offset constant and substantially equal to each other, and are further configured to vary the probe modulation frequency and the reference modulation frequency over time, and wherein the computing node is configured to determine the probe modulation frequency and the reference modulation frequency corresponding to extrema of the representation of the power of the AC component.

In some embodiments, the computing node is further configured to determine two successive extrema of the representation of the power of the AC component, and to determine the probe modulation frequencies and the reference modulation frequencies corresponding to said extrema.

In some embodiments, the source is adapted to modulate the source phase by varying a current to a light-emitting diode.

In some embodiments, the probe amplitude modulator and the reference amplitude modulators are configured to have the probe modulation frequency and the reference modulation frequency constant and substantially equal to each other, and to vary over time the difference between the probe phase offset and the reference phase offset, and wherein the computing node is configured to determine the difference between the probe phase offset and the reference phase offset corresponding to extrema of the representation of the power of the AC component.

In some embodiments, the computing node is further configured to change the probe and the reference modulation frequencies, and to determine two extrema of the representation of the power of the AC component, and to determine the probe modulation frequency and the reference modulation frequency corresponding to said extrema.

In some embodiments, the probe amplitude modulator and the reference amplitude modulator are configured to vary over time the phase difference between the probe modulation phase and the reference modulation phase, and wherein the computing node is configured to determine the difference between the probe modulation phase and the reference modulation phase corresponding to extrema of the representation of the power of the AC component.

In some embodiments, the computing node is further configured to change the probe modulation frequency or the reference modulation frequency, to determine two extrema of the representation of the power of the AC component, and to determine the probe modulation frequency or the reference modulation frequency corresponding to said extrema.

In some embodiments, the probe time-periodic waveform and the reference time-periodic waveform are sinusoidal.

In some embodiments, the electromagnetic field source comprises a laser.

In some embodiments, the electromagnetic field source comprises a light-emitting diode.

According to embodiments of the present disclosure, methods of and computer program products for determining a range of one or more targets are provided. In some such embodiments, the method comprises: generating a radiofrequency (RF) electromagnetic probe field, the probe field having a probe field amplitude; generating a radiofrequency (RF) electromagnetic reference field, the reference field having a reference field amplitude; modulating the probe field amplitude according to a probe time-periodic waveform having a probe modulation phase that includes a probe modulation frequency and a probe modulation phase offset; modulating the reference field amplitude according to a reference time-periodic waveform having a reference modulation phase that includes a reference modulation frequency and a reference modulation phase offset; directing the probe field to the one or more targets, thereby generating a reflected probe field; detecting the reflected probe field and generating a probe detector signal corresponding to the reflected probe field; detecting the reference field and generating a reference detector signal corresponding to the reference field; generating a combined signal representing the difference between the probe detector signal power and the reference detector signal power, the combined signal having a DC component and an AC component; generating a representation of a power of the AC component corresponding to the probe time-periodic waveform and the reference time-periodic waveform; determining a difference between the probe modulation phase and the reference modulation phase corresponding to extrema of the representation of the power of the AC component; and determining the range to the one or more targets, based on the extrema of the power of the AC component.

In some embodiments, modulating the probe amplitude and the reference amplitude includes keeping the probe and the reference modulation frequencies substantially equal to each other, while varying said modulation frequencies over time, and wherein determining the probe modulation phase and the reference modulation phase corresponding to extrema of the representation of the power of the AC component includes determining the probe and the reference modulation frequencies.

In some embodiments, the method further comprises determining two successive extrema of the representation of the power of the AC component, and determining the probe and the reference modulation frequencies corresponding to said extrema.

In some embodiments, modulating the probe amplitude and the reference amplitude includes keeping the probe and the reference modulation frequencies constant and substantially equal to each other, while varying the difference between the probe phase offset and the reference phase offset over time, and wherein determining the probe modulation phase and the reference modulating phase corresponding to extrema of the representation of the power of the AC component includes determining the difference between the probe phase offset and the reference phase offset corresponding to extrema of the representation of the power of the AC component.

In some embodiments, the method further comprises changing the probe and the reference modulation frequencies, determining two extrema of the representation of the power of the AC component, and determining the probe modulation frequency and the reference modulation frequency corresponding to said extrema.

In some embodiments, modulating the probe amplitude and the reference amplitude includes varying over time the phase difference between the probe modulation phase and the reference modulation phase, and wherein determining the probe modulation phase and the reference modulation phase corresponding to extrema of the representation of the power of the AC component includes determining the difference between the probe modulation phase and the reference modulation phase corresponding to extrema of the representation of the power of the AC component.

In some embodiments, the method further comprises changing the probe modulation frequency or the reference modulation frequency, determining two extrema of the representation of the power of the AC component, and determining the probe modulation frequency or the reference modulation frequency corresponding to said extrema.

In some embodiments, the method further comprises measuring an oscillation frequency of a periodic waveform corresponding to the power of the AC component at the extrema of the representation of said power, and determining a Doppler shift of the probe field based in said oscillation frequency.

In some embodiments, the method further comprises adding to the reference phase a DC offset; measuring a phase change of the periodic waveform corresponding to the power of the AC component at the extrema of the representation of said power; and determining the velocity of the one or more targets based on the oscillation frequency and the phase change of the periodic waveform corresponding to the power of the AC component.

In some embodiments,

According to embodiments of the present disclosure, apparatus for determining a range of one or more targets are provided. The apparatus comprises: an optical electromagnetic field source, the field source configured to generate a source field, the source field having a source amplitude; a source amplitude modulator, configured to modulate the source amplitude; an interferometer, comprising a probe arm that includes a probe detector and a reference arm that includes a reference detector. The interferometer is configured to: receive the source field and divide the source field into a probe field, and a reference field; direct the probe field to the one or more targets and to receive a reflected probe field from the one or more targets; direct the reflected probe field to the probe detector, the probe detector being configured to generate a probe detector signal corresponding to the reflected probe field; direct the reference field to the reference detector, the reference detector being configured to generate a reference detector signal corresponding to the reference field. The interferometer further includes a combining module, configured to receive the probe detector signal and the reference detector signal and to generate a combined signal representing the difference between the probe detector signal power and the reference detector signal power, the combined signal having a DC component and an AC component. The apparatus further comprises: a power meter, configured to measure the AC component; and a computing node, in communication with the source phase modulator and the power meter. The computing node is configured to: cause the source amplitude modulator to modulate the source field amplitude according to a time-periodic waveform having a modulation phase that includes a modulation frequency and a modulation phase offset; generate a representation of the power of the AC component corresponding to the time-periodic waveform; determine the modulation phase corresponding to the extrema of the representation of the power of the AC component; and determine the range to the one or more targets based on the extrema of the power of the AC component.

In some embodiments, the source amplitude modulator is configured to vary the modulation frequency over time, and wherein the computing node is configured to determine the modulation frequency corresponding to extrema of the representation of the power of the AC component.

In some embodiments, the computing node is further configured to determine two successive extrema of the representation of the power of the AC component, and to determine the modulation frequencies corresponding to said extrema.

In some embodiments, the probe detector comprises an array of probe detector elements, the array having a characteristic size that is greater than a coherence area of the reflected probe field, each probe detector element having a characteristic size that is smaller than the coherence area of the reflected probe field, each probe detector element configured to generate a probe detector element current. The apparatus further includes a probe channel adder adapted to add the probe detector element currents and to generate the probe current corresponding to the sum of the probe detector element currents.

In some embodiments, the electromagnetic field source comprises a laser.

In some embodiments, the electromagnetic field source comprises a light-emitting diode.

According to embodiments of the present disclosure, apparatus for determining a range of one or more targets are provided. The apparatus comprises: an optical electromagnetic field source, the field source configured to generate a source field, the source field having a source amplitude, the source adapted to modulate the source amplitude; an interferometer, comprising a probe arm that includes a probe detector and a reference arm that includes a reference detector. The interferometer is configured to: receive the source field and divide the source field into a probe field, and a reference field; direct the probe field to the one or more targets and to receive a reflected probe field from the one or more targets; direct the reflected probe field to the probe detector, the probe detector being configured to generate a probe detector signal corresponding to the reflected probe field; direct the reference field to the reference detector, the reference detector being configured to generate a reference detector signal corresponding to the reference field. The interferometer further includes a combining module, configured to receive the probe detector signal and the reference detector signal and to generate a combined signal representing the difference between the probe detector signal power and the reference detector signal power, the combined signal having a DC component and an AC component. The apparatus further comprises a power meter, configured to measure the AC component; and a computing node, in communication with the field source and the power meter. The computing node is configured to: cause the field source to modulate the source field amplitude according to a probe time-periodic waveform having a modulation phase that includes a modulation frequency and a modulation phase offset; generate a representation of the power of the AC component corresponding to the time-periodic waveform; determine the modulation phase corresponding to the extrema of the representation of the power of the AC component; and determine the range to the one or more targets based on the extrema of the power of the AC component.

In some embodiments, the field source is configured to vary the modulation frequency over time, and wherein the computing node is configured to determine the modulation frequency corresponding to extrema of the representation of the power of the AC component.

In some embodiments, the computing node is further configured to determine two successive extrema of the representation of the power of the AC component, and to determine the modulation frequencies corresponding to said extrema.

In some embodiments, the source is adapted to modulate the source phase by varying a current to a light-emitting diode.

In some embodiments, the probe detector comprises an array of probe detector elements, the array having a characteristic size that is greater than a coherence area of the reflected probe field, each probe detector element having a characteristic size that is smaller than the coherence area of the reflected probe field, each probe detector element configured to generate a probe detector element current. The apparatus further includes a probe channel adder adapted to add the probe detector element currents and to generate the probe current corresponding to the sum of the probe detector element currents.

In some embodiments, the time-periodic waveform is sinusoidal.

In some embodiments, the electromagnetic field source comprises a laser.

In some embodiments, the electromagnetic field source comprises a light-emitting diode.

According to embodiments of the present disclosure, methods of and computer program products for determining a range of one or more targets are provided. In some such embodiments, the method comprises generating an optical electromagnetic source field, the source field having a source amplitude; modulating the source amplitude according to a time-periodic waveform having a source modulation phase that includes a modulation frequency and a modulation phase offset; dividing the source field into a probe field and a reference field; directing the probe field to the one or more targets; receiving a reflected probe field from the one or more targets; detecting the reflected probe field and generating a probe detector signal corresponding to the reflected probe field; detecting the reference field and generating a reference detector signal corresponding to the reference field; generating a combined signal representing the difference between the probe detector signal power and the reference detector signal power, the combined signal having a DC component and an AC component; generating a representation of a power of the AC component corresponding to the time-periodic waveform; determining the source modulation phase corresponding to extrema of the representation of the power of the AC component; and determining the range to the one or more targets, based on the extrema of the power of the AC component.

In some embodiments, modulating the source amplitude includes varying the modulation frequency over time, and wherein determining the modulation phase corresponding to extrema of the representation of the power of the AC component includes determining the modulation frequency.

In some embodiments, the method further comprises determining two successive extrema of the representation of the power of the AC component, and determining the modulation frequencies corresponding to said extrema.

In some embodiments, the method further comprises measuring an oscillation frequency of a periodic waveform corresponding to the power of the AC component at the extrema of the representation of said power, and determining a Doppler shift of the probe field based in said oscillation frequency.

In some embodiments, the method further comprises adding to the reference phase a DC offset; measuring a phase change of the periodic waveform corresponding to the power of the AC component at the extrema of the representation of said power; and determining the velocity of the one or more targets based on the oscillation frequency and the phase change of the periodic waveform corresponding to the power of the AC component.

In some embodiments, detecting the reflected probe field and generating the probe signal corresponding to the reflected probe field includes: directing the reflected probe field to an array of probe detector elements, the array having a characteristic size that is greater than a coherence area of the reflected probe field, each probe detector element having a characteristic size that is smaller than the coherence area of the reflected probe field, each probe detector element configured to generate a probe detector element current, adding the probe detector element currents and generating the probe current corresponding to the sum of the probe detector element currents.

According to embodiments of the present disclosure, apparatus for determining a range of one or more targets are provided. The apparatus comprises: an optical electromagnetic field source, the field source configured to generate a source field, the source field having a source amplitude; an interferometer, comprising a probe arm that includes a probe amplitude modulator and a probe detector, and a reference arm that includes a reference amplitude modulator and a reference detector. The interferometer is configured to: receive the source field and divide the source field into a probe field, having a probe amplitude, and a reference field, having a reference amplitude, direct the reference field to the reference modulator, the reference modulator configured to modulate the reference amplitude; direct the probe field to the probe modulator, the probe modulator adapted to modulate the probe amplitude; direct the probe field to the one or more targets and to receive a reflected probe field from the one or more targets, direct the reflected probe field to the probe detector, the probe detector being configured to generate a probe detector signal corresponding to the reflected probe field; direct the reference field to the reference detector, the reference detector being configured to generate a reference detector signal corresponding to the reference field. The interferometer further includes a combining module, configured to receive the probe detector signal and the reference detector signal and to generate a combined signal representing the difference between the probe detector signal power and the reference detector signal power, the combined signal having a DC component and an AC component. The apparatus further includes: a power meter, configured to measure the AC component; and a computing node, in communication with the probe amplitude modulator, the reference amplitude modulator, and the power meter. The computing node is configured to: cause the probe amplitude modulator to modulate the probe amplitude according to a probe time-periodic waveform having a probe modulation phase that includes a probe modulation frequency and a probe modulation phase offset; cause the reference amplitude modulator to modulate the reference amplitude according to a reference time-periodic waveform having a reference modulation phase that includes a reference modulation frequency and a reference modulation phase offset; generate a representation of a power of the AC component corresponding to the probe time-periodic waveform and the reference time-periodic waveform; determine a difference between the probe modulation phase and the reference modulation phase corresponding to extrema of the representation of the power of the AC component; and determine the range to the one or more targets, based on the extrema of the power of the AC component.

In some embodiments, the probe amplitude modulator and the reference amplitude modulators are configured to have the probe modulation frequency substantially equal to the reference modulation frequency, and the probe phase offset and the reference phase offset constant and substantially equal to each other, and are further configured to vary the probe modulation frequency and the reference modulation frequency over time, and wherein the computing node is configured to determine the probe modulation frequency and the reference modulation frequency corresponding to extrema of the representation of the power of the AC component.

In some embodiments, the computing node is further configured to determine two successive extrema of the representation of the power of the AC component, and to determine the probe modulation frequencies and the reference modulation frequencies corresponding to said extrema.

In some embodiments, the probe amplitude modulator and the reference amplitude modulators are configured to have the probe modulation frequency and the reference modulation frequency constant and substantially equal to each other, and to vary over time the difference between the probe phase offset and the reference phase offset, and wherein the computing node is configured to determine the difference between the probe phase offset and the reference phase offset corresponding to extrema of the representation of the power of the AC component.

In some embodiments, the computing node is further configured to change the probe and the reference modulation frequencies, and to determine two extrema of the representation of the power of the AC component, and to determine the probe modulation frequency and the reference modulation frequency corresponding to said extrema.

In some embodiments, the probe amplitude modulator and the reference amplitude modulator are configured to vary over time the phase difference between the probe modulation phase and the reference modulation phase, and wherein the computing node is configured to determine the difference between the probe modulation phase and the reference modulation phase corresponding to extrema of the representation of the power of the AC component.

In some embodiments, the computing node is further configured to change the probe modulation frequency or the reference modulation frequency, to determine two extrema of the representation of the power of the AC component, and to determine the probe modulation frequency or the reference modulation frequency corresponding to said extrema.

In some embodiments, the probe detector comprises an array of probe detector elements, the array having a characteristic size that is greater than a coherence area of the reflected probe field, each probe detector element having a characteristic size that is smaller than the coherence area of the reflected probe field, each probe detector element configured to generate a probe detector element current, the apparatus further including a probe channel adder adapted to add the probe detector element currents and to generate the probe current corresponding to the sum of the probe detector element currents.

In some embodiments, the probe time-periodic waveform and the reference time-periodic waveform are sinusoidal.

In some embodiments, the electromagnetic field source comprises a laser.

In some embodiments, the electromagnetic field source comprises a light-emitting diode.

According to embodiments of the present disclosure, methods of and computer program products for determining a range of one or more targets are provided. In some such embodiments, the method comprises: generating an optical electromagnetic source field, the source field having a source amplitude; dividing said source field into a probe field, having a probe amplitude, and a reference field, having a reference amplitude; modulating the probe amplitude according to a probe time-periodic waveform having a probe modulation phase that includes a probe modulation frequency and a probe modulation phase offset; modulating the reference amplitude according to a reference time-periodic waveform having a reference modulation phase that includes a reference modulation frequency and a reference modulation phase offset; directing the probe field to the one or more targets; receiving a reflected probe field from the one or more targets; detecting the reflected probe field and generating a probe detector signal corresponding to the reflected probe field; detecting the reference field and generating a reference detector signal corresponding to the reference field; combining the probe detector signal and the reference detector signal and generating a combined signal representing the difference between the probe detector signal power and the reference detector signal power, the combined signal having a DC component and an AC component; generating a representation of a power of the AC component corresponding to the probe time-periodic waveform and the reference time-periodic waveform; determining a difference between the probe modulation phase and the reference modulation phase corresponding to extrema of the representation of the power of the AC component; and determining the range to the one or more targets, based on the extrema of the power of the AC component.

In some embodiments, modulating the probe amplitude and the reference amplitude includes keeping the probe and the reference modulation frequencies substantially equal to each other, while varying said modulation frequencies over time, and wherein determining the probe modulation phase and the reference modulation phase corresponding to extrema of the representation of the power of the AC component includes determining the probe and the reference modulation frequencies.

In some embodiments, the method further comprises determining two successive extrema of the representation of the power of the AC component, and determining the probe and the reference modulation frequencies corresponding to said extrema.

In some embodiments, modulating the probe amplitude and the reference amplitude includes keeping the probe and the reference modulation frequencies constant and substantially equal to each other, while varying the difference between the probe phase offset and the reference phase offset over time, and wherein determining the probe modulation phase and the reference modulating phase corresponding to extrema of the representation of the power of the AC component includes determining the difference between the probe phase offset and the reference phase offset corresponding to extrema of the representation of the power of the AC component.

In some embodiments, the method further comprises changing the probe and the reference modulation frequencies, determining two extrema of the representation of the power of the AC component, and determining the probe modulation frequency and the reference modulation frequency corresponding to said extrema.

In some embodiments, modulating the probe amplitude and the reference amplitude includes varying over time the phase difference between the probe modulation phase and the reference modulation phase, and wherein determining the probe modulation phase and the reference modulation phase corresponding to extrema of the representation of the power of the AC component includes determining the difference between the probe modulation phase and the reference modulation phase corresponding to extrema of the representation of the power of the AC component.

In some embodiments, the method further comprises changing the probe modulation frequency or the reference modulation frequency, determining two extrema of the representation of the power of the AC component, and determining the probe modulation frequency or the reference modulation frequency corresponding to said extrema.

In some embodiments, the method further comprises measuring an oscillation frequency of a periodic waveform corresponding to the power of the AC component at the extrema of the representation of said power, and determining a Doppler shift of the probe field based in said oscillation frequency.

In some embodiments, the method further comprises adding to the reference phase a DC offset; measuring a phase change of the periodic waveform corresponding to the power of the AC component at the extrema of the representation of said power; and determining the velocity of the one or more targets based on the oscillation frequency and the phase change of the periodic waveform corresponding to the power of the AC component.

In some embodiments, detecting the reflected probe field and generating the probe signal corresponding to the reflected probe field includes: directing the reflected probe field to an array of probe detector elements, the array having a characteristic size that is greater than a coherence area of the reflected probe field, each probe detector element having a characteristic size that is smaller than the coherence area of the reflected probe field, each probe detector element configured to generate a probe detector element current, adding the probe detector element currents and generating the probe current corresponding to the sum of the probe detector element currents.

According to embodiments of the present disclosure, apparatus for determining a range of one or more targets are provided. The apparatus includes: an electromagnetic field source, the field source configured to generate a source field, the source field having a source phase; an interferometer, comprising a probe arm and a reference arm. The interferometer is configured to: receive the source field and divide the source field into a probe field and a reference field; direct the probe field to the one or more targets and to receive a reflected probe field from the one or more targets; and combine the reflected probe field and the reference field into a combined field corresponding to a sum of the reflected probe field and the reference field. A source phase modulator is configured to modulate the source phase. A detector is configured to detect the combined field and to generate current having a DC component and an AC component. A power meter is configured to measure the AC component. A computing node is in communication with the source phase modulator and the power meter. The computing node is configured to: cause the source phase modulator to modulate the source phase according to a time-periodic waveform having a source modulation phase that includes a modulation frequency and a modulation phase offset; generate a representation of the power of the AC component corresponding to the time-periodic waveform; determine the source modulation phase corresponding to extrema of the representation of the power of the AC component; and determine the range to the one or more targets based on the extrema of the power of the AC component.

In some embodiments, the source phase modulator is configured to vary the modulation frequency over time, and wherein the computing node is configured to determine the modulation frequency corresponding to extrema of the representation of the power of the AC component.

In some embodiments, the computing node is further configured to determine two successive extrema of the representation of the power of the AC component, and to determine the modulation frequencies corresponding to said extrema.

In some embodiments, the computing node is further configured to measure an oscillation frequency of a periodic waveform corresponding to the power of the AC component at the extrema of the representation of said power, and to determine a Doppler shift of the probe field based on said oscillation frequency.

In some embodiments, the computing node is further configured to cause the reference phase modulator to add to the reference phase a DC offset, and to measure a phase change of the periodic waveform corresponding to the power of the AC component at the extrema of the representation of said power, and to determine the velocity of the one or more targets based on the oscillation frequency and the phase change of the periodic waveform corresponding to the power of the AC component.

In some embodiments, the detector comprises an array of detector elements, the array having a characteristic size that is greater than a coherence area of the reflected probe field, each detector element having a characteristic size that is smaller than the coherence area of the reflected probe field, each detector element configured to generate a detector element current, the apparatus further including a channel adder adapted to add the detector element currents and to generate the current corresponding to the sum of the detector element currents.

In some embodiments, the phase modulator comprises an electro-optical modulator.

In some embodiments, the time-periodic waveform is sinusoidal.

In some embodiments, the phase modulator comprises a moveable mirror.

In some embodiments, the electromagnetic field source comprises a laser.

In some embodiments, the electromagnetic field source comprises a light-emitting diode.

According to embodiments of the present disclosure, apparatus for determining a range of one or more targets are provided. The apparatus comprises: an electromagnetic field source, the field source configured to generate a source field, the source field having a source phase, the field source adapted to modulate the source phase; an interferometer, comprising a probe arm and a reference arm. The interferometer is configured to: receive the source field and divide the source field into a probe field and a reference field; direct the probe field to the one or more targets and to receive a reflected probe field from the one or more targets; and combine the reflected probe field and the reference field into a combined field corresponding to a sum of the reflected probe field and the reference field. A detector is configured to detect the combined field and to generate current having a DC component and an AC component. A power meter is configured to measure the AC component. A computing node is in communication with the electromagnetic field source and the power meter. The computing node is configured to: cause the source to modulate the source phase according to a time-periodic waveform having a source modulation phase that includes a modulation frequency and a modulation phase offset; generate a representation of the power of the AC component corresponding to the time-periodic waveform; determine the source modulation phase corresponding to extrema of the representation of the power of the AC component; and determine the range to the one or more targets based on the extrema of the representation of the power of the AC component.

In some embodiments, the field source is configured to vary the modulation frequency over time, and wherein the computing node is configured to determine the modulation frequency corresponding to extrema of the representation of the power of the AC component.

In some embodiments, the computing node is further configured to determine two successive extrema of the representation of the power of the AC component, and to determine the modulation frequencies corresponding to said extrema.

In some embodiments, the computing node is further configured to measure an oscillation frequency of a periodic waveform corresponding to the power of the AC component at the extrema of the representation of said power, and to determine a Doppler shift of the probe field based on said oscillation frequency.

In some embodiments, the computing node being further configured to cause the reference phase modulator to add to the reference phase a DC offset, and to measure a phase change of the periodic waveform corresponding to the power of the AC component at the extrema of the representation of said power, and to determine the velocity of the one or more targets based on the oscillation frequency and the phase change of the periodic waveform corresponding to the power of the AC component.

In some embodiments, the source is adapted to modulate the source phase by varying a current to a light-emitting diode.

In some embodiments, the detector comprises an array of detector elements, the array having a characteristic size that is greater than a coherence area of the reflected probe field, each detector element having a characteristic size that is smaller than the coherence area of the reflected probe field, each detector element configured to generate a detector element current, the apparatus further including a channel adder adapted to add the detector element currents and to generate the current corresponding to the sum of the detector element currents.

In some embodiments, the time-periodic waveform is sinusoidal.

In some embodiments, the electromagnetic field source comprises a laser.

In some embodiments, the electromagnetic field source comprises a light-emitting diode.

According to embodiments of the present disclosure, methods of and computer program products for determining a range of one or more targets are provided. In some such embodiments, the method comprises: generating a source electromagnetic field, the source field having a source phase; dividing the source field into a probe field and a reference field; modulating the source phase according to a time-periodic waveform having a source modulation phase that includes a modulation frequency and a modulation phase offset; directing the probe field to the one or more targets; receiving a reflected probe field from the one or more targets; combining the reflected probe field and the reference field into a combined field corresponding to a sum of the reflected probe field and the reference field; generating current corresponding to the combined field, the current having a DC component and an AC component; generating a representation of a power of the AC component corresponding to the one or more time-periodic waveforms; determining the source modulation phase corresponding to extrema of the representation of the power of the AC component; and determine the range to the one or more targets, based on the extrema of the power of the AC component.

In some embodiments, modulating the source phase includes varying the modulation frequency over time, and wherein determining the modulation phase corresponding to extrema of the representation of the power of the AC component includes determining the modulation frequency.

In some embodiments, the method further comprises determining two successive extrema of the representation of the power of the AC component, and determining the modulation frequencies corresponding to said extrema.

In some embodiments, the method further comprises measuring an oscillation frequency of a periodic waveform corresponding to the power of the AC component at the extrema of the representation of said power, and determining a Doppler shift of the probe field based in said oscillation frequency.

In some embodiments, the method further comprises adding to the reference phase a DC offset; measuring a phase change of the periodic waveform corresponding to the power of the AC component at the extrema of the representation of said power; and determining the velocity of the one or more targets based on the oscillation frequency and the phase change of the periodic waveform corresponding to the power of the AC component.

In some embodiments, generating the current corresponding to the combined field includes: directing the reflected probe field to an array of detector elements, the array having a characteristic size that is greater than a coherence area of the reflected probe field, each detector element having a characteristic size that is smaller than the coherence area of the reflected probe field, each detector element configured to generate a detector element current; and adding the detector element currents and generating the current corresponding to the sum of the detector element currents.

According to embodiments of the present disclosure, apparatus for determining a range of one or more targets are provided. In various embodiments, an electromagnetic field source is included. The source is configured to generate a source field. The source field has a source phase. An interferometer is included, comprising a probe arm and a reference arm. The interferometer is configured to: receive the source field and divide the source field into a probe field, having a probe phase, and a reference field, having a reference phase; direct the probe field to the one or more targets and to receive a reflected probe field from the one or more targets; and combine the reflected probe field and the reference field into a combined field. A source phase modulator is included, configured to modulate the source phase. A photodetector is included, configured to detect the combined field and to generate photocurrent having a DC component and an AC component. A power meter is included, configured to measure the AC component. A computing node is provided, in communication with the source phase modulator and the power meter. The computing node is configured to: cause the source phase modulator to modulate the source phase according to one or more time-periodic waveforms, each having a source modulation frequency; generate a representation of the power of the AC component corresponding to the one or more time-periodic waveforms; determine the source modulation frequency corresponding to extrema of the representation of the power of the AC component, and determine the range to the one or more targets based on the extrema of the power of the AC component.

According to embodiments of the present disclosure, apparatus for determining a range of one or more targets are provided. In various embodiments, an electromagnetic field source is included. The source is configured to generate a source field. The source field has a source phase. An interferometer is included, comprising a probe arm and a reference arm. The interferometer is configured to: receive the source field and divide the source field into a probe field, having a probe phase, and a reference field, having a reference phase; direct the probe field to the one or more targets and to receive a reflected probe field from the one or more targets; and combine the reflected probe field and the reference field into a combined field. A probe phase modulator is included, configured to modulate the probe phase. A reference phase modulator is included, configured to modulate the reference phase. A photodetector is included, configured to detect the combined field and to generate photocurrent having a DC component and an AC component. A power meter is included, configured to measure the AC component. A computing node is included, in communication with the probe phase modulator, the reference phase modulator, and the power meter. The computing node is configured to: cause the probe phase modulator to modulate the probe phase according to a probe time-periodic waveform having a probe modulation frequency; cause the reference phase modulator to modulate the reference phase according to a reference time-periodic waveform having a reference modulation frequency, wherein the probe modulation frequency is substantially equal to the reference modulation frequency, and the reference time-periodic waveform has a variable phase offset relative to the probe time-periodic waveform; generate a representation of the power of the AC component corresponding to the one or more time-periodic waveforms; determine the phase offset corresponding to the extrema of the representation of the power of the AC component; and determine the range to the one or more targets based on the extrema of the power of the AC component.

According to embodiments of the present disclosure, apparatus for determining a range of one or more targets are provided. In various embodiments, an electromagnetic field source is included. The source is configured to generate a source field. The source field has a source phase. The source is adapted to modulate the source phase. An interferometer is included, comprising a probe arm and a reference arm. The interferometer is configured to: receive the source field and divide the source field into a probe field, having a probe phase, and a reference field, having a reference phase; direct the probe field to the one or more targets and to receive a reflected probe field from the one or more targets; and combine the reflected probe field and the reference field into a combined field. A photodetector is included, configured to detect the combined field and to generate photocurrent having a DC component and an AC component. A power meter is included, configured to measure the AC component. A computing node is included, in communication with the electromagnetic field source and the power meter. The computing node is configured to: cause the source to modulate the source phase according to one or more time-periodic waveforms, each having a source modulation frequency; generate a representation of the power of the AC component corresponding to the probe time-periodic waveform and the reference time-periodic waveform; determine the source modulation frequency corresponding to extrema of the representation of the power of the AC component; and determine the range to the one or more targets based on the extrema of the representation of the power of the AC component.

According to embodiments of the present disclosure, methods of and computer program products for determining a range of one or more targets are provided. A source electromagnetic field is generated. The source field has a source phase. The source field is divided into a probe field, having a probe phase, and a reference field, having a reference phase. The source phase is modulated according to one or more time-periodic waveforms, each having a source modulation frequency. The probe field is directed to the one or more targets. A reflected probe field is received from the one or more targets. The reflected probe field and the reference field are combined into a combined field. Photocurrent corresponding to the combined field is generated. The photocurrent has a DC component and an AC component. A representation of a power of the AC component corresponding to the one or more time-periodic waveforms is generated. The source modulation frequency corresponding to extrema of the representation of the power of the AC component is determined. The range to the one or more targets is determined, based on the extrema of the power of the AC component.

According to embodiments of the present disclosure, methods of and computer program products for determining a range of one or more targets are provided. A source electromagnetic field is generated. The source field has a source phase. The source field is divided into a probe field, having a probe phase, and a reference field, having a reference phase. The probe phase is modulated according to a probe time-periodic waveform having a probe modulation frequency. The reference phase is modulated according to a reference time-periodic waveform having a reference modulation frequency, wherein the probe modulation frequency is substantially equal to the reference modulation frequency, and the reference time-periodic waveform has a variable phase offset relative to the probe time-periodic waveform. The probe field is directed to the one or more targets. A reflected probe field is received from the one or more targets. The reflected probe field and the reference field are combined into a combined field. Photocurrent is generated corresponding to the combined field. The photocurrent has a DC component and an AC component. A representation of a power of the AC component corresponding to the probe time-periodic waveform and the reference time-periodic waveform is generated. The phase offset corresponding to extrema of the representation of the power of the AC component is determined. The range to the one or more targets is determined, based on the extrema of the power of the AC component.

According to embodiments of the present disclosure, methods of and computer program products for determining a range of one or more targets are provided. An electromagnetic field source is caused to generate a source field. The source field has a source phase. The source field is directed to an interferometer having a probe arm and a source arm, and dividing the source field into a probe field, having a probe phase, and a reference field, having a reference phase. The interferometer is configured to: direct the probe field to the one or more targets; receive a reflected probe field from the one or more targets; combine the reflected probe field and the reference field into a combined field; and direct the combined field to a photodetector. A source phase modulator is caused to modulate the source phase according to one or more time-periodic waveforms, each having a source modulation frequency. The photodetector is caused to generate photocurrent corresponding to the combined field, the photocurrent having a DC component and an AC component. A representation of a power of the AC component corresponding to the one or more time-periodic waveforms is generated. The source modulation frequency corresponding to extrema of the representation of the power of the AC component is determined. The range to the one or more targets is determined, based on the extrema of the power of the AC component.

According to embodiments of the present disclosure, methods of and computer program products for determining a range of one or more targets are provided. A source is caused to generate a source electromagnetic field. The source field has a source phase. The source field is directed to an interferometer having a probe arm and a source arm, which divides the source field into a probe field, having a probe phase, and a reference field, having a reference phase. The interferometer is configured to: direct the probe field to the one or more targets; receive a reflected probe field from the one or more targets; combine the reflected probe field and the reference field into a combined field; and direct the combined field to a photodetector. A probe phase modulator is caused to modulate the probe phase according to a probe time-periodic waveform having a probe modulation frequency. A reference phase modulator is caused to modulate the reference phase according to a reference time-periodic waveform having a reference modulation frequency. The probe modulation frequency is substantially equal to the reference modulation frequency, and the reference time-periodic waveform has a variable phase offset relative to the probe time-periodic waveform. A photodetector is caused to generate photocurrent corresponding to the combined field. The photocurrent has a DC component and an AC component. A representation of a power of the AC component corresponding to the probe time-periodic waveform and the reference time-periodic waveform is generated. The phase offset corresponding to extrema of the representation of the power of the AC component is determined. The range to the one or more targets is determined, based on the extrema of the power of the AC component.

According to embodiments of the present disclosure, apparatus for determining a range of one or more targets are provided. The apparatus comprises: an electromagnetic radio frequency (RF) field source, the field source configured to generate an RF source field; an optical field source, configured to generate an optical source field; an optical field modulator; an optical field demodulator. The apparatus is configured to receive the RF source field and divide the RF source field into an RF probe field, having an RF probe phase, and an RF reference field, having an RF reference phase. The apparatus further includes: a probe phase modulator, configured to modulate the RF probe phase, and a reference phase modulator, configured to modulate the RF reference phase. The optical field modulator is configured to receive the RF probe field and the optical source field and to amplitude-modulate the optical source field according to the RF probe field, thereby generating an optical probe field. The apparatus is further configured to direct the optical probe field to the one or more targets, to receive a reflected optical probe field from the one or more targets, and to direct the reflected optical field to the optical field demodulator. The optical field demodulator is configured to receive the reflected optical field and demodulate the reflected optical field into a reflected RF probe field. The apparatus is further configured to direct the reflected RF probe field and the RF reference field to the detector. The detector configured to detect the reflected RF probe field and the RF reference field and to generate a detector signal corresponding to a product of the reflected RF probe field and the RF reference field, the detector signal having a DC component and an AC component. A power meter is configured to measure the AC component. A computing node is in communication with the probe phase modulator, the reference phase modulator, and the power meter. The computing node is configured to: cause the probe phase modulator to modulate the RF probe phase according to a probe time-periodic waveform having a probe modulation phase that includes a probe modulation frequency and a probe modulation phase offset; cause the reference phase modulator to modulate the RF reference phase according to a reference time-periodic waveform having a reference modulation phase that includes a reference modulation frequency and a reference modulation phase offset; generate a representation of the power of the AC component corresponding to the one or more time-periodic waveforms; determine a difference between the probe modulation phase and the reference modulation phase corresponding to the extrema of the representation of the power of the AC component; and determine the range to the one or more targets based on the extrema of the power of the AC component.

According to embodiments of the present disclosure, methods of and computer program products for determining a range of one or more targets are provided. In some such embodiments, the method comprises: generating an electromagnetic radio frequency (RF) field source; generating an optical source field; dividing the RF source field into an RF probe field, having an RF probe phase, and an RF reference field, having an RF reference phase; modulating the RF probe phase according to a probe time-periodic waveform having a probe modulation phase that includes a probe modulation frequency and a probe modulation phase offset; modulating the RF reference phase according to a reference time-periodic waveform having a reference modulation phase that includes a reference modulation frequency and a reference modulation phase offset; amplitude-modulating the optical source field according to the RF probe field, thereby generating an optical probe field; directing the optical probe field to the one or more targets and receiving a reflected optical probe field from the one or more targets; demodulating the reflected optical field into a reflected RF probe field; detecting the reflected RF probe field and the RF reference field and generating a detector signal corresponding to a product of the reflected RF probe field and the RF reference field, the detector signal having a DC component and an AC component; generating a representation of the power of the AC component corresponding to the one or more time-periodic waveforms; determining a difference between the probe modulation phase and the reference modulation phase corresponding to the extrema of the representation of the power of the AC component; and determining the range to the one or more targets based on the extrema of the power of the AC component.

According to embodiments of the present disclosure, apparatus for determining a range of one or more targets are provided. The apparatus comprises: an electromagnetic radio frequency (RF) field source, the field source configured to generate an RF source field; an optical field source, configured to generate an optical source field; an optical field modulator; an optical field demodulator. The apparatus is configured to receive the RF source field and divide the RF source field into an RF probe field, having an RF probe phase, and an RF reference field, having an RF reference phase. The apparatus further includes: a probe phase modulator, configured to modulate the RF probe phase, and a reference phase modulator, configured to modulate the RF reference phase. The optical field modulator is configured to receive the RF probe field and the optical source field and to phase-modulate the optical source field according to the RF probe field, thereby generating an optical probe field. The apparatus is further configured to direct the optical probe field to the one or more targets, to receive a reflected optical probe field from the one or more targets, and to direct the reflected optical field to the optical field demodulator. The optical field demodulator is configured to receive the reflected optical field and demodulate the reflected optical field into a reflected RF probe field. The apparatus is further configured to direct the reflected RF probe field and the RF reference field to the detector. The detector configured to detect the reflected RF probe field and the RF reference field and to generate a detector signal corresponding to a product of the reflected RF probe field and the RF reference field, the detector signal having a DC component and an AC component. A power meter is configured to measure the AC component. A computing node is in communication with the probe phase modulator, the reference phase modulator, and the power meter. The computing node is configured to: cause the probe phase modulator to modulate the RF probe phase according to a probe time-periodic waveform having a probe modulation phase that includes a probe modulation frequency and a probe modulation phase offset; cause the reference phase modulator to modulate the RF reference phase according to a reference time-periodic waveform having a reference modulation phase that includes a reference modulation frequency and a reference modulation phase offset; generate a representation of the power of the AC component corresponding to the one or more time-periodic waveforms; determine a difference between the probe modulation phase and the reference modulation phase corresponding to the extrema of the representation of the power of the AC component; and determine the range to the one or more targets based on the extrema of the power of the AC component.

According to embodiments of the present disclosure, methods of and computer program products for determining a range of one or more targets are provided. In some such embodiments, the method comprises: generating an electromagnetic radio frequency (RF) field source; generating an optical source field; dividing the RF source field into an RF probe field, having an RF probe phase, and an RF reference field, having an RF reference phase; modulating the RF probe phase according to a probe time-periodic waveform having a probe modulation phase that includes a probe modulation frequency and a probe modulation phase offset; modulating the RF reference phase according to a reference time-periodic waveform having a reference modulation phase that includes a reference modulation frequency and a reference modulation phase offset; phase-modulating the optical source field according to the RF probe field, thereby generating an optical probe field; directing the optical probe field to the one or more targets and receiving a reflected optical probe field from the one or more targets; demodulating the reflected optical field into a reflected RF probe field; detecting the reflected RF probe field and the RF reference field and generating a detector signal corresponding to a product of the reflected RF probe field and the RF reference field, the detector signal having a DC component and an AC component; generating a representation of the power of the AC component corresponding to the one or more time-periodic waveforms; determining a difference between the probe modulation phase and the reference modulation phase corresponding to the extrema of the representation of the power of the AC component; and determining the range to the one or more targets based on the extrema of the power of the AC component.

Various methods disclosed here utilize a time-periodic frequency modulation (or equivalently a time-periodic phase modulation) of the light source illuminating the interferometer. It is distinct from alternative methods for range-resolved interferometric signal processing in that instead of measuring the frequency or phase of the RF (radio-frequency) signal generated by the interferometer, it involves a measurement of the amplitude of an RF signal. In this technique, neither an accurate measurement of the absolute amplitude nor of the relative RF amplitude is required. Rather, the range information is extracted from the observation of the modulation frequencies that lead to the absence of an RF photocurrent.

Because the presence (or equivalently the observation of a non-vanishing RF amplitude) of an RF signal can be obtained in a single period of the modulation frequency and because only the relative amplitudes are important, high-resolution range measurements can be made at an extremely high rate and over an extremely wide dynamic range. In particular, the primary advantage is that the operating dynamic range of this technique is superior to phase or frequency detection schemes in the limit of high acquisition rates and range accuracy.

BRIEF DESCRIPTION OF THE SEVERAL
VIEWS OF THE DRAWINGS

DETAILED DESCRIPTION

Glossary

Figure 1:
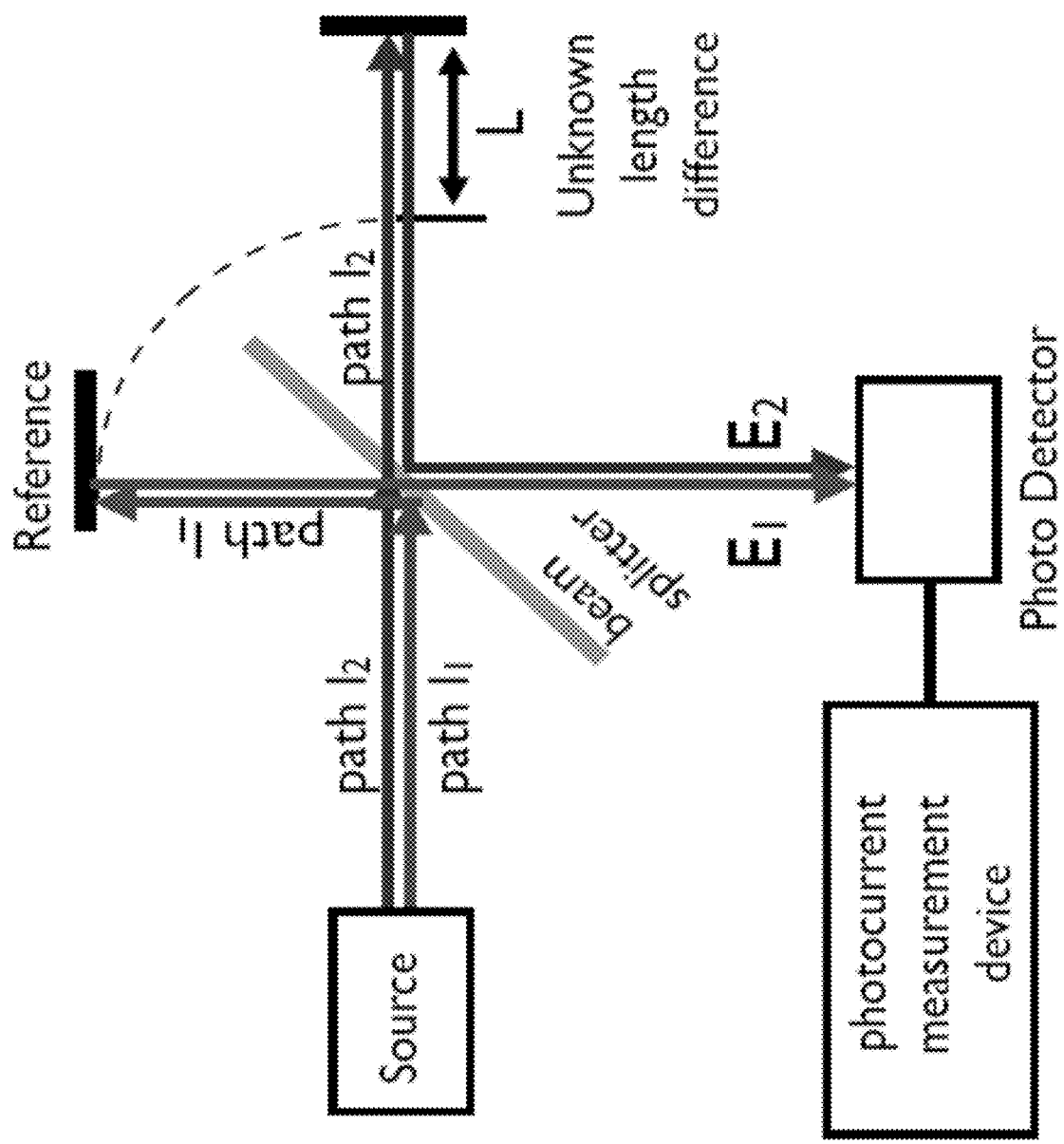
FIG. 1 is a schematic of an example embodiment according to the present disclosure.

As used herein, an electromagnetic field source refers to any source of an electromagnetic field having sufficient spatial coherence and temporal coherence to generate an interference pattern in interferometry. In an example embodiment, the source can have narrow bandwidth, for example, be substantially monochromatic."

As used herein "spatial coherence" refers to a substantially fixed phase relationship between the fields at different locations along the direction of the propagation of the field. "Temporal coherence" refers to a substantially fixed phase relationship between the fields at a fixed location along the direction of the field propagation, but at different times.

As used herein, reflected fields include both reflected and scattered fields.

As used herein, measuring an AC component of a photocurrent includes measuring a power or an amplitude of the AC component. Likewise, an AC component of another signal current includes measuring a power or an amplitude of the AC component.

As used herein, a detector is a square law detector, that, in various embodiments, is configured to multiply, add, or subtract a received signals.

As used herein a modulation phase that includes a frequency and phase offset refers to a general expression $\theta(t) = \omega t - \delta$, as described further below.

As used herein, coherence area refers to the expression $A_c = (D^2 \lambda^2)/(\pi d^2)$, where D is the distance from a source (here, to a target), d is the size (diameter) of the source (here, the size of an area of the target that is capable of reflecting coherent light), and $\lambda$ is the wavelength of the probe field.

As used herein, RF (radio waves) includes a band from 100 kHz to 300 GHz. MW (microwave) includes a band from 1 GHz to 30 GHz. mmW (millimeter wave) includes a band from 30 GHz to 300 GHz.

As used here, a product of two fields is the product of multiplication of two fields, as accomplished, for example, by a wave mixer, e.g., an RF double-balanced mixer. A product of two signals is defined as an operation performed over two discrete-time signals where the result is a discrete time signal whose values are obtained by multiplying the corresponding values of the two input signals. For example, a product may be taken of digital signals corresponding to fields.

Various suitable mixers are known in the art, for example, the Mini-Circuits ADE-R6+ for 0.15 to 250 MHz, SYM-102H+ for 5 to 1000 MHz, MCA-50 MH+ for 1000 to 5000 MHz, MAC Series for 300 MHz to 12 GHz, and MDB-44H+ for 10-40 GHz.

The present disclosure provides for device, systems, methods, and computer readable media for measuring the path length difference (or equivalently the time difference) of two optical (or other electro-magnetic) fields propagating through two paths or arms of an optical (or other electro-magnetic) interferometer. Various approaches described herein may be referred to as Power Spectrum Interferometry or PSI. These approaches involve modulating the phase of the optical (or other electro-magnetic) field or fields incident on an interferometer and then using the intensity output of the interferometer to determine the path length difference in the interferometer. Alternatively, the interferometer can combine the two fields by direct multiplication (for example in a mixer) and the combined signal can be monitored to determine the path length difference traveled by the reference and probe waves. By placing an object (scatterer) into one of the arms of the interferometer, the distance from the interferometer to the object can be measured using this method (assuming the length of the reference arm is known). Instead of relying on a direct measurement of the phase of the resulting sinusoidal output from the interferometer, these approaches rely on a measurement of the AC power in the photocurrent or the AC power in the mixer current generated by the intensity output—hence the name power spectrum interferometry (PSI).

Because PSI relies on a measurement of the power in the AC photocurrent produced by an interferometer, it is fundamentally distinct from all other interferometric measurement methods. These other methods fall broadly under two categories. These categories are phase measurement and frequency measurement techniques. The Frequency Modulated Continuous Wave (FMCW) technique is one example of the latter and involves sweeping the frequency (usually linearly) of the optical field incident on the interferometer and measuring the frequency of the AC photocurrent produced by the interferometer. The Phase Modulated Continuous Wave (PMCW) technique involves modulating the phase of the optical field incident on the interferometer and measuring the phase of the AC photocurrent produced by the interferometer. Optical coherence tomography (OCT) is a DC phase measurement method where the static phase of the interference is measured either for different path-length differences (produced by moving one of the interferometer arms) or for different optical frequencies (equivalently different optical wavelengths) of the incident field.

Coherent detection of an optical or RF signal, by combining the light or EM wave one wishes to measure with a second field (often referred to as a "local oscillator" field), provides both noise free amplification of the signal to be detected (allowing amplification above detection thresholds while preserving the optical signal's intrinsic signal-to-noise ratio) and a fundamentally higher signal to noise than direct detection of the optical signal. Coherent detection methods rely on some degree of temporal and spatial phase coherence of the optical field (or fields) illuminating the detector. While spatial phase coherence is guaranteed when the source light emerges from a single mode waveguide (for example in a laser using an optical gain medium embedded in a single mode waveguide), temporal phase coherence is not as trivially obtained.

Two wave sources are said to be perfectly temporally coherent if they have the same frequency and a constant phase difference for all time. A wave source is said to be perfectly temporally coherent with itself if two time delayed versions of the wave source have the same frequency and a constant phase difference for all time and for any time delay difference. Since this is an idealization, wave sources are typically characterized by a coherence time. This time represents the largest time difference for which a time delayed version of the source is coherent with a non-time delayed version of the wave source.

Interferometric range measurements involve interfering time delayed versions of the optical field produced by a laser (with appropriate phase or frequency modulation). The coherence time typically sets both the maximum range (equivalently the maximum time difference over which a coherent measurement can be made) and the resolution limit for such measurements. Where measurements are made of the frequency and phase of the AC photocurrent produced by interfering time delayed versions of the optical fields, any uncontrolled frequency or phase variation of the optical source with respect to a time delayed version of itself directly lead to uncertainties in the range determination. Thus, laser sources are required with stable optical frequencies and with coherence times at least as long as the round trip time of the light to and from the target.

In addition to requiring phase coherent sources, both phase based and frequency based measurement methods suffer from a degradation of the measurement accuracy when the detected signal strength drops below some optimal detection range. For example, in the case of phase detection where demodulation of the AC photocurrent is achieved using standard analog RF mixing techniques, a systematic shift of the detected phase occurs for small signal strengths due to the imbalance and intrinsic DC offset in analog RF mixers. These problems, and related ones for digital demodulation methods, lead to a measurement uncertainty that increases when the signal-to-noise of the return signal drops too low and, in general, to a measurement uncertainty that varies with signal strength. This signal-strength-dependent measurement uncertainty ultimately depends on the SNR of the detection scheme and limits the acceptable dynamic range of the probe field. It is important to add here that direct detection range-finding methods also suffer from a range uncertainty that varies with signal strength. In that case, the echo pulse timing measurement varies (and thus the range determination varies) as the signal strength changes because of drive dependent propagation delay dispersion intrinsic to all comparators (used to determine the arrival time of the probe field). In short, the signal latency through a comparator depends on the amount of overdrive of the inputs.

PSI is a coherent detection method (and thus benefits from an intrinsically higher SNR than direct detection), but has the minimum requirements on phase coherence of any alternative coherent detection method. The phase noise of the laser source does not limit the range accuracy in a PSI measurement since such phase noise simply produces a non-zero baseline for the AC photocurrent but does not affect the location of the RF minima. In addition, the AC photocurrent produced by laser phase noise will also show the same PSI minima and maxima as a function of frequency characteristic of the pathlength difference in the interferometer. Thus, a measurement of the AC photocurrent spectrum produced by the interferometer and a source laser with broadband phase noise could also be used to perform a PSI range measurement. Furthermore, variations in the echo signal strength do not lead to range errors for a PSI measurement.

This means that high accuracy, long range PSI range measurements can be achieved with cheap laser sources with relatively large phase noise and the range accuracy is preserved and unaffected all the way down to the detection limit. Thus, accurate range measurements can be made over the entire detection dynamic range.

The reason is that PSI involves measuring the power (and not the phase or frequency) of the AC photocurrent in some band around the frequency (or frequencies) of the applied phase modulation. Thus, only the phase noise of the source in that particular band matters and this phase noise only determines the lower bound on detectable changes in that band. Thus phase noise of a laser source only limits the detection threshold but not the range or accuracy of a PSI measurement. While phase or frequency noise of the laser source could lead to a shift or broadening of the spectral features produced by the applied phase modulation upon detection, so long as this shift does not move the features outside of the chosen detection bandwidth, this does not affect the PSI measurement. Furthermore, because a PSI measurement involves measuring the presence or absence of AC power in a certain band from an applied phase modulation at a known frequency, there is no way for the signal strength detected to vary the applied modulation frequency or to vary the values of the modulation frequency or phase that lead to changes in the measured power. In short, there can be no signal-strength dispersion effect in PSI.

PSI is a general wave phenomenon and applicable to waves in any medium. To illustrate the basic principle, we define the time dependent amplitude of a wave in Equation 1.

$$W(t) = A \cos \Phi(t)$$

$$\Phi(t) = \omega_c t + \theta(t) \qquad \text{Equation 1}$$

In Equation 1, $\omega_c$ is the characteristic frequency of the wave (the carrier frequency) and $\theta$ is the phase of the wave. $W(t)$ can represent the time dependent displacement of an electrical voltage or current, the electric or magnetic field, a mechanical displacement of elements in a medium (e.g., the local height of the water on the surface of a lake) or a pressure. Typically W is a vector encoding the direction of the displacement, but for simplicity, the vector sign is dropped and it is assumed that the displacements are all in the same direction.

In PSI (power spectrum interferometry), the distance to a remote target is determined by generating two waves (a probe and a reference) whose phases, $\theta_{ref}(t)$ and $\theta_{probe}(t)$ or amplitudes, $A_{ref}(t)$ and $A_{probe}(t)$ are time periodic functions. The two waves are combined after propagation through the medium and one or more characteristic associated with the combined wave are observing using a detector. In PSI, it is the time dependent amplitude or equivalently the power of the combined wave that is measured in a frequency band determined by the characteristic frequency(ies), phase, or amplitude modulation. The measurement provides information about the difference in path lengths, or, equivalently, information about the time delay difference of the reference and probe waves.

The probe wave travels from the source to the detector along the probe path (e.g., it travels from the source to the target and then to the detector) and the reference wave travels from the source to the detector along the reference path. The waves that arrive at the detector are time delayed versions of the waves emitted by the source(s). The probe wave is delayed in time by an amount $t_{prb}=L_{prb}/v$ whereas the reference wave is delayed in time by an amount $t_{ref}=L_{ref}/v$ where $L_{prb}$ and $L_{ref}$ are the lengths of the probe and reference paths. The time dependent amplitudes of the reference and probe waves at the detector are given in Equation 2.

$$W_{ref}(t-t_{ref}) = A_{ref} \cos \Phi_{ref}(t-t_{ref})$$

$$W_{prb}(t-t_{prb}) = A_{prb} \cos \Phi_{prb}(t-t_{prb}) \qquad \text{Equation 2}$$

There are at least three ways that the waves can be combined to perform PSI, but not all ways will be available to the different types of waves. Moreover, the method of combination will determine which frequency band must be isolated to extract the PSI signal.

The first way to combine the waves is to multiply the two waves together using a wave mixer. This direct multiplication option is available to RF or microwave signals since microwave and RF double-balanced mixers are available. The combined wave in this case is given in Equation 3.

$$\begin{aligned} C &= W_{ref} W_{prb} \qquad \text{Equation 3} \\ &= A_{ref} \cos \Phi_{ref} \, A_{prb} \cos \Phi_{prb} \\ &= \frac{A_{ref} A_{prb}}{2} (\cos(\Phi_{ref} + \Phi_{prb}) + \cos(\Phi_{ref} - \Phi_{prb})) \\ &= M_+ + M_- \end{aligned}$$

Since the argument in the cosine in the first term ($M_+$) is $\Phi_{ref}+\Phi_{prb}=\Phi_{ref}(t-t_{ref})+\Phi_{prb}(t-t_{prb})=\omega_c(t-t_{ref}+t-t_{prb})+\theta_{ref}+\theta_{prb}$, this first term oscillates at twice the carrier frequency whereas the second term ($M_-$) involves the phase difference and the carrier frequency variation is not present. The result is that the time-dependent variation of the second term is determined by the phase modulation functions $\theta_{ref}$ and $\theta_{prb}$. Using suitable band pass frequency filters, the $M_-$ term can be isolated and measured.

$$M_- = \qquad \text{Equation 4}$$
$$\frac{A_{ref} A_{prb}}{2} \cos(\omega_c(t_{prb}-t_{ref}) + \theta_{ref}(t-t_{ref}) - \theta_{prb}(t-t_{prb}))$$

In this case, the PSI technique involves measuring the AC amplitude or power in a frequency band that isolates and contains the combined signal $M_-$. A discussion of the time-dependence of the combined wave signal term, $M_-$, and how to use it to determine the time difference $t_{prb}-t_{ref}$ follows below.

The second way to combine the waves is to add them and then to square the resulting combined wave. This option, of combining and squaring the waves, is natural for electromagnetic (EM) waves at optical and infrared wavelengths (with carrier frequencies above 150 THz) since the waves can be combined using optical beam splitters and since photodetectors (those that operate using the photoemission or photoelectric effect, in which photons cause electrons to transition from the conduction band of a material to free electrons in a vacuum or gas) are naturally square law detectors. They produce an electrical output proportional to the square of the input signal.

Another option is to use a non-linear crystal to produce the product of the two waves, but the conversion efficiency is typically quite low for non-linear crystals except when the wave amplitude is extremely large. Square law detectors can also be made for EM waves operating at lower frequencies. For example, a semiconductor diode can be used as a square law detector, providing an output voltage proportional to the square of the amplitude of the input voltage over some range of input amplitudes. A square law detector responds to the power of the input signal. If the beam splitter that combines the waves splits the wave power evenly, the wave amplitude will be reduced by the square root of 2 after the beam splitter and the result of adding the two waves at one of the beamsplitter outputs is given in Equation 5.

$$\begin{aligned} C &= \left(\frac{W_{ref} + W_{prb}}{\sqrt{2}}\right)^2 \qquad \text{Equation 5} \\ &= \frac{1}{2}(W_{ref})^2 + \frac{1}{2}(W_{prb})^2 + W_{ref} W_{prb} \end{aligned}$$

The last term, $W_{ref} W_{prb}$, is exactly the same combined wave signal produced by direct wave multiplication discussed above, and will produce the same term, $M_-$, used to determine the time $t_{prb}-t_{ref}$. The first two terms produce a DC signal and a variation at twice the carrier frequency. Thus, as discussed above, the term, $M_-$, can be isolated using a suitable band pass filter.

The third way to combine the waves is to simply add the waves using a wave combiner (e.g., an RF splitter/combiner). The combined wave signal is then given by Equation 6.

$$\begin{aligned} C &= W_{ref} + W_{prb} = A_{ref} \cos \Phi_{ref} + A_{prb} \cos \Phi_{prb} \qquad \text{Equation 6} \\ &= (A_{ref} - A_{prb}) \cos \Phi_{ref} + A_{prb} (\cos \Phi_{prb} + \cos \Phi_{ref}) \\ &= (A_{ref} - A_{prb}) \cos \Phi_{ref} + \\ &\quad 2 A_{prb} \cos\left(\frac{\Phi_{ref} + \Phi_{prb}}{2}\right) \cos\left(\frac{\Phi_{ref} - \Phi_{prb}}{2}\right) \end{aligned}$$

-continued $$= 2A\cos\left(\frac{\Phi_{ref} + \Phi_{prb}}{2}\right)\cos\left(\frac{\Phi_{ref} - \Phi_{prb}}{2}\right)$$

In Equation 6, the last expression results when the amplitudes of the two waves are equal $A=A_{ref}=A_{prb}$. Since $\Phi_{ref}+\Phi_{prb}=\Phi_{ref}(t-t_{ref})+\Phi_{prb}(t-t_{prb})=\omega_c(t-t_{ref}+t-t_{prb})+\theta_{ref}+\theta_{prb}=2\omega_c t-\omega_c(t_{ref}+t_{prb})+\theta_{ref}+\theta_{prb}$, C is a signal at the carrier frequency whose amplitude is determined by $$\cos\left(\frac{\Phi_{ref} - \Phi_{prb}}{2}\right).$$

In analogy with the combined wave signal for multiplication, the amplitude or power of this signal at the carrier frequency is proportional to a cosine function where the argument is proportional to the phase difference. In this case, the PSI technique involves measuring the AC amplitude or power in a frequency band that contains the variation of the combined wave signal at the carrier frequency. A discussion of the time dependence of the combined wave signal term, and how to use it to determine the time difference $t_{prb}-t_{ref}$ follows below.

The basis of the PSI technique is to measure the AC amplitude or the power of the combined wave signal in a frequency band determined by the frequency of the wave phase modulation or the carrier frequency, depending on the method of wave combination. The measurement of the amplitude or power in this band provides information about the difference in path lengths, or, equivalently, information about the time delay difference of the reference and probe waves.

In the case of wave combination by multiplication or of wave combination by addition followed by a square law detector, the resulting combined wave signal is given by Equation 7.

$$M_- = \frac{A_{ref} A_{prb}}{2}\cos(\Phi_{ref} - \Phi_{prb}) \qquad \text{Equation 7}$$

In the case of addition of the waves, the resulting combined wave signal is given by Equation 8.

$$C = (A_{ref} - A_{prb})\cos\Phi_{ref} + \qquad \text{Equation 8}$$
$$2A_{prb}\cos\left(\frac{\Phi_{ref} + \Phi_{prb}}{2}\right)\cos\left(\frac{\Phi_{ref} - \Phi_{prb}}{2}\right)$$

In both cases, the combined wave signal is proportional to a cosine function where the argument is proportional to the phase difference, and this phase difference depends on the time difference as in Equation 9.

$$\Phi_{ref}-\Phi_{prb}=\omega_c(t_{prb}-t_{ref})+\theta_{ref}(t-t_{ref})-\theta_{prb}(t-t_{prb}) \qquad \text{Equation 9}$$

In the first case of wave combination by multiplication or addition followed by a square law signal converter, phase modulation functions are used that are periodic in time. This is referred to as phase modulation PSI (PM-PSI). In the case that the phase modulation functions are identical time-periodic functions $\theta_{ref}=\theta_{prb}=f(t)$, where $f(t)=f(t+\tau)$, then the phase function difference $\theta_{ref}-\theta_{prb}$ vanishes for all time when $\tau$ is chosen such that $n\tau=(t_{prb}-t_{ref})$ where n is an integer. In this case, the overall phase difference is constant $\Phi_{ref}-\Phi_{prb}=\omega_c(t_{prb}-t_{ref})$ and is $M_-$ constant in time. The result is that, despite the applied phase modulation, the AC part of the combined signal has zero amplitude in the band of frequencies defined by the frequency components of the time dependent function (the modulation frequency or frequencies). When $n\tau$ is not equal to $t_{prb}-t_{ref}$, the amplitude of the time variation at the modulation frequency is non-zero. By varying the modulation function periodicity, $\tau$, and finding the value or set of values of $\tau$ at which the combined signal has a minimum or zero amplitude, the time difference can be determined. For example, if $\theta_{ref}=\theta_{prb}=\alpha\sin(\omega_m t)$ then $\theta_{ref}(t-t_{ref})-\theta_{prb}(t-t_{prb})=0$ for all t when $\omega_m(t_{prb}-t_{ref})=n 2\pi$. Thus, the time difference is found by varying the modulation frequency and finding the value or set of values of $\omega_m$ for which the AC component of the combined wave signal is zero or at a minimum.

In the case of where the waves are combined by addition, the phase modulation functions are chosen to be constant and equal, and the carrier frequency is varied. This is referred to herein as carrier frequency PSI (C-PSI), and it will be appreciated that this is equivalent to amplitude modulation of a wave at zero frequency. Because the waves are periodic functions of the carrier frequency, the combined wave signal will produce a PSI signal. In this case, $\Phi_{ref}-\Phi_{prb}=\omega_c(t_{prb}-t_{ref})$, and the resulting AC power of the combined wave signal at the carrier frequency will reach zero (if the amplitudes are equal) or a minimum (if the amplitudes are not equal) when, $\omega_c(t_{prb}-t_{ref})=\pi(2k+1)$. Thus, the time difference is found by varying the carrier frequency and finding the value or set of values of $\omega_c$ for which the AC component of the combined wave signal is zero or at a minimum. In both PM-PSI and C-PSI, the waves are manipulated (either the modulation functions or the carrier frequency is changed) and the AC component of the combined wave signal is monitored to locate those choices that produce an extrema.

It will be appreciated that the waves in question (denoted by W) can be encoded into a different wave operating at a different carrier frequency (and potentially propagating in a different medium). For example, consider the wave amplitude in Equation 10.

$$Z(t)=A_Z(t)\cos\Phi_Z(t)$$
$$\Phi_Z(t)=\omega_{Zc}t+\theta_Z(t) \qquad \text{Equation 10}$$

In Equation 10, $\omega_{Zc}$ is the carrier frequency for the wave Z. Either the time dependent amplitude of Z (denoted $A_Z$) or the time dependent phase of Z (denoted $\theta_Z$) could be chosen to equal the PSI wave previously defined as W. These options are referred to as amplitude modulation or encoding and phase modulation or encoding. Using the wave Z for PSI detection would involve first encoding the wave W into the wave Z, then transmitting Z, then receiving Z, and then decoding to retrieve the wave W.

An example of amplitude encoding or amplitude modulation PSI is as follows. The PSI wave W carrier frequency is in the radio frequency (e.g., 300 MHz) while the wave Z carrier frequency is in the optical frequency regime (e.g., 300 THz). The wave Z is generated by a laser diode or light emitting diode and its amplitude is controlled by the current. The wave W is encoded into the amplitude of wave Z using a bias tee (or diplexer) to combine the W field into the current driving the laser diode or LED. The wave Z is the transmitted along the probe path and received and its power or amplitude is directly detected by a square law detector (e.g., photodiode). The resulting detector current or photocurrent will contain a DC and an AC component. The AC component is the wave W, and it is isolated using a bandpass filter designed to pass signals at the carrier frequency of the wave W.

It will be appreciated that C-PSI is equivalent to amplitude encoded or amplitude modulation PSI where the Z wave carrier frequency is zero. In this case, the amplitude modulation frequency is the W wave carrier frequency.

There are two distinct classes of measurements for Power Spectrum Interferometry within which are many measurement modalities or implementations. The two classes are named the "Modulation Frequency Changing PSI method" and the "Modulation Phase Changing PSI method". Both classes of measurements fall under PSI because they involve a measurement of the AC power in the combined wave signal (or photocurrent for PM-PSI) at the output of an interferometer to determine the range.

The first one that is discussed below is the so called "Modulation Frequency Changing PSI" method. In this method, the optical or EM field incident on the interferometer is phase or amplitude modulated at some modulation frequency $f_m$ (or some set of modulation frequencies), and this field is split and propagates through both arms of the interferometer and then is recombined to produce a time-varying interference pattern on the detector or a time-varying output from the mixer. In the case of amplitude modulation or amplitude encoding, if the carrier frequency of the Z wave is non-zero, the encoded waves (W) must be decoded (as described above) before combining. If the carrier frequency of the Z wave is zero, then the waves can be directly combined (added). The power of the AC of the combined wave signal (e.g., photocurrent produced by the time-varying interference pattern or the action of the mixer) is measured for different modulation frequencies (thus the modulation frequency $f_m$ must be changed) and the path-length difference is determined by finding the modulation frequency $f_m^{(zero)}$ (or the set of frequencies) at which the power of the AC photocurrent or mixer is minimized. It will be appreciated that for amplitude modulation of a DC field, the modulation frequency is the W wave carrier frequency, $f_m = f_c$, and this is referred to as C-PSI.

In the "Modulation Phase Changing PSI" method, the optical or EM field incident on the interferometer is a monochromatic source from the laser or EM field source, and this field is split into two arms whereupon a different phase modulation is applied to each of the two fields in the two arms, and the fields are then recombined on the photodetector or in the mixer. The optical field (the probe field) sent to the target under measure is phase modulated at some modulation frequency $f_m$ (or some set of modulation frequencies). The second field (the local oscillator or reference field) is phase modulated at the same modulation frequency (or set of frequencies) but with a variable phase offset. The two fields are recombined (after the transmit field propagates to and from the target) on a beamsplitter and together produce a time-varying interference pattern on the detector or are recombined into a mixer to produce a time-varying mixer signal. The power of the AC photocurrent produced by the time-varying interference pattern or the mixer current is measured for different modulation phases (thus the modulation phase of the local oscillator must be changed) and the path-length difference between the range arm and the local-oscillator arm is determined by finding the modulation phase (or the set of phases) at which the power of the AC photocurrent or mixer current is minimized. Alternatively, modulation phase changing PSI can be performed by selecting a slightly different frequency for the phase modulation frequency of the probe phase and the phase modulation frequency of the reference phase. If these modulation frequencies are slightly different, the relative phase offset will evolve (e.g., change linearly) in time at the frequency difference. This variation is referred to as "Modulation Phase Sweeping PSI" to highlight the time dependent sweep of the relative phase offset of the modulation. The power of the AC photocurrent or mixer current is measured as a function of time and the path-length difference is determined by finding the time (equivalently the phase) at which the AC photocurrent or mixer current is minimized.

To illustrate the "Modulation Frequency Changing PSI" method, reference is made to a Michelson interferometer and the use of an electro-magnetic wave produced by a laser, although it will be appreciated that alternative interferometer arrangements and other EM wave sources are suitable for use according to the present disclosure.

The electric field for an electro-magnetic wave can be modeled as the real part of the complex field composed of the product of an amplitude (proportional to the square root of the intensity) and a complex exponential of the optical phase. For convenience, in linear optics, the complex electric field can be used and the real part can be taken at the end of the calculation. The ansatz for the electric field immediately after the source is as follows $$E = \sqrt{I}\, e^{i\omega_{laser}t} e^{i\theta(t)} \qquad \text{Equation 11}$$
$$= \sqrt{I}\, e^{i\Phi(t)}$$

where $\Phi(t) = \omega_{laser} t + \theta(t)$ is the total phase of the field. Note that $\omega_{laser}$ is the average optical frequency of the laser source and $\theta(t)$ is an additional time dependent phase factor that models phase or frequency modulation that we impose on this monochromatic field of frequency $\omega_{laser}$. It will be appreciated that while $\omega_{laser}$ laser is used to refer the optical frequency of a laser source, the same variable may be used to refer to the frequency of another electro-magnetic wave source. Such a phase or frequency modulation could be realized by many methods including modulating the current to a diode laser (thus changing the index of refraction of the gain medium and thus imparting a phase change to the field), sinusoidally changing the input to a voltage controlled oscillator to produce a periodic variation of the electromagnetic wave oscillator phase, bouncing the light or other wave off of a mirror that is moving in time and thus changing the phase of the emerging field, or sending the light through an electro-optic or acousto-optic modulator where the optical field is phase or frequency shifted by an external voltage signal applied to the modulator. After emerging from the source, the field propagates into the interferometer, through the two paths, recombines, and finally lands on the detector. Since there are two paths, the field at the detector is the sum of two fields $$E_{detector} = \sqrt{I_1}\, e^{i\omega_{laser}(t-t_1)} e^{i\theta(t-t_1)} + \sqrt{I_2}\, e^{i\omega_{laser}(t-t_2)} e^{i\theta(t-t_2)} \qquad \text{Equation 12}$$

These two fields are time delayed versions of the field emerging from the source since they arrive at the detector after some time-of-flight $t_1 = n_i l_i / c_0$. The present disclosure enables determining the path or time delay difference $t_1 - t_2$.

In various embodiments, the phase (or equivalently frequency) of the optical field is modulated in a time-dependent way. This time-dependent phase/frequency modulation will produce a time varying intensity at the output of the interferometer and thus an AC photocurrent on the detection photodiode (see FIG. 1). More specifically, for this technique, a time-dependent phase variation is imposed that is periodic in time and thus satisfies $\theta(t)=\theta(t+\tau)$. Since the two fields that are incident on the detector are time delayed versions of one another, the AC photocurrent produced by their interference on the photodiode will be nonzero unless $t_1-t_2=n\tau$ where $n=0, \pm 1, \pm 2, \ldots$ is any whole number. By varying $\tau$ and observing the power spectrum of the resulting AC photocurrent, we will see the AC photocurrent power vanish (or at least reach a minimum) when $\tau=n(t_1-t_2)$. If we start with $\tau=0$ and increase $\tau$ monotonically, the first minimum will occur when $\tau=t_1-t_2$ and we will have found the path time difference. Alternatively, if we find a minimum at some value for $\tau=m(t_1-t_2)$ and increase $\tau$ monotonically and find the next zero when $\tau'=(m+1)(t_1-t_2)$, we can find the path time difference by subtracting the two values $\tau'-\tau=t_1-t_2$.

What follows is a slightly more rigorous statement of the idea. The intensity (the sum of the two fields squared) at the detector is $$I = |E_{detector}|^2 \quad \text{Equation 13}$$
$$= \left|\sqrt{I_1} e^{i\omega_{laser}(t-t_1)} e^{i\theta(t-t_1)} + \sqrt{I_2} e^{i\omega_{laser}(t-t_2)} e^{i\theta(t-t_2)}\right|^2$$
$$= I_1 + I_2 + 2\sqrt{I_1 I_2} \cos(\omega_{laser}(t_2-t_1) + \theta(t-t_1) - \theta(t-t_2))$$
$$= I_1 + I_2 + 2\sqrt{I_1 I_2} \cos(\omega_{laser}(t_2-t_1) + \theta(t') - \theta(t'+t_1-t_2))$$

where the last term is written in terms of $t'\equiv t-t_1$ which is just a redefinition of our time coordinate. Clearly, when $t_1-t_2=\tau$, the argument of the cosine term becomes $$\omega_{laser}(t_2-t_1)+\theta(t')-\theta(t_1-t_2)=\omega_{laser}(t_2-t_1)+\theta(t')-\theta(t'+\tau)$$
$$=\omega_{laser}(t_2-t_1) \quad \text{Equation 14}$$

and the time variation disappears. What is left is simply the constant phase factor $\omega_{laser}(t_2-t_1)$. Thus, despite the fact that the phase of the input field to the interferometer is varying in time, there is no time variation of the intensity at the output of the interferometer and thus no AC photocurrent produced. It is this absence of AC photocurrent that signals the fact that our chosen periodicity time $\tau=n(t_1-t_2)$.

Alternatively, this may be derived from Equation 15.

$$I = I_1 + I_2 + 2\sqrt{I_1 I_2} \cos\Delta\Phi \quad \text{Equation 15}$$
$$= I_1 + I_2 + 2\sqrt{I_1 I_2} \cos(\omega_{laser}(t_2-t_1) + \theta(t-t_1) - \theta(t-t_2))$$
$$= I_1 + I_2 + 2\sqrt{I_1 I_2} \cos(\omega_{laser}(t_2-t_1) + \theta(t') - \theta(t'+t_1-t_2))$$

The approach works for any time periodic signal. Here we consider the particular case of sinusoidal modulation of the phase of the input light to the interferometer. In this case, the phase modulation takes the form $$\theta(t)=\theta_0+\alpha \sin(\omega_m t+\delta). \quad \text{Equation 16}$$

Of course, a phase modulation produces a corresponding frequency modulation. In particular the instantaneous optical frequency of the source will be $$\omega_{laser} + \frac{\partial \theta(t)}{\partial t},$$

but note that the maximum value of the second term is $$\left.\frac{\partial \theta(t)}{\partial t}\right|_{max} = \alpha\omega_m.$$

And so, for an optical source ($\omega_{laser}\cong 2\pi\times 300$ THz) and a microwave modulation ($\omega_m\cong 2\pi\times 10$ GHz), we can safely assume that $$\omega_{laser} \gg \frac{\partial \theta(t)}{\partial t}$$

and so the change of the optical frequency of the source is negligibly small and I can simply assume that it is constant and always equal to $\omega_{laser}$.

The intensity (the sum of the two fields squared) at the detector is $$I = I_1 + I_2 + 2\sqrt{I_1 I_2} \cos\Delta\Phi \quad \text{Equation 17}$$
$$= I_1 + I_2 + 2\sqrt{I_1 I_2} \cos(\omega_{laser}(t_2-t_1) +$$
$$\theta(t-t_1) - \theta(t-t_2))$$
$$= I_1 + I_2 + 2\sqrt{I_1 I_2} \cos\{\omega_{laser}(t_2-t_1) +$$
$$\alpha[\sin(\omega_m(t-t_1)+\delta) - \sin(\omega_m(t-t_2)+\delta)]\}.$$

Using the sum-identities, we can write the time varying part of the phase difference (i.e. the time dependent part of the argument of the cos in the last line of Equation 17) as $$= \sin(\omega_m(t-t_1)+\delta) - \sin(\omega_m(t-t_2)+\delta) \quad \text{Equation 18}$$
$$= 2\cos\left(\frac{\omega_m(2t-t_1-t_2)+2\delta}{2}\right)\sin\left(\omega_m \frac{t_2-t_1}{2}\right)$$
$$= 2\cos(\omega_m(t-\bar{t})+\delta)\sin\left(\frac{\omega_m T}{2}\right)$$

where $T=t_1-t_2$ and $\bar{t}=(t_1+t_2)/2$. We note that the distances in the interferometer (encoded in the times $t_1$ and $t_2$) appear in two different ways in the time varying part of the phase difference. They show up in the phase of the time varying phase (i.e. in the term $\cos(\omega_m(t-\bar{t})+\delta)$ and in the amplitude of the time varying phase proportional to sin $$\left(\frac{\omega_m T}{2}\right).$$

Either of these variations could be used to determine something about the path lengths.

PSI measurements rely on the second term. In particular, when $\omega_m T/2=n\pi$, the AC variation of the intensity (and thus the AC photocurrent) vanishes (or reaches a minimum). This occurs when $\omega_m T=n2\pi$ or equivalently when $f_m=n/T$. Thus, by finding the smallest value of $f_m$ at which the AC photocurrent reaches a maximum, the time difference $T=t_1-t_2$ can be known.

Using the above expressions, we can re-write the intensity at the detector as $$I = I_1 + I_2 + 2\sqrt{I_1 I_2} \cos[\omega_{laser}(t_2-t_1) + \quad \text{Equation 19}$$
$$\alpha(\sin(\omega_m(t-t_1)+\delta) - \sin(\omega_m(t-t_2)+\delta))]$$
$$= I_1 + I_2 + 2\sqrt{I_1 I_2} \cos[-\omega_{laser}T -$$

-continued $$2\alpha \sin\left(\frac{\omega_m T}{2}\right)\cos(\omega_m(t-\bar{t})+\delta)\Big]$$

$$= I_1 + I_2 + 2\sqrt{I_1 I_2} \cos[\omega_{laser}T +$$

$$2\alpha \sin\left(\frac{\omega_m T}{2}\right)\cos(\omega_m(t-\bar{t})+\delta)\Big]$$

$$= I_1 + I_2 +$$

$$2\sqrt{I_1 I_2} \Big[\cos(\omega_{laser}T)\cos\Big(2\alpha \sin\Big(\frac{\omega_m T}{2}\Big)\cos(\omega_m t'')\Big) -$$

$$\sin(\omega_{laser}T)\sin\Big(2\alpha \sin\Big(\frac{\omega_m T}{2}\Big)\cos(\omega_m t'')\Big)\Big]$$

$$= I_1 + I_2 + I_{12}(t'')$$

where $I_{12}(t'')$ is the time varying part of the intensity, and $t'' \equiv t-\bar{t}+\delta/\omega_m$ Using the real-valued expressions of the Jacobi-Anger expansion, we can write the time varying interference term of the intensity at the detector as $$\frac{I_{12}(t'')}{2\sqrt{I_1 I_2}} = \cos\omega_{laser}T\cos\Big(2\alpha \sin\Big(\frac{\omega_m T}{2}\Big)\cos(\omega_m t'')\Big) - \qquad \text{Equation 20}$$

$$\sin\omega_{laser}T\sin\Big(2\alpha \sin\Big(\frac{\omega_m T}{2}\Big)\cos(\omega_m t'')\Big)$$

$$= \cos\omega_{laser}T\cos(z\cos\Theta) - \sin\omega_{laser}T\sin(z\cos\Theta)$$

$$= \cos\omega_{laser}T\Big[J_0(z) + 2\sum_{n=1}^{\infty} (-1)^n J_{2n}(z)\cos(2n\Theta)\Big] +$$

$$\sin\omega_{laser}T\Big[2\sum_{n=1}^{\infty} (-1)^n J_{2n-1}(z)\cos((2n-1)\Theta)\Big]$$

$$= \cos\omega_{laser}T[J_0(z) - 2J_2(z)\cos 2\Theta + \cdots$$

$$\sin\omega_{laser}T[-2J_1(z)\cos\Theta + 2J_3(z)\cos\Theta + \cdots$$

where $z=2\alpha \sin(\omega_m T/2)$ and $\Theta=\omega_m t''$, and $J_n(z)$ is the $n^{th}$ Bessel function of the first kind evaluated at z. The first term $J_0(z)\cos \omega_{laser}T$ is the DC part of this term. All of the other time varying terms are proportional to $J_n(z)$ and will vanish when z=0. These zeros in the AC photocurrent as measured by the detector will occur when $\omega_m T/2=n\pi$ Here we discuss briefly the character of the RF power minima (zeros) in the Modulation Frequency Changing PSI method where the optical phase modulation is sinusoidal and at $f_m$. We consider the interferometer pictured above with a time delay difference defined by the round trip time of light to and from a target placed a distance d (denoted L in the picture above) from the beam splitter, the value of $T=t_1-t_2=2$ d/c. We can compute the frequencies at which the RF power vanishes by finding the zeros of $z=2\alpha \sin(\omega_m T/2)$. They are $$\omega_m T/2 = n\pi \qquad \text{Equation 21}$$

$$2\pi f_m^{(n)} T = n2\pi$$

$$f_m^{(n)} \frac{2d}{c} = n$$

$$f_m^{(n)} = n\frac{c}{2d}$$

$$f_m^{(n)} = nf_0$$

The location of the 1st zero and the spacing between adjacent zeros is denoted $$f_0 = \frac{c}{2d}$$

where d is the distance to the target from the beam splitter and thus 2d is the round-trip-distance. In terms of the total path length difference s between the arms of the interferometer, $$f_0 = \frac{c}{s}.$$

Figure 2:
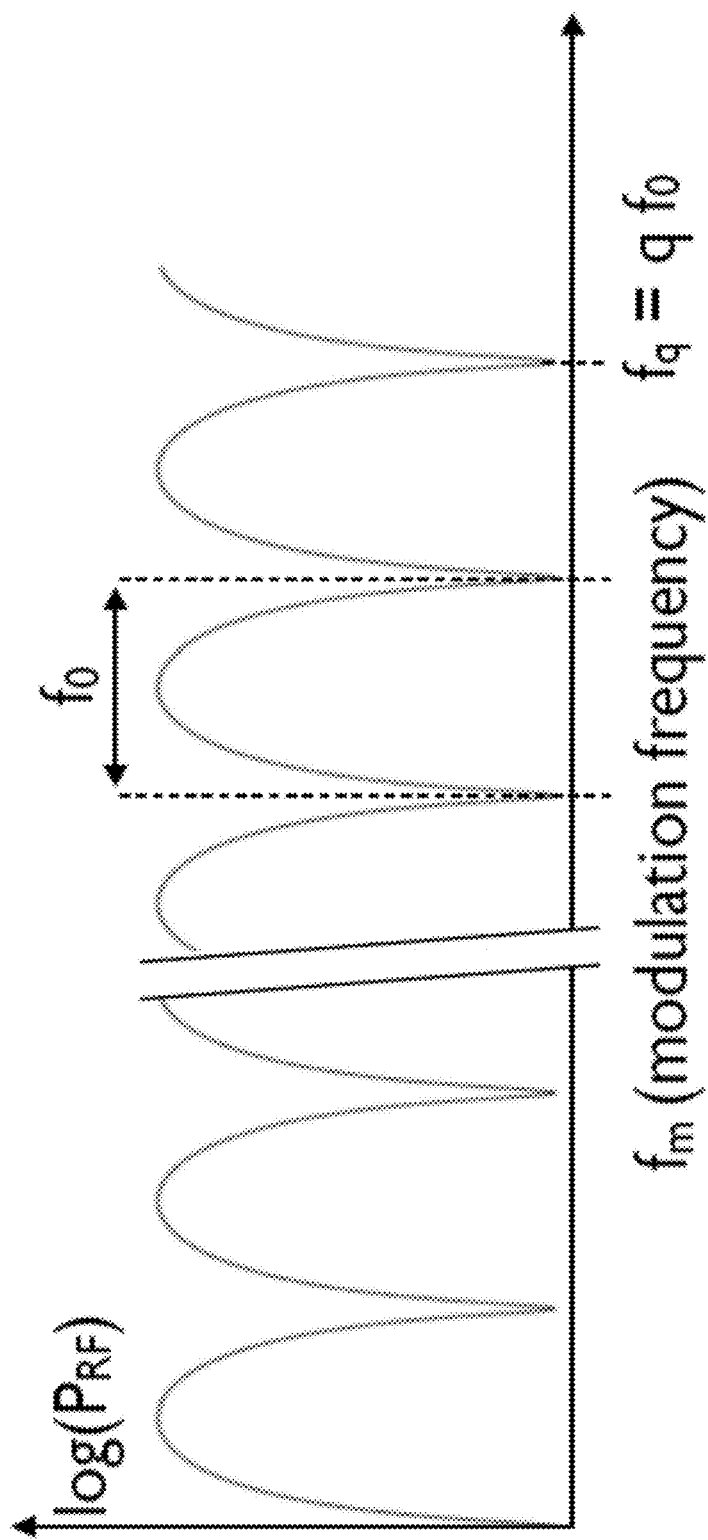
FIG. 2 is a plot of predicted AC photocurrent power (logarithmic scale) at the modulation frequency as a function of the modulation frequency according to embodiments of the present disclosure.

Referring to FIG. 2, a plot is provided of predicted AC photocurrent power according to embodiments of the present disclosure. Predicted AC photocurrent power is plotted on a log scale at the phase modulation frequency produced by the interferometer (i.e. $(J_1(z))^2$ for small values of z) as a function of the modulation frequency. The minima of the AC photocurrent power occur when $\omega_m T/2=q\pi$ where q=0, 1, 2, . . . . Equivalently, the zeros occur when the modulation frequency hits a "resonance" defined as $f_m=qf_0$ where $$f_0 = \frac{c}{D} = \frac{c}{2d}$$

where d is the range to the target (in the context of range finding) and thus D=2d is the round trip distance and thus the path length difference in the interferometer.

We now consider the option of using PSI to do range finding where the phase of the modulation of just the local oscillator is stepped instead of changing the frequency of the modulation for both the local oscillator and the range arm. As before, we consider pure sinusoidal modulation of the phase of the input light to the interferometer, but the local oscillator is generated by phase modulation of the light using a separate EOM driven by a separate frequency generator with a variable phase offset with respect to the transmit frequency generator. The local oscillator is then injected into the interferometer. In this case, the phase modulation for the transmitted arm and the local oscillator arms are, after propagating through the interferometer and to the detector, of the form:

$$\theta(t-T)=\alpha \sin(\omega_m(t-T)).$$

$$\theta_{LO}(t-t_{LO})=\alpha_{LO} \sin(\omega_m(t-t_{LO})+\delta_{LO}). \qquad \text{Equation 22}$$

where $t_{LO}$ is the time it takes the light to propagate from the local oscillator eom to the detector, and T is the time it takes the light to propagate from the transmit EOM to the target and back to the detector. The intensity at the detector is $$I = I_1 + I_2 + 2\sqrt{I_1 I_2} \cos(\omega_{laser}(t_{LO}-T) + \qquad \text{Equation 23}$$

$$\theta(t-T) - \theta_{LO}(t-t_{LO}))$$

$$= I_1 + I_2 + 2\sqrt{I_1 I_2} \cos\{(\omega_{laser}(t_{LO}-T) + \alpha[\sin(\omega_m(t-T)) - \sin(\omega_m(t-t_{LO}) + \delta_{LO})]\}.$$

where for the moment, I have assumed that $\alpha=\alpha_{LO}$. Using the sum-identities, we can write the time varying part of the phase difference as $$= \sin(\omega_m(t-T)) - \sin(\omega_m(t-t_{LO}) + \delta_{LO})$$

$$= 2\cos\left(\frac{\omega_m(2t - T - t_{LO}) + \delta_{LO}}{2}\right)\sin\left(\omega_m\frac{t_{LO} - T}{2} - \delta_{LO}\right)$$

$$= -2\cos(\omega_m(t - \bar{t}) + \delta_{LO}/2)\sin\left(\frac{\omega_m T}{2} + \delta'_{LO}\right)$$

Equation 24 where in the last expression, the phase offset is redefined to include the local oscillator time delay so that $\delta_{LO}' = \delta_{LO} - \omega_m t_{LO}$. We now see that the RF photocurrent will vanish when $$\frac{\omega_m T}{2} + \delta'_{LOL} = n\pi$$

Equation 25

The point is to vary $\delta_{LO}'$ until the photocurrent vanishes. Clearly, $\delta_{LO}$ need only be scanned through $\pi$. If we take $N_{samples}$, then the uncertainty in the location of the phase that minimizes the photocurrent is $$\Delta \delta_{LO}/\pi = \frac{1}{2N_{samples}}.$$

Once a minimum is found the time-of-flight for the range is $$T = \frac{n 2\pi - 2\delta'_{LO}}{2\pi f_m} = \frac{n - \frac{\delta'_{LO}}{\pi}}{f_m}$$

Equation 26 the corresponding range is $$d = \frac{1}{2}cT = \frac{1}{2}c\left(\frac{1}{f_m}\right)\left(n - \frac{\delta'_{LO}}{\pi}\right) = \left(\frac{\lambda_m}{2}\right)\left(n - \frac{\delta'_{LO}}{\pi}\right)$$

Equation 27 and the range accuracy is the same as for the modulation frequency changing method (assuming the value of n is known and assuming the uncertainty in the modulation frequency itself, i.e. $f_m$, is negligible)

$$\Delta d = \frac{1}{2}cT = \frac{1}{2}c\left(\frac{1}{f_m}\right)\left(\frac{\Delta \delta'_{LO}}{\pi}\right) = \frac{1}{2}c\left(\frac{1}{f_m}\right)\left(\frac{1}{2N_{samples}}\right)$$

$$= \left(\frac{\lambda_m}{2}\right)\left(\frac{1}{2N_{samples}}\right).$$

Equation 28 where we have assumed that $N_{samples}$ samples are taken as $\delta_{LO}'$ is changed by $\pi$.

Once a minimum is found, the time-of-flight for the range is known up to some unknown multiple of $1/f_m$. The corresponding distance ambiguity is $$\frac{\lambda_m}{2} = 15 \text{ cm for } f_m = 1 \text{ GHz and } 1.5 \text{ m for } f_m = 100 \text{ MHz}.$$

A rough estimate of the range can be obtained by measuring the delay for the RF power to begin after launching light in the range arm of the interferometer, or by using a separate device measuring time-of-flight by some other means. If an approximate determination of the delay $\overline{T}$ with a timing uncertainty of $\Delta T$ is measured, then we can determine the integer n for a given modulation frequency since $$\overline{T} \simeq \left(\frac{1}{f_m}\right)\left(n - \frac{\delta'_{LO}}{\pi}\right)$$

Equation 29 where $\frac{\delta_{LO'}}{\pi}$ is a yet to be determined "zero" phase value between 0 and 1. Thus $$n = \text{int}(f_m \overline{T}) + 1$$

$$\delta n = (f_m \Delta T)$$

Equation 30 where in order to find the unique value of n without ambiguity we need that the uncertainty in the determination of n to be less $\delta n < 1$.

A second method to resolve the distance ambiguity is to find the phase that minimizes the AC photocurrent for two different modulation frequencies. This method works best when the two modulation frequencies are incommensurate (i.e. their ratio cannot be expressed as a ratio of whole numbers), for example two unequal, prime numbers.

The aim of this section is to discuss in detail the character of the RF power minima (zeros) in the Modulation Frequency Changing PSI method where the optical phase modulation is sinusoidal and at $f_m$.

As before, we consider an interferometer with a time delay difference defined by the round trip time of light to and from a target placed a distance d (denoted L in the picture above) from the beam splitter, the value of $T = t_1 - t_2 = 2d/c$. We can compute the frequencies at which the RF power vanishes by finding the zeros of $z = 2\alpha \sin(\omega_m T/2)$. They are $$\omega_m T/2 = n\pi$$

$$2\pi f_m^{(n)} T = n 2\pi$$

$$f_m^{(n)} \frac{2d}{c} = n$$

$$f_m^{(n)} = n\frac{c}{2d}$$

$$f_m^{(n)} = n f_0$$

Equation 31

The location of the 1st zero and the spacing between adjacent zeros is denoted $$f_0 = \frac{c}{2d}$$

where d is the distance to the target from the beam splitter and thus 2d is the round-trip-distance. In terms of the total path length difference s between the arms of the interferometer, $$f_0 = \frac{c}{s}.$$

The variation of the location of the $n^{th}$ zero with a target distance change ($\Delta d$) is given by $$\frac{\partial f_m^{(n)}}{\partial d} = n \frac{\partial f_0}{\partial d} = n \frac{c}{2d}\left(-\frac{1}{d}\right) = nf_0\left(-\frac{1}{d}\right)$$

$$\Delta f_m^{(n)} = nf_0\left(-\frac{\Delta d}{d}\right)$$

$$\Delta f_m^{(n)} = f_m^{(n)}\left(-\frac{\Delta d}{d}\right)$$

Equation 32

Using this, we can express the fractional movement of the location of the $n^{th}$ zero with respect to the frequency of this feature as $$\frac{\Delta f_m^{(n)}}{f_m^{(n)}} = \left(-\frac{\Delta d}{d}\right)$$

Equation 33

The fractional change in path length difference is equal to the fraction change of the zero position. However, it is useful to express the movement of the location of the $n^{th}$ zero with distance in units of the zero separation ($f_0$). The zero separation sets the scale for the narrowness of the zero feature and the resolution is related to how much the feature moves compared to its width. Thus, we write $$\frac{\Delta f_m^{(n)}}{f_0} = n\left(-\frac{\Delta d}{d}\right)$$

$$\frac{\Delta f_m^{(n)}}{f_0} = \frac{n}{d}(-\Delta d)$$

$$= \frac{c}{2}\frac{n}{d}(-\Delta d)\frac{2}{c}$$

$$= f_m^{(n)}(-\Delta d)\frac{2}{c}$$

$$\frac{\Delta f_m^{(n)}}{f_0} = \frac{-2\Delta d}{\lambda_m}$$

Equation 34 where $\lambda_m = c/f_m$ is the characteristic wavelength of the RF modulation frequency at which we see the $n^{th}$ zero. For example, when $f_m = 1$ GHz, $\lambda_m \cong 30$ cm. If we were concerned with the change in the $n^{th}$ zero position compared to the zero separation for a change in the total path length $\lambda s$, the expression is without the factor of two $$\frac{\Delta f_m^{(n)}}{f_0} = \frac{\Delta s}{\lambda_m}$$

Equation 35

We express this zero position movement in this way (in terms of $\lambda_m$) because the factor n/d is constrained by the highest frequency available for $f_m$. That is, the available values of n and d are linked by the highest modulation frequency at our disposal. Thus, it is more illuminating to express their ratio as something proportional to $1/\lambda_m$. Equation 35 also illustrates a very important feature of this technique—that the resolution only depends on the modulation frequency and does not depend on the choice of d. Instead, the choice of d sets the frequency scale ($f_0$) over which one must look to find the minima.

Suppose a single minimum is found at $f_m = f_m^{(q)} = qf_0$. If the nominal path length difference 2d is known such that the value of q is constrained and known, then the range is simply $f_0 = f_m^{(q)}/q$. However, if the path length difference could be so different from the nominal path that the value of q is not known, then the location of at least one more minimum is required to determine q. A natural question is what precision should the location of these two zeros be known to unambiguously determine q.

The most dramatic shift of a zero location is when it moves an amount equal to half the zero separation so that a previous maximum becomes the minimum, thus when $$\frac{\Delta f_m^{(n)}}{f_0} = 1/2.$$

This occurs when $\Delta d = \Delta_m/4$. We note that when $\Delta d = \lambda_m/2$, the $n^{th}$ zero moves to where the $(n-1)^{th}$ zero was previously. This is the limit ($\Delta d \leq \lambda_m/2$) for an unambiguous range determination from the observation of a single minimum. Thus, when the nominal value of d is known and the full range of interest is small (i.e. $\Delta d$ is constrained), then we may, to avoid the need to observe two zeros to resolve any potential ambiguity, choose $\lambda_m \geq 2\Delta d_{max}$.

Finding the locations of any two zeros is sufficient to find the range ($f_0$) since their locations on the frequency axis will be related by a rational fraction $$\frac{f_m^{(p)}}{f_m^{(q)}} = \frac{f_0 p}{f_0 q} = \frac{p}{q}$$

Equation 36

When two zeros are adjacent or next to adjacent, their difference (p−q) will be much smaller than their value (p or q) and the ratio of the value to the difference in values will be a quantity very close to an integer or a half integer $$\frac{f_m^{(p)}}{f_m^{(q)} - f_m^{(p)}} = \frac{p}{r} \geq 1$$

Equation 37

Assuming the integer or half integer value of $$\frac{p}{r}$$

can be found without uncertainty, then there is no ambiguity in the range.

By definition, the minimum resolvable distance change $\Delta d$ produces a frequency change just large enough to resolve. If we use Equation 35, we can express the frequency change as $$\Delta f_m^{(n)} = f_0 \frac{-2\Delta d}{\lambda_m}.$$

If our frequency resolution is determined by the frequency step size in our sampling set, then we have that $$\Delta f_m^{(n)} \geq \frac{\Delta f_{sample}}{2}$$

Equation 38

$$f_0 \frac{-2\Delta d}{\lambda_m} \geq \frac{\Delta f_{sample}}{2}$$

$$\Delta d \geq \frac{\lambda_m}{2} \frac{\Delta f_{sample}}{2 f_0}$$

$$\Delta d \geq \frac{\lambda_m}{2} \frac{1}{N_{samples}}$$

where we define $N_{samples}$ as the number of samples taken in an interval of length $2f_0$ so as to be sure we capture two minima.

Because the resolution is independent of the nominal value of d, we have the freedom to choose d as we like. The bandwidth over which we must look to find two adjacent zeros is given by $f_0$. Thus, we see that by choosing d large (equivalently T large), this bandwidth over which we need to look can be made arbitrarily small. This has some advantages in that it relaxes the requirements for spectral flatness (e.g. gain flatness) our entire signal chain from emitter to detector. The only fundamental constraint is that d must not be chosen to lie outside of the coherence length of our laser source.

As described above, finding two consecutive minima with sufficient precision provides a first guess at the value of $f_0$ and thus allows the integer value of p $$p = \text{Round}\left(\frac{f_m^{(p)}}{f_0}\right) \simeq \text{int}\left(\frac{f_m^{(p)}}{f_m^{(q)} - f_m^{(p)}}\right) \qquad \text{Equation 39}$$

corresponding to the $p^{th}$ zero located at $f_m^{(p)}$ to be determined. Assuming p can be known without ambiguity, then the range is simply $$f_0 = \frac{f_m^{(0)}}{p} \qquad \text{Equation 40}$$

and the uncertainty in the range is $$\delta f_0 = \frac{\delta f}{p} = \frac{f_{step}}{2p} \qquad \text{Equation 41}$$

where $\delta f$ is the uncertainty in the determination of $f_m^{(P)}$ and is equal to half the frequency step size.

Another way of getting a first guess at the value of $f_0$ is to observe the delay ($T_0$) between when the RF is applied to the light and when the RF produced by the interferometer appears. In fact, for each measurement of the RF power, this "turn-on" timing should be determined as this provides a better and better estimate of $f_0$ and provides a "sanity check". This delay time $$\left(T_0 = \frac{1}{f_0}\right)$$

has an uncertainty $\Delta T_0$ that is fundamentally set or limited by the dispersion in the settling time of the RF electronics and the sampling rate of the ADC monitoring the RF power. This method for finding $f_0$ is also key because it determines the range over which one needs to scan to find a zero ($f_0$). The error for this initial estimate $$f_0 = \frac{1}{T_0} \text{ is } \delta f_0 = f_0 \frac{\Delta T_0}{T_0}.$$

If we now look and find a particular power minimum at the frequency $f_m^{(P)}$ (that is close to the actual zero at $pf_0$), we can construct a quantity close to the value of p for that zero using this first guess for $f_0$, we have $$P = \left(\frac{f_m^{(p)}}{f_0}\right) = f_m^{(p)} T_0 \qquad \text{Equation 42}$$

In order for Round(P)=p, we need that the error in P be smaller than 1.

$$\delta P = \frac{\partial (f_m^{(p)} T_0)}{\partial f_m^{(p)}} \delta f + \frac{\partial (f_m^{(p)} T_0)}{\partial T_0} \Delta T_0 < 1 \qquad \text{Equation 43}$$

$$\delta P = T_0 \delta f + f_m^{(p)} \Delta T_0 < 1$$

$$\delta P = \frac{f_{step}}{2 f_0} + f_m^{(p)} \Delta T_0 < 1$$

$$\delta P = \frac{1}{2 N_{samples}} + f_m^{(p)} \Delta T_0 < 1$$

where we are now defining $N_{samples} = f_0 / f_{step}$ as the number of samples taken in a span $f_0$ wide. Since $N_{samples}=5$ is a reasonably small number and makes the first term negligible, we find that the second term is dominant and determines where we should look to find the $p^{th}$ zero. In particular, we should have $f_m^{(p)} \Delta T_0 < 1$ and thus, we need to search for a zero below the frequency $1/(\Delta T_0)$. For example, we should search in the range $$f_m \in \left[\frac{1}{\Delta T_0}, \frac{1}{\Delta T_0} - f_0\right] \qquad \text{Equation 44}$$

Once we find a zero in this range, we can compute without ambiguity the value of p. This integer p will be on the order of $$p \simeq f_m^{(p)} T_0 = \frac{T_0}{\Delta T_0} \qquad \text{Equation 45}$$

and thus the range can be computed using $$f_0 = \frac{f_m^{(p)}}{\text{Round}(f_m^{(p)} T_0)} \qquad \text{Equation 46}$$

and the error in the range will be $$\delta f_0 = \frac{\delta f}{\text{Round}(f_m^{(p)} T_0)} \simeq \frac{f_{step}}{2 \frac{T_0}{\Delta T_0}} = f_0 \frac{1}{2} f_{step} \Delta T_0 \qquad \text{Equation 47}$$

-continued $$\frac{\delta f_0}{f_0} \simeq \frac{1}{2} f_{step} \Delta T_0 = \frac{f_0}{2N_{samples}} \Delta T_0$$

Recall that the range is given by $$d = \frac{1}{2} c \left(\frac{1}{f_0}\right) \qquad \text{Equation 48}$$

and thus the error or uncertainty in the range is $$\Delta d = \frac{1}{2} c \left(\frac{1}{f_0}\right) \frac{\delta f_0}{f_0} = \frac{1}{2} c \left(\frac{1}{f_0}\right) \frac{f_0 \Delta T_0}{2N_{samples}} = \frac{1}{2} c (\Delta T_0) \frac{1}{2N_{samples}} \qquad \text{Equation 49}$$

As an example, let's suppose that our timing error on the RF turn on time is $\Delta T_0 = 1$ ns. This is a reasonable estimate assuming we have a 1 GHz ADC and the settling time of our RF power meter is also around 1 ns. Any signal latency can be measured beforehand and we need only that the latency dispersion is less than 1 ns. In this case, our range error or uncertainty will be $$\Delta d(\Delta T_0 = 1 \text{ ns}) = \frac{15 \text{ cm}}{2N_{samples}} \qquad \text{Equation 50}$$

Figure 3:
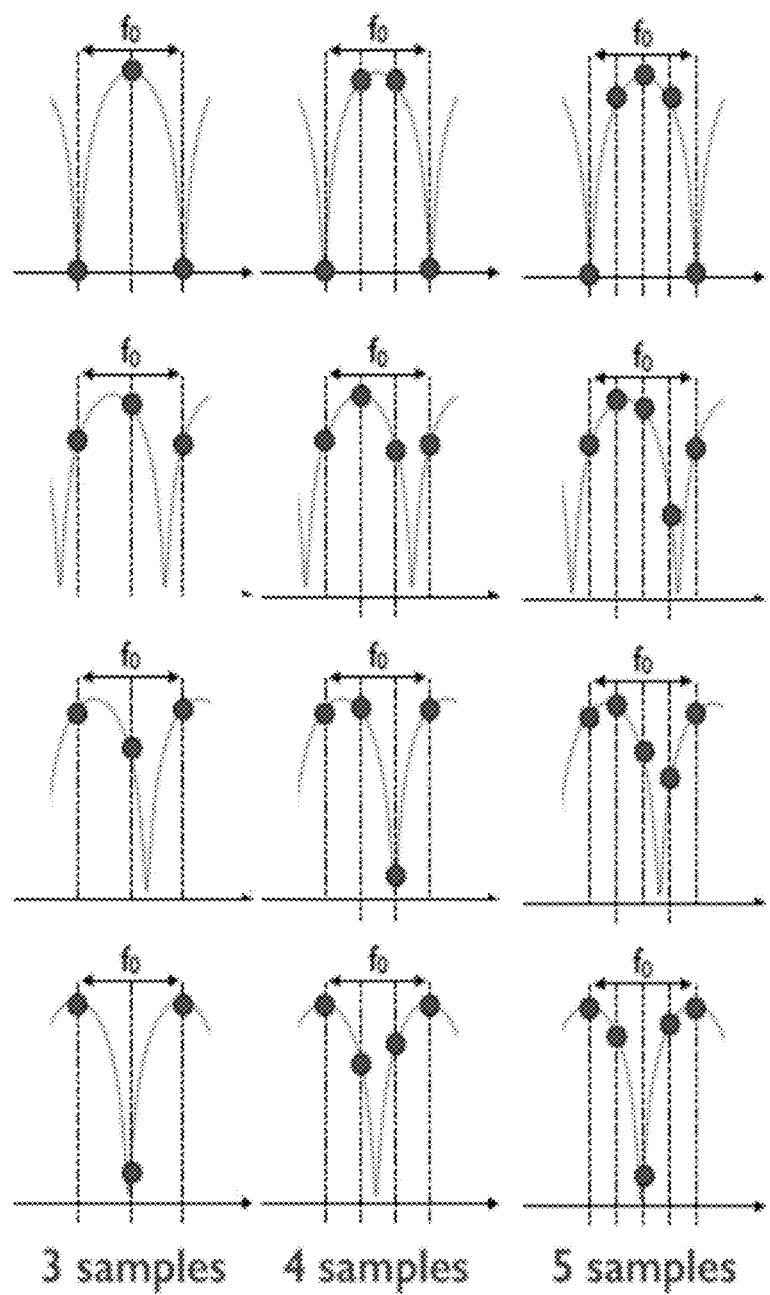
FIG. 3 is a plot of exemplary discrete sampling relative to an exemplary phase modulation frequency waveform according to embodiments of the present disclosure.

Referring to FIG. 3, exemplary discrete sampling is plotted relative to an exemplary RF waveform. This figure illustrates the discrete sampling of an RF power waveform versus modulation frequency with 3, 4, and 5 samples over a range of width $f_0$. As shown, the sample with the minimum power is within a distance $f_{step}/2$ of the actual minimum.

The present disclosure provides for the measurement of the path length difference in an interferometer. It is also provides for the use of interferometers to measure a linear distance or range to some target where the target is introduced into one of the arms of the interferometer. Various exemplary embodiments are described in terms of Michelson or Mach-Zehnder interferometers wherein a light source is split into two beams which propagate via two separate paths and are recombined at a detector. If the optical path length differs between the two paths, then an interference effect is produced at the detector resulting in a variation of the detected light intensity. In such a setup, the optical path length difference can be extracted from the time variation of the light intensity at the detector.

Various range finding techniques may utilize an interferometer and photodetector as the basis for a range measurement. Such techniques can be categorized in terms of the nature of the light source illuminating the interferometer and the method for extracting the path length difference from the variation of the light intensity at the detector.

Intensity modulation of a monochromatic light source can be used to determine range without the use of an interferometer by measuring the time delay of the intensity modulation observed on the illumination "echo"—i.e. the light reflected from the target being measured. However, when realized with an interferometer, the detection sensitivity is greatly improved. One example of range measurements utilizing intensity modulation involves a time-periodic modulation of the intensity of a monochromatic light source illuminating the interferometer where the modulation consists of one or more RF modulation frequencies. The optical detector functions as a mixer of the return light and a local oscillator beam, and the interference signal produces a photocurrent at the detector including the original RF modulation frequencies. The distance measurement is represented by a phase shift of the detected RF signals when compared to reference RF signals of the same frequencies. Thus, the distance measurement involves a periodic amplitude modulation of the source and a measurement of the phase of the RF signal produced by the interference.

Another approach to distance measurement involves the optical frequency modulation of a continuous-wave (FMCW) laser source illuminating the interferometer. Sawtooth-wave optical FMCW sources and triangular-wave optical FMCW sources both involve a linear-in-time sweep of the frequency of a monochromatic source at a rate G [Hz/s]. The interference of the two beams at the detector produces a time-periodic photocurrent whose frequency is equal to the product GT, where T is the time difference for light to propagate along the two paths. Thus a measurement of the frequency of the resulting interference signal provides information about path length difference and thus the range to the target. This linear-in-time frequency sweep of the source is equivalent to a quadratic-in-time phase variation and can be produced in many different ways including directly by the laser producing the light or by manipulating the light after generation with a frequency shifting device, a phase shifting device, or an intensity modulating device. In any case, the distance measurement involves a linear frequency variation (or "chirp") of the optical frequency of the source and a measurement of the frequency of an RF signal produced by the interference. Herein, we will refer to such methods as frequency chirped LIDAR.

Other FMCW methods involve a sinusoidal modulation of the optical frequency (or equivalently the phase) of the light source illuminating the interferometer. Such sinusoidal-wave optical FMCW interference can be analyzed in several ways to determine the range to the target. The average frequency of the photocurrent can be measured and related to the target range. Alternatively, the phase of the AC photocurrent generated can be related to the range. The distance measurement involves a measurement of the phase of the RF signal produced by the interference. As with the intensity modulation example discussed previously, the RF signal phase is determined by comparison with a local-oscillator at the same frequency but having a fixed phase.

In all of these methods for range-resolved interferometric signal processing, the range is obtained by a measurement of either the phase or frequency of the RF signal produced by the interferometer. Each type of measurement requires a certain acquisition time and the range uncertainty increases as the signal-to-noise of the interference signal decreases.

For the case of phase based range measurements, the range acquisition can be extremely rapid since a phase measurement of the RF signal produced by the interferometer can, theoretically, be made in a single period of the modulation frequency, $f_m$. Thus, the acquisition is proportional to $1/f_m$. An uncertainty of $\Delta \phi$ in the phase determination of the RF signal leads to an uncertainty in the propagation time for light through the interferometer of $\Delta t = \Delta \phi / (2\pi f_m)$ and an uncertainty in the range $\Delta d = (c/2) \Delta \phi / (2\pi f_m)$ where $f_m$ is the amplitude modulation frequency and c is the speed of light in the interferometer. Here the "range" $\Delta d$ corresponds to half of the path length difference of the two arms of the interferometer. If we express the phase uncertainty, $\Delta\phi$, in terms of the cycle uncertainty $\Delta_{cycle}=\Delta\phi/2\pi$, then the range uncertainty is $\Delta d=(c/2)\Delta_{cycle}/f_m$. It is evident that both the range acquisition speed and the range uncertainty is improved by increasing $f_m$, but this comes at the cost of a shorter ambiguity range ($c/(2f_m)$). However, it has been shown that by modulating at several different frequencies and performing phase measurements at each of these frequencies, the distance ambiguity can be resolved and the range increased. Evidently, $f_m$ should be chosen as large as possible. If we restrict the discussion to applications where only a single modulation frequency is used, we would choose $f_m=f_{m,max}=c/(2d_{max})$ where $d_{max}$ is the maximum range variation that can be measured due to the distance ambiguity. In this case, the range uncertainty is $\Delta d = \Delta_{cycle}d_{max}$, and the measurement is acquired in a time $t_{min}=f_{m,max}^{-1}=2d_{max}/c$. If this acquisition time is shorter than the measurement time $T_{mes}$ allowed, then averaging can be performed and the uncertainty can be reduced. In particular $\Delta d_{avg}=\Delta d/\sqrt{N}$ where $N=T_{mes}/t_{min}=cT_{mes}/(2d_{max})$. Thus $\Delta d_{avg}=d_{max}\Delta_{cycle}/\sqrt{2d_{max}/(cT_{mes})}$. In this case, we see that the range uncertainty is improved through averaging by an amount $\sqrt{f_{m,max}T_{mes}}$.

Although range determinations using phase measurements can be made very quickly, the primary challenge is maintaining accuracy when the signal levels change. In short, accurate phase detection can be challenging due to the non-ideal behavior of RF mixers (used in analog IQ demodulators). RF mixers exhibit a DC offset due to non-perfect balancing of the transformer, and this DC offset leads to a phase determination error that increases dramatically as the input amplitude to the mixer drops below the magnitude of the DC offset. Since the DC offset is proportional to the amplitude of the local oscillator input to the mixer and the degree of imbalance, this limits the usable dynamic range for RF input of the mixer to the degree of imbalance (typically less than 30 dB). While a feedback loop with gain control of the RF input to the mixer can be used to maintain the RF input to the mixer in the usable range and thus increase the dynamic range of the detection, such electronic gain stages invariably introduce a gain dependent phase shift further complicating an accurate phase determination. While there do exist methods to stabilize an RF level without introducing an attenuation or gain dependent phase shift, for example by encoding the RF onto an optical carrier and using an electro-optic or acousto-optic to vary the optical power and thus the RF power after conversion by a photodetector, such methods are impractical in applications where many detectors are needed since each detection loop requires its own feedback control. Alternatively, the DC offset can be measured and the mixer can be fully characterized for a variety of input levels allowing measurements to be made despite its non-ideal behavior. However, a mixer's non-ideal behavior will change over time due to component aging and environmental perturbations. In summary, high speed and high accuracy phase detection can be achieved with analog methods, but due to technical limitations of mixers, range methods that involve phase detection have associated dynamic ranges limited to 30 dB.

In the previous discussion, it was assumed that the phase of the RF signal is being measured by means of analog electronics. If digital methods are employed, the phase or cycle uncertainty is limited by the timing resolution, $T_{res}$, of the system monitoring the signal at frequency $f_m$. This timing resolution is mainly limited by the timing jitter of the electronic detection system and the signal-to-noise ratio (SNR) at the input of the electronic detection system. In particular, $\Delta_{cycle}=T_{res}f_m$. Since state-of-the-art digital sampling systems have timing resolutions (at best) on the order of $T_{res}\cong 10$ ps, then with $f_m=10$ GHz, $\Delta_{cycle}=10$, and clearly analog methods are superior.

For the case of frequency based range measurements (frequency chirped FMCW LIDAR), the frequency of the resulting interference signal is much smaller than the modulation frequency and so a measurement of this frequency may be done using digital methods. As discussed above, this frequency is $f_b=GT$ where G is the optical frequency chirp rate and T is the time difference for light to propagate along the two paths of the interferometer. While frequency counters can be used to determine $f_b$, the best accuracy is obtained when $f_b$ is on the order of but slightly larger than $1/T_{mes}$ such that the AC photocurrent exhibits a single (or half of an) oscillation period during the measurement time $T_{mes}$. In this case, the frequency is determined by measuring the timing between zero crossings of the AC signal. The uncertainty in the range measurement is given by $\Delta d=(c/2)T(T_{res}/T_{mes})$ where T is the time difference for light to propagate along the two paths of the interferometer, and $T_{res}$ is the timing resolution for the measurement. $T_{res}$ is mainly limited by the total timing jitter of the measurement system and includes the timing jitter of the electronic detection system, the timing jitter of the electronic chirp generator (or equivalently the linearity of the optical frequency chirp), and the signal-to-noise ratio (SNR) at the input of the electronic detection system. From this expression, it is clear that the range uncertainty is minimized by making T, the time difference for the two interferometer arms, as small as possible. The smallest T can be is determined by the chirp rate, G, since we must have that at least one period of oscillation occurs during the measurement time and that $f_b>1/T_{mes}$, thus $f_b=GT>1/T_{mes}$ implies that $T>1/(GT_{mes})$. The optimal range uncertainty that can be obtained is $\Delta d>c/(2GT_{mes})(T_{res}/T_{mes})$ [Opt. Express 23, 5117-5125 (2015)]. In the limit of very low signal-to-noise ratio at the input of the electronic detection system, the timing resolution for the zero crossings becomes $T_{res}\cong f_b/(2\pi SNR)$ and the optimal range uncertainty is $\Delta d>c/(2GT_{mes})/(2\pi SNR)$.

In contrast to phase detection schemes where the range acquisition speed and the range accuracy both improve with increasing modulation frequencies (but at the cost of smaller ambiguity ranges), the range accuracy of frequency chirped method degrades in proportion to the square of the acquisition rate $f_{mes}^2=T_{mes}^{-2}$ or, in the case of low SNR, in proportion to the acquisition rate. On the other hand, there is no range ambiguity problem for the frequency chirped range method and thus no additional processing overhead required to resolve this ambiguity. Nevertheless, the range is limited to a distance of $d_{max}=2cT_{mes}$ by the finite measurement time.

The resolution limits for frequency based range measurements are summarized as:

$$\Delta d \geq \frac{1}{2}c\left(\frac{1}{GT_{mes}}\right)\left(\frac{T_{res}}{T_{mes}}\right) \text{ when } \frac{T_{mes}}{T_{res}} \ll 2\pi SNR \quad \text{Equation 51}$$

$$\Delta d \geq \frac{1}{2}c\left(\frac{1}{GT_{mes}}\right)\left(\frac{1}{2\pi SNR}\right) \text{ when } \frac{T_{mes}}{T_{res}} \gg 2\pi SNR$$

The resolution limit for phase based range measurements is $$\Delta d \geq \frac{1}{2} c \left(\frac{1}{f_m}\right) \left(\frac{\Delta_{cycle}}{\sqrt{f_m T_{mes}}}\right) \quad \text{Equation 52}$$

where $f_m T_{mes}$ is assumed to be larger than 1 such that averaging can be performed to reduce the uncertainty. These expressions reveal similarities in the scaling of the measurement uncertainty with bandwidth of the frequency chirped source ($GT_{mes}$ is the frequency sweep range) in the case of frequency based range measurements or with the modulation frequency in the case of phase based range measurements. In particular, we find that the two methods have the similar resolutions (for very short measurement times where the resolution is limited by the SNR) when the chirp rate $G \cong f_m^{3/2} T_{mes}^{-1/2}$. If we neglect the advantage of averaging in the case of phase measurements, we can see that the resolutions are comparable when $GT_{mes} \sim f_m$.

Because the production of a large and linear chirp rate, G, is more difficult than producing a single tone sine at $f_m$, it is evident that for applications where the measurement time is short and the modulation frequency can be chosen to be a very large value (because the dynamic range of the distance measurements is small and changes in the interferometer path length differences are within a this ambiguity range), phase based range measurements have a superior resolution to frequency based range measurements. For example, typical chirp rates achieved using electro-optic modulation techniques are $G \cong 10^{13}$ Hz/s. For $T_{mes}=1$ µs, $GT_{mes}=10$ MHz and a phase measurement with a modest modulation frequency of $f_m=1$ GHz is clearly superior.

Chirp rates of up to $G=10^{17}$ Hz/s may be obtained using Frequency Shifted Feedback lasers. An increase of G by a factor of $10^4$ allows for measurements with the same resolution to be achieved in a factor of 100 less time. However, because the comb elements produced by FSF lasers are not mutually phase coherent. The signal-to-noise ratio is thus worse than in the example discussed above, and this limited signal-to-noise will prevent a full realization of this speed factor. Given the measurement is limited by the SNR, the relevant comparison is between $GT_{mes}$ and $f_m^{3/2} T_{mes}^{1/2}$. Thus if $f_m > (G^2 T_{mes})^{1/3}$, then the phase based measurement is superior. If we assume the measurements are limited by the SNR and that $G=10^{17}$ Hz/s and a measurement time of $T_{mes}=1$ µs, then when $f_m \geq 2.1$ GHz the phase based method is superior. On the other hand, the $1/T_{mes}^2$ dependence (or $1/T_{mes}$ dependence for low SNR) in opposition to the $1/\sqrt{T_{mes}}$ dependence for phase-based range measurements implies that frequency-based range measurements are vastly superior in resolution when measurement times are long.

The present disclosure provides methods for determining the pathlength difference of an interferometer that can operate over a very wide dynamic range in signal levels. Various embodiments do not rely on phase preserving RF mixing techniques and therefore are more robust to signal level changes than phase based range measurements. Such robust length determination can be used in applications where the light levels in the interferometer vary dramatically. Such applications include measurements where the reflectivity of the object being scanned varies or where the transmission of the intervening medium varies.

The present disclosure provides methods that do not rely on a precisely linear frequency sweep of the modulation source as required by frequency chirped FMCW LIDAR. This feature allows the modulation source to be less complex than that required for FMCW LIDAR and thus easier to build and more robust to environmental perturbations.

The present disclosure provides methods whose measurement precision does not scale with the inverse of the measurement time squared ($1/T_{mes}^2$) as does that for frequency chirped FMCW LIDAR. Instead, measurement precision scales with $1/T_{mes}$ or exponentially with $T_{mes}$. This measurement scheme provides superior precision to frequency chirped FMCW LIDAR in applications where very short measurement times are necessary.

Various methods described herein utilize a time-periodic frequency modulation (or equivalently a time-periodic phase modulation) of the light source illuminating the interferometer; however, it is distinct from alternative methods for range-resolved interferometric signal processing in that instead of measuring the frequency or phase of the RF (radio-frequency) signal generated by the interferometer, it involves a measurement of the amplitude of an RF signal. A feature of this technique is that neither an accurate measurement of the absolute amplitude nor of the relative RF amplitude is required. Rather the range information is extracted from the observation of the modulation frequencies that lead to the absence of an RF photocurrent.

A range, or equivalently path length difference, measurement is performed by scanning the frequency of the time-periodic phase modulation and measuring how the RF power contained in the detector photocurrent varies with modulation frequency. The lowest modulation frequency $f_m = f_m^{(min)}$ for which the RF power vanishes completely or exhibits a minimum uniquely determines the path length difference. Additional minima in the RF power will occur at $f_m = q f_m^{(min)} = q/T$ (where T is the time difference for light to propagate along the two arms of the interferometer to the detector and $q=0, 1, 2 \ldots$), that is at integer multiples of the minimum frequency.

For each frequency setting, $f_m$, of the time-periodic phase modulation, the detector photocurrent will exhibit a modulation at $f_m$ and at higher harmonics $2f_m, 3f_m, 4f_m, \ldots$, and the power contained in these higher harmonics will depend on the phase excursion of the time-periodic phase modulation. However, the power in all harmonics will vanish when the setting equals $f_m = 1/T$. Since the lowest frequency in the photocurrent is $f_m$, the total RF power (or equivalently the peak-to-peak amplitude) of the photocurrent can be determined in a time $t_{cycle} = f_m^{-1}$.

By measuring the RF power contained in the photocurrent at a set of values in the frequency interval $[f_m^{(min)}, f_m^{(max)}]$, the values at which a zero (or a minimum) of the RF power is observed can be used to uniquely determine the path length difference in the interferometer. In particular, the frequency difference between any two adjacent zeros (or minima) will equal $1/T$ and the absolute frequency of any zero will be q/T for some integer q. Thus, so long as at least two zeros are contained in the measurement interval $[f_m^{(min)}, f_m^{(max)}]$, the path length difference can be determined. Since there is always a zero at $f_m = 0$, the first zero encountered in the interval $[0, f_m^{(max)}]$ determines the range. The interval width $f_m^{(max)} - f_m^{(min)}$ required to observe at least two zeros will depend on 1/T and thus grows as the path-length difference shrinks. It will be shown that the resolution with which a measurement can be made will be related to the inverse of the interval mean:

$$\frac{2}{f_m^{(max)} + f_m^{(min)}}.$$

Thus, the measurement resolution is ultimately limited by the available detector bandwidth for the photocurrent. Detector bandwidths can be extremely high (in excess of 100 GHz).

Figure 4:
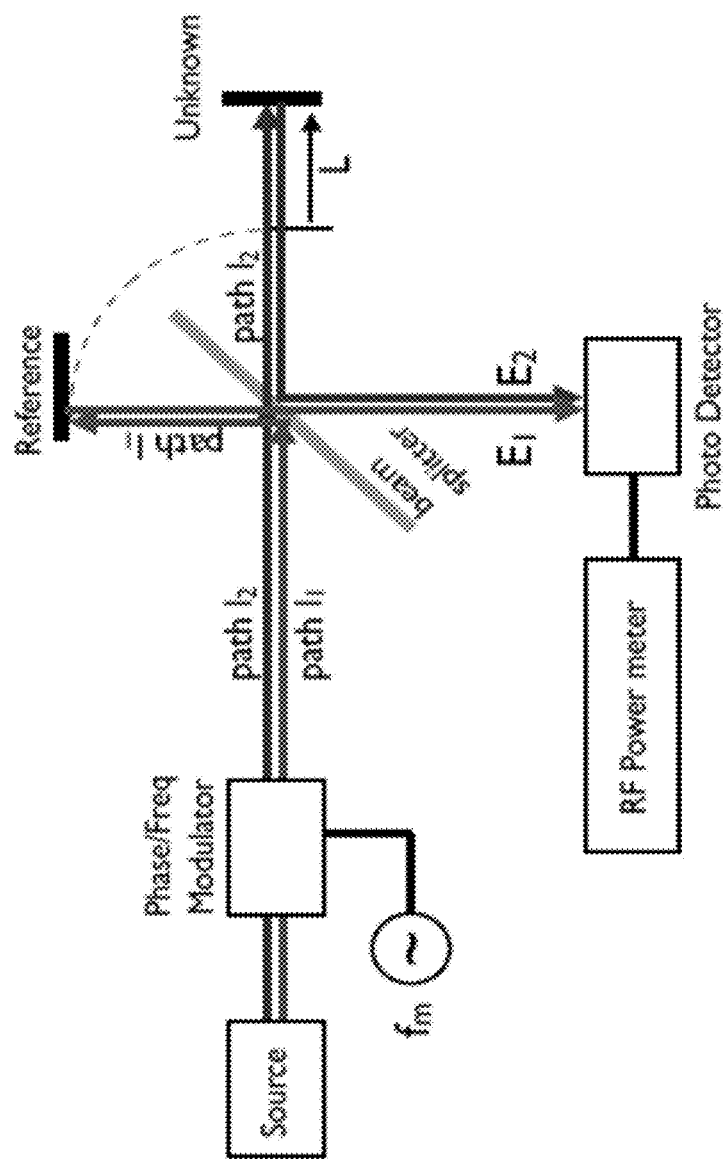
FIG. 4 is a schematic of an exemplary device for measuring path length according to embodiments of the present disclosure.

Referring to FIG. 4, an exemplary device for measuring path length is provided according to embodiments of the present disclosure. A laser source and a phase modulator together produce a phase modulated coherent light source.

The electric field immediately after the phase modulator is $$E = \sqrt{I}\, e^{i\omega_L t} e^{i\theta(t)} \qquad \text{Equation 53}$$
$$= \sqrt{I}\, e^{i\Phi(t)}$$

where I is the optical intensity of the field, $\omega_L$ is the optical frequency of the field, $\theta(t)$ is the time-dependent phase imparted to the field by the, and $\Phi(t)=\omega_L t+\theta(t)$ is the total phase of the field. After emerging from the modulator, the field propagates into the interferometer and to the detector. Since there are two paths, there are two fields at the detector. These two fields are time delayed versions of the field emerging from the source since they arrive at the detector after some time-of-flight $t_i = n_r l_i/c_0$ $$E_i = \sqrt{I_i}\, e^{i\Phi(t-t_i)} \qquad \text{Equation 54}$$

where $l_i$ is the path length from the source to the detector along path i, $c_0$ is the speed of light in vacuum, and $n_r$ is the index of refraction of the medium of the interferometer. Here we have assumed that the frequency excursion produced by the phase modulation $$\delta\omega = \frac{d\theta(t)}{dt}$$

is much smaller than the carrier frequency $\omega_L$ (i.e. $\delta\omega \ll \omega_L$) and thus the chromatic dispersion of the medium (that is the variation of $n_r$ with optical frequency) is negligible.

The total field at the detector will be $E=E_1+E_2$, and the intensity will be $$I = |E_1 + E_2|^2 = |E_1|^2 + |E_2|^2 + E_1 E_2^* + E_1^* E_2 \qquad \text{Equation 55}$$
$$= I_1 + I_2 + \sqrt{I_1 I_2}\,[e^{i(\Phi_1-\Phi_2)} + e^{-i(\Phi_1-\Phi_2)}]$$
$$= I_1 + I_2 + 2\sqrt{I_1 I_2}\cos(\Phi_1 - \Phi_2)$$

where $I_1$ and $I_2$ represent the intensity of the light hitting the detector after traveling along paths 1 and 2 respectively, and where the phase difference is $$\Delta\Phi = \Phi_1(t) - \Phi_2(t) = \Phi(t-t_1) - \Phi(t-t_2) \qquad \text{Equation 56}$$
$$= \omega_L(t-t_1) + \theta(t-t_1) - \omega_L(t-t_2) -$$
$$\theta(t-t_2)$$
$$= \omega_L(t_2-t_1) + \theta(t-t_1) - \theta(t-t_2).$$

If we define the photon time-of-flight difference along the two paths as $T=t_1-t_2$, we can re-express the phase difference as $$\Delta\Phi = \omega_L(t_2-t_1) + \theta(t-t_1) - \theta(t-t_2) \qquad \text{Equation 57}$$
$$= -\omega_L T + \theta(t-t_1) - \theta(t-t_1-T)$$
$$= -\omega_L T + \theta(t') - \theta(t'-T)$$

where $t'=t-t_1$

When the phase modulation is periodic in time, then the phase modulation function satisfies $\theta(t)=\theta(t+\tau)$. As shown in Eq., the phase difference is $\Delta\Phi=-\omega_L T+\theta(t')-\theta(t'-T)$. It is therefore clear that when $T=n\tau$ (for any integer n=0, 1, 2, ...), the phase difference becomes a constant $\Delta\Phi=-\omega_L T$, and the intensity on the photodiode is also a constant of time, $I=I_1+I_2+2\sqrt{I_1 I_2}\cos(\Delta\Phi)$. Thus, the AC part of the photocurrent will vanish and the RF power of the interference signal will be zero. For any $T \neq n\tau$, the AC photocurrent does not vanish and thus the RF power of the interference signal will be non-zero. By varying $\tau$, the periodicity of the phase modulation function, and discovering the value for $\tau$ at which the RF power of the interference signal is zero (or equivalently at a minimum), the value for the time difference, T, can be determined up to an integer factor. If the time difference is bounded $T<T_{max}$, then the search can begin at a value of $\tau=T_{max}$ and $\tau$ can be varied monotonically to lower values until the first zero is found. This first zero corresponds to $\tau=T$ and uniquely determines the time difference.

For the particular case of sinusoidal phase modulation, the phase modulation takes the form $$\theta(t)=\theta_0+\alpha\sin(\omega_m t+\delta). \qquad \text{Equation 58}$$

Assuming that there is no accompanying intensity modulation, the total field at the detector is $$I = I_1 + I_2 + 2\sqrt{I_1 I_2}\cos\Delta\Phi \qquad \text{Equation 59}$$
$$= I_1 + I_2 + 2\sqrt{I_1 I_2}\cos(\omega_L(t_2-t_1) +$$
$$\theta(t-t_1) - \theta(t-t_2))$$
$$= I_1 + I_2 + 2\sqrt{I_1 I_2}\cos[\omega_L(t_2-t_1) +$$
$$\alpha(\sin(\omega_m(t-t_1)+\delta) - \sin(\omega_m(t-t_2)+\delta))].$$

Using the sum-identities, we can write the time varying part of the phase difference as $$= \sin(\omega_m(t-t_1)+\delta) - \sin(\omega_m(t-t_2)+\delta) \qquad \text{Equation 60}$$
$$= 2\cos\left(\frac{\omega_m(2t-t_1-t_2)+2\delta}{2}\right)\sin\left(\omega_m\frac{t_2-t_1}{2}\right)$$
$$= 2\cos(\omega_m(t-\bar{t})+\delta)\sin\left(\frac{\omega_m T}{2}\right)$$

where $T=t_1-t_2$ and $\bar{t}=(t_1+t_2)/2$. The total intensity at the detector is $$I = I_1 + I_2 + 2\sqrt{I_1 I_2}\cos[\omega_L(t_2-t_1) + \qquad \text{Equation 61}$$
$$\alpha(\sin(\omega_m(t-t_1)+\delta) - \sin(\omega_m(t-t_2)+\delta))]$$

Figure 5A:
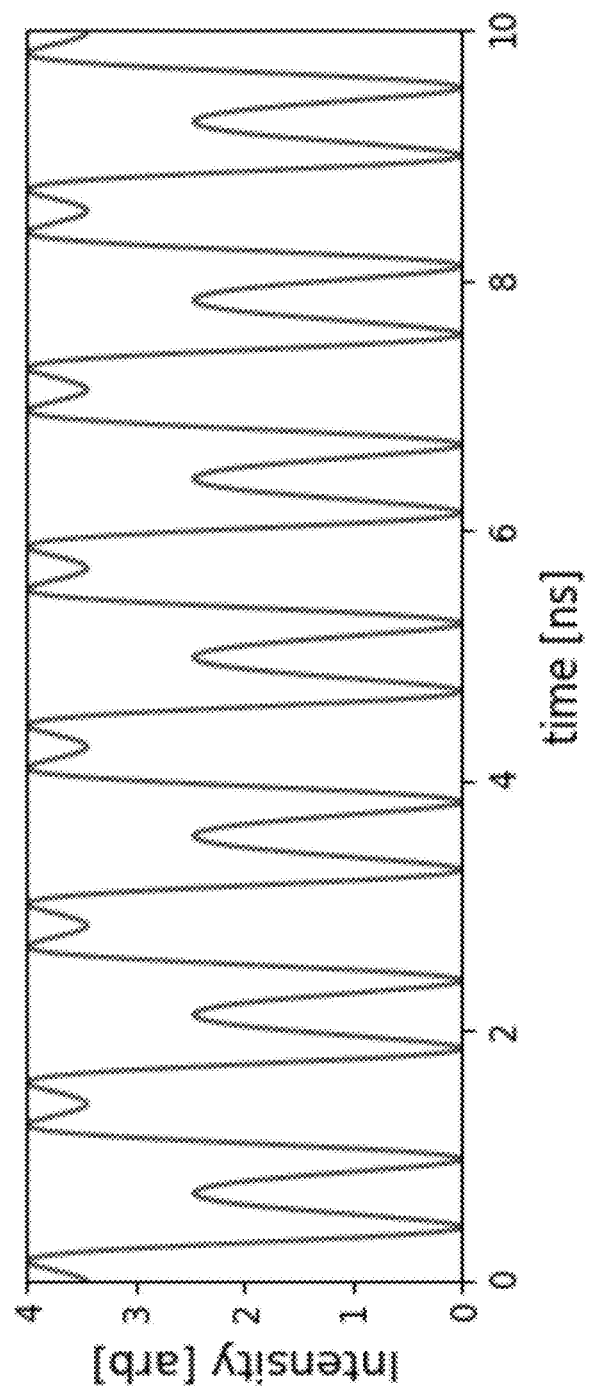
FIG. 5A is a plot of output intensity as a function of time of a device according to embodiments of the present disclosure.
Figure 5B:
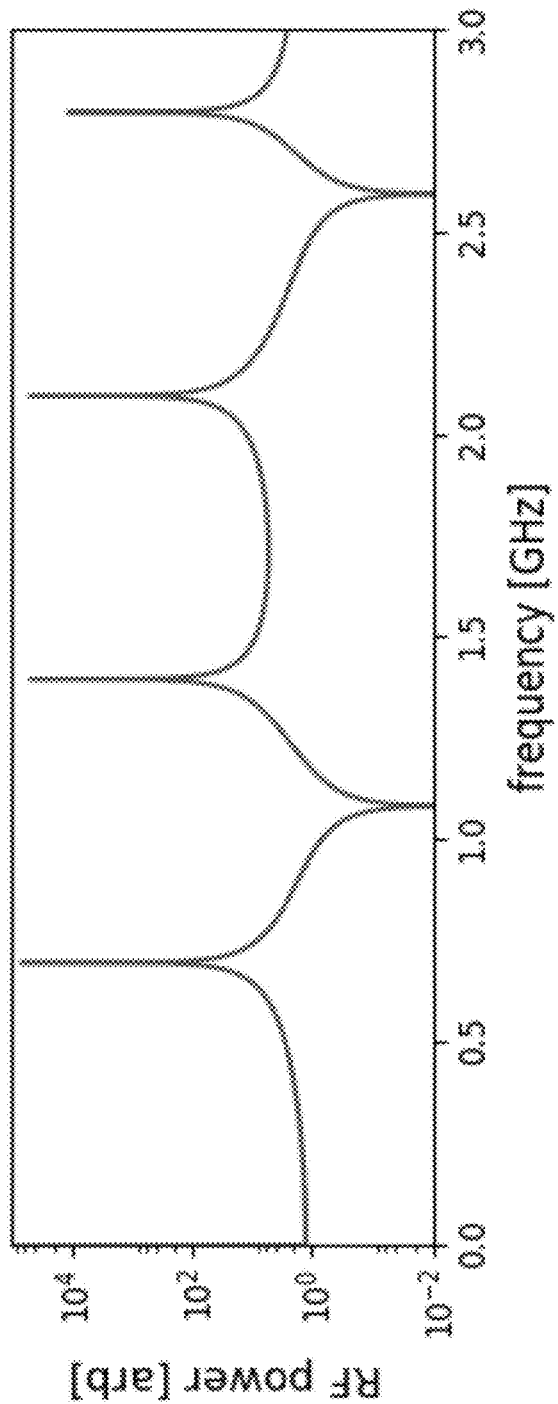
FIG. 5B is a plot of the Fourier transform of the signal of FIG. 5A.

-continued $$= I_1 + I_2 + 2\sqrt{I_1 I_2}\cos[-\omega_L T - 2\alpha\sin\left(\frac{\omega_m T}{2}\right)\cos(\omega_m(t-\bar{t})+\delta)]$$

$$= I_1 + I_2 + 2\sqrt{I_1 I_2}\cos[\omega_L T + 2\alpha\sin\left(\frac{\omega_m T}{2}\right)\cos(\omega_m(t-\bar{t})+\delta)]$$

$$= I_1 + I_2 + 2\sqrt{I_1 I_2}\left[\cos\omega_L T\cos\left(2\alpha\sin\left(\frac{\omega_m T}{2}\right)\cos(\omega_m t'')\right) - \sin\omega_L T\sin\left(2\alpha\sin\left(\frac{\omega_m T}{2}\right)\cos(\omega_m t'')\right)\right]$$

where $t'' \equiv t - \bar{t} + \delta/\omega_m$. The resulting photocurrent is proportional to 1 and is plotted as a function of time in FIG. 5A and FIG. 5B for T=1 ns, =700 MHz and a phase excursion of $\alpha=1.5$. The Fourier transform of this signal (showing the power spectrum of the photocurrent) is also shown in. As explained in the following discussion, since $f_m$ is far from the first zero at 1/T and $\alpha=1.5$, the signals at $f_m$, $2f_m$, and $3f_m$, are all of similar magnitude.

Using the real-valued expressions of the Jacobi-Anger expansion, we can write the time varying interference term of the intensity at the detector as $$\frac{I_{12}(t'')}{2\sqrt{I_1 I_2}} = \cos\omega_L T\cos\left(2\alpha\sin\left(\frac{\omega_m T}{2}\right)\cos(\omega_m t'')\right) - \quad \text{Equation 62}$$

$$\sin\omega_L T\sin\left(2\alpha\sin\left(\frac{\omega_m T}{2}\right)\cos(\omega_m t'')\right)$$

$$= \cos\omega_L T\cos(z\cos\Theta) - \sin\omega_L T\sin(z\cos\Theta)$$

$$= \cos\omega_L T\left[J_0(z) + 2\sum_{n=1}^{\infty}(-1)^n J_{2n}(z)\cos(2n\Theta)\right] +$$

$$\sin\omega_L T\left[2\sum_{n=1}^{\infty}(-1)^n J_{2n-1}(z)\cos((2n-)\Theta)\right]$$

$$= J_0(z)\cos\omega_L T - 2J_1(z)\sin\omega_L T\cos\Theta -$$

$$2J_2(z)\cos\omega_L T\cos 2\Theta + 2J_3(z)\sin\omega_L T\cos 3\Theta + \cdots$$

where $z=2\alpha \sin(\omega_m T/2)$ and $\Theta=\omega_m t''$, and $J_n(z)$ is the $n^{th}$ Bessel function of the first kind evaluated at z.

Figure 6A:
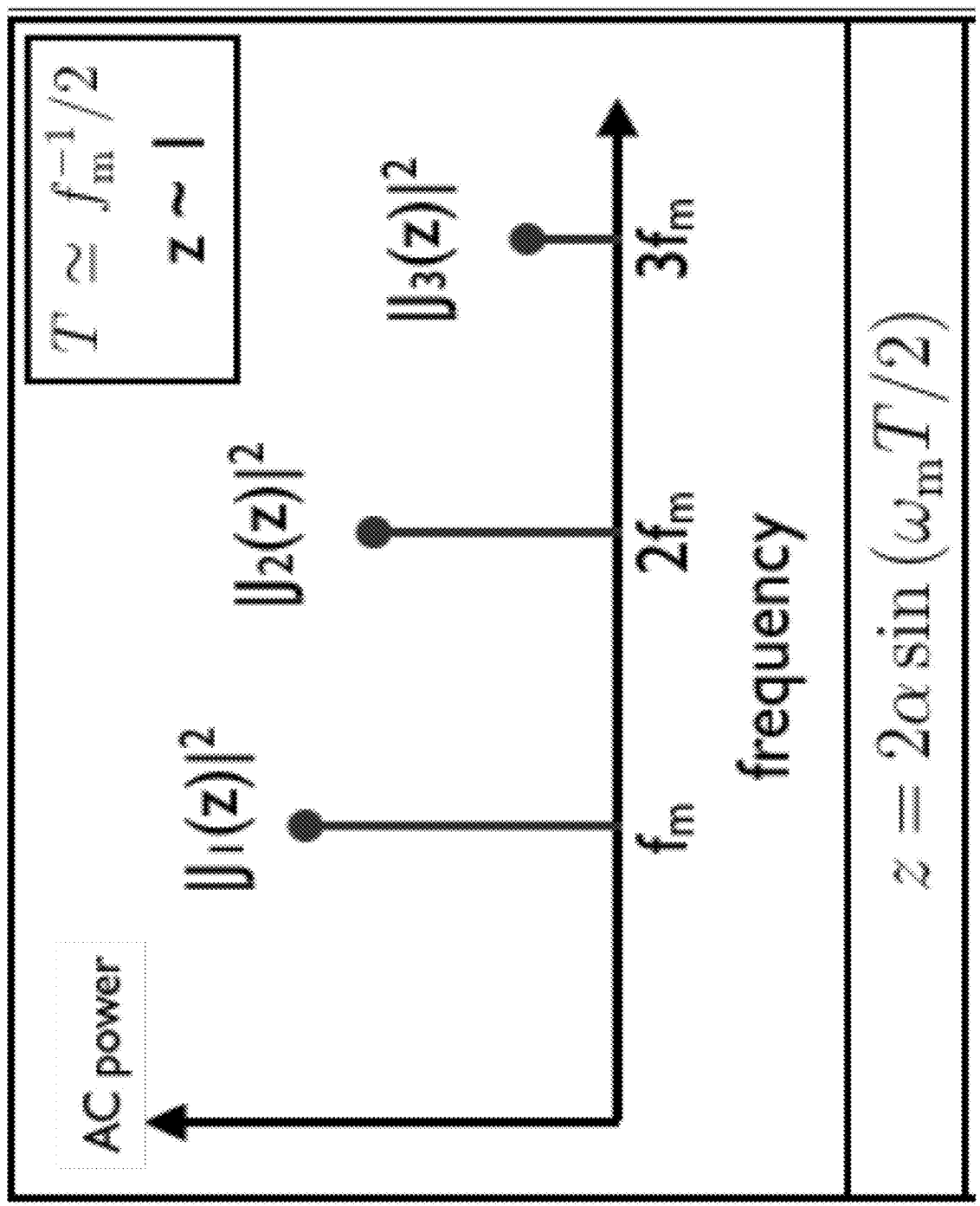
FIG. 6A is a sketch RF power spectrum of the output intensity of a device according the present disclosure for a first exemplary path length.
Figure 6B:
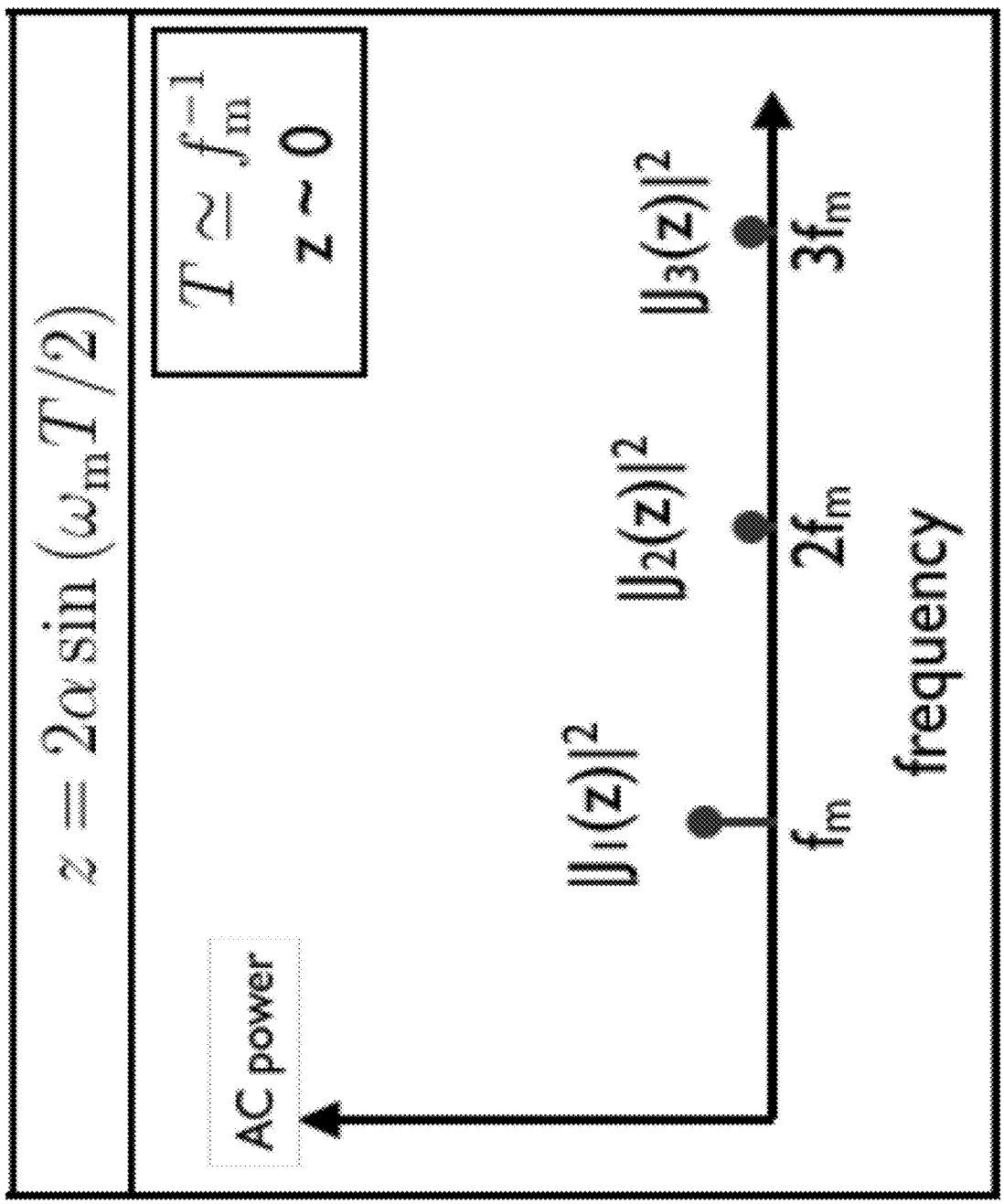
FIG. 6B is a sketch RF power spectrum of the output intensity of a device according the present disclosure for a second exemplary path length.

From this expression, it is clear that the RF photocurrent (which is proportional to I) at the frequency $f_m = \omega_m/2\pi$ is proportional to $J_1(z)$ whereas the RF photocurrent at the frequency $2f_m = 2\omega_m/2\pi$ is proportional to $J_2(z)$. The RF power at each frequency is proportional to the square of these prefactors and is shown in FIG. 6A and FIG. 6B. As the modulation frequency approaches the $q^{th}$ zero $f_m = q/T$, where q=0, 1, 2, . . . then the argument $\omega_m T \to n2\pi$ and consequently the value of $z \to 0$. Since all Bessel functions $J_n(z)$ of order $n \geq 1$ vanish at z=0, the RF power at $f_m$ and harmonics of $f_m$ tend to zero also. Thus the RF power at any harmonic of $f_m$ and the total RF power vanish when $f_m = f_q^{(0)} = qf_m^{(0)} = q/T$ where $f_m^{(o)}=1/T$ is the first zero.

Figure 7A:
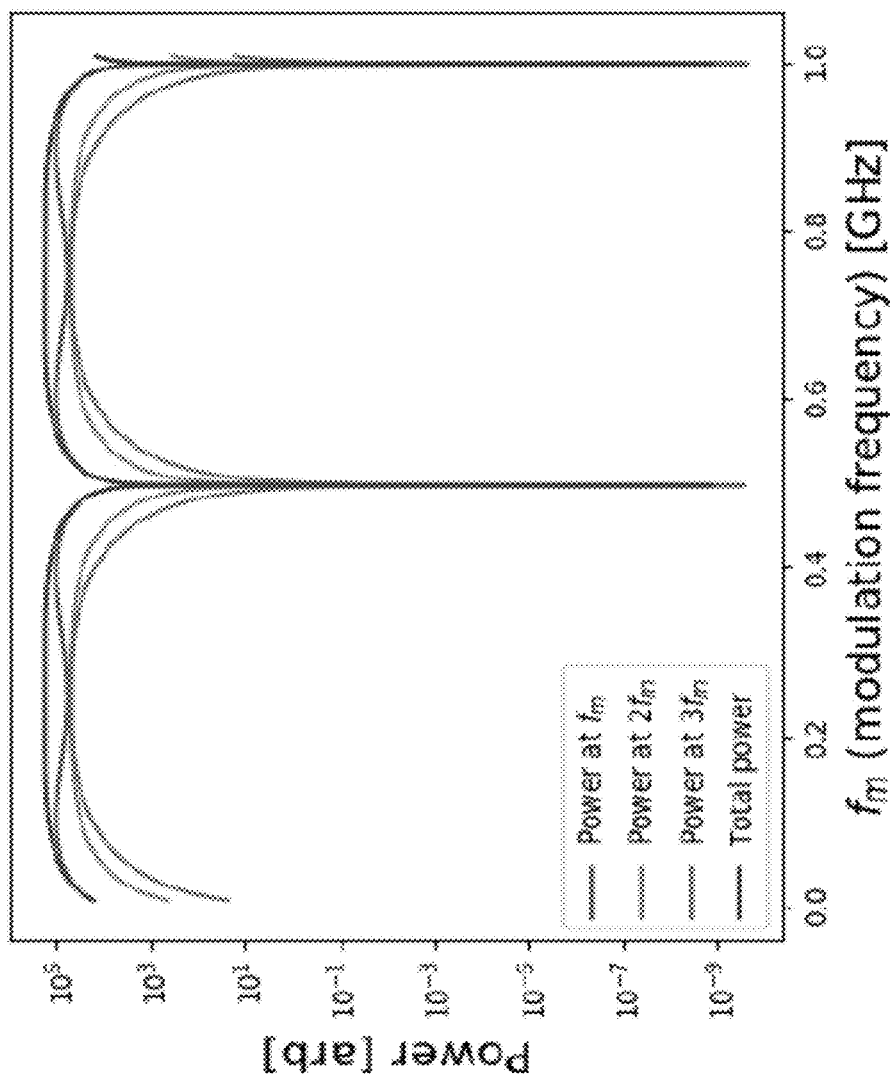
FIG. 7A is a logarithmic plot of AC photocurrent power as a function of modulation frequency ($f_m$) according to embodiments of the present disclosure.
Figure 7B:
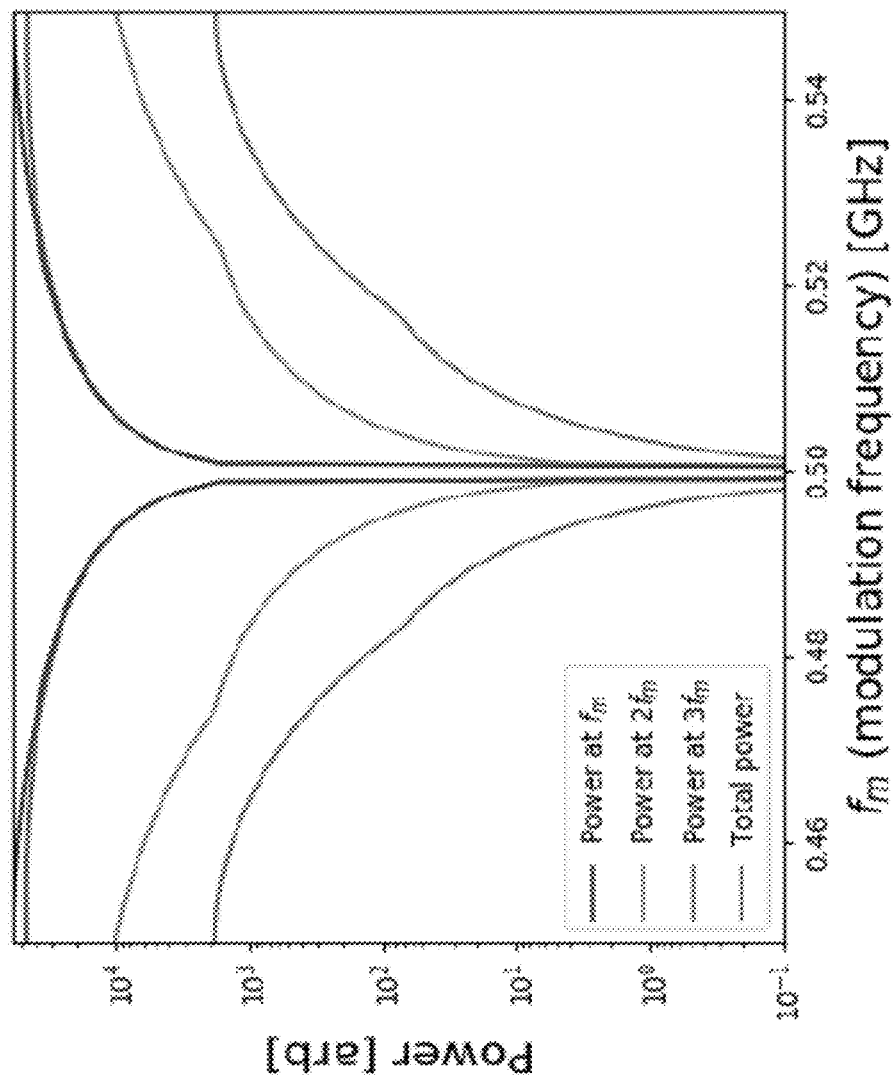
FIG. 7B is detail view of the plot of FIG. 7A.

This behavior is shown in FIG. 7A and FIG. 7B for T=2 ns. Harmonics produced by a source with pure phase modulation with an interferometer path length difference corresponding to T=2 ns are shown. The RF power zero occurs when $f_m=1/T=500$ MHz. This plot was obtained by taking the Fourier transform of Equation 61 and evaluating the power at $f_m$, $2f_m$, $3f_m$.

FIG. 6A shows output when $T \cong f_m^{-1}/2$ (such that $z=2\alpha \sin(\omega_m T/2) \cong 1$). FIG. 6B shows output when $T \cong f_m^{-1}$ (such that $z \cong 0$).

Figure 8A:
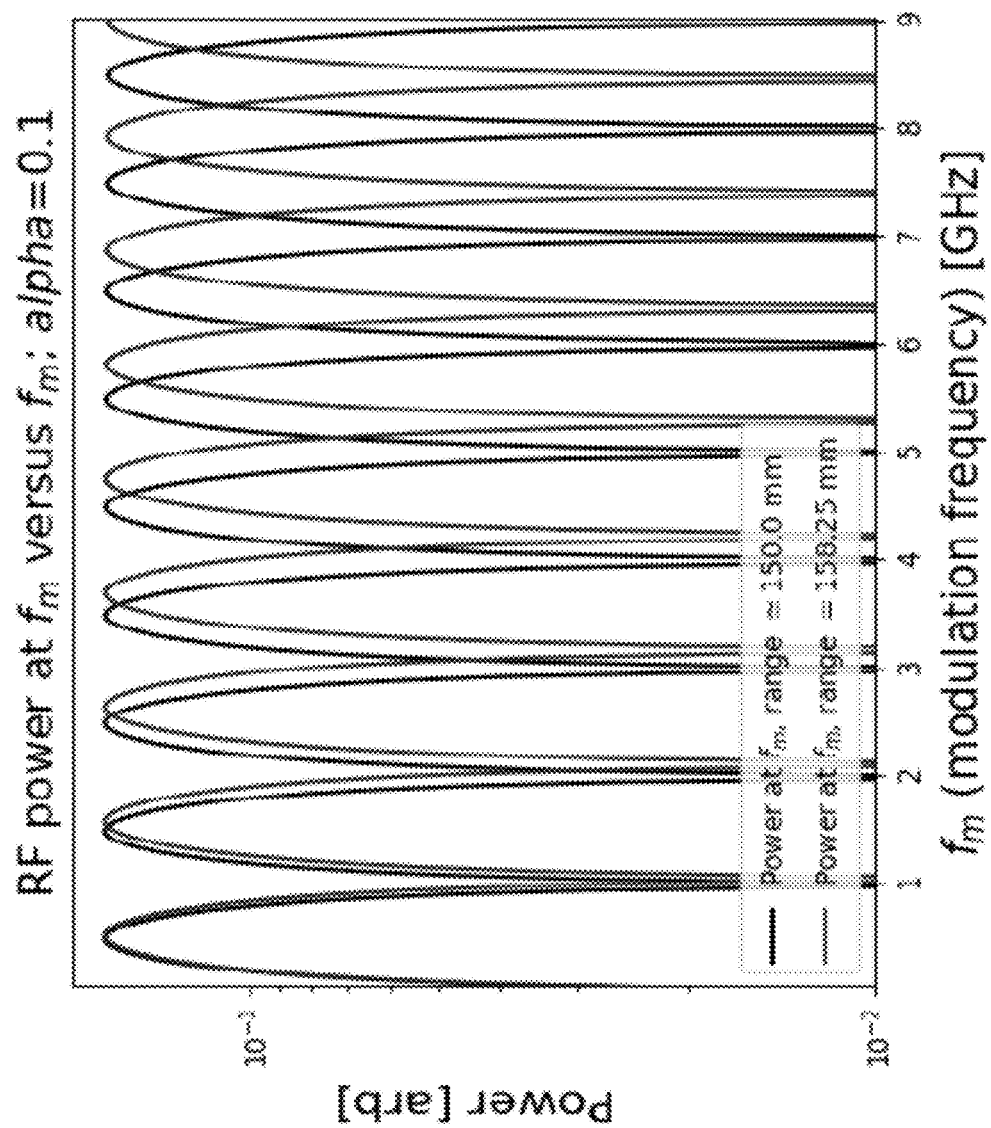
FIG. 8A is a logarithmic plot of total AC photocurrent power as a function of modulation frequency ($f_m$) for two exemplary path lengths.
Figure 8B:
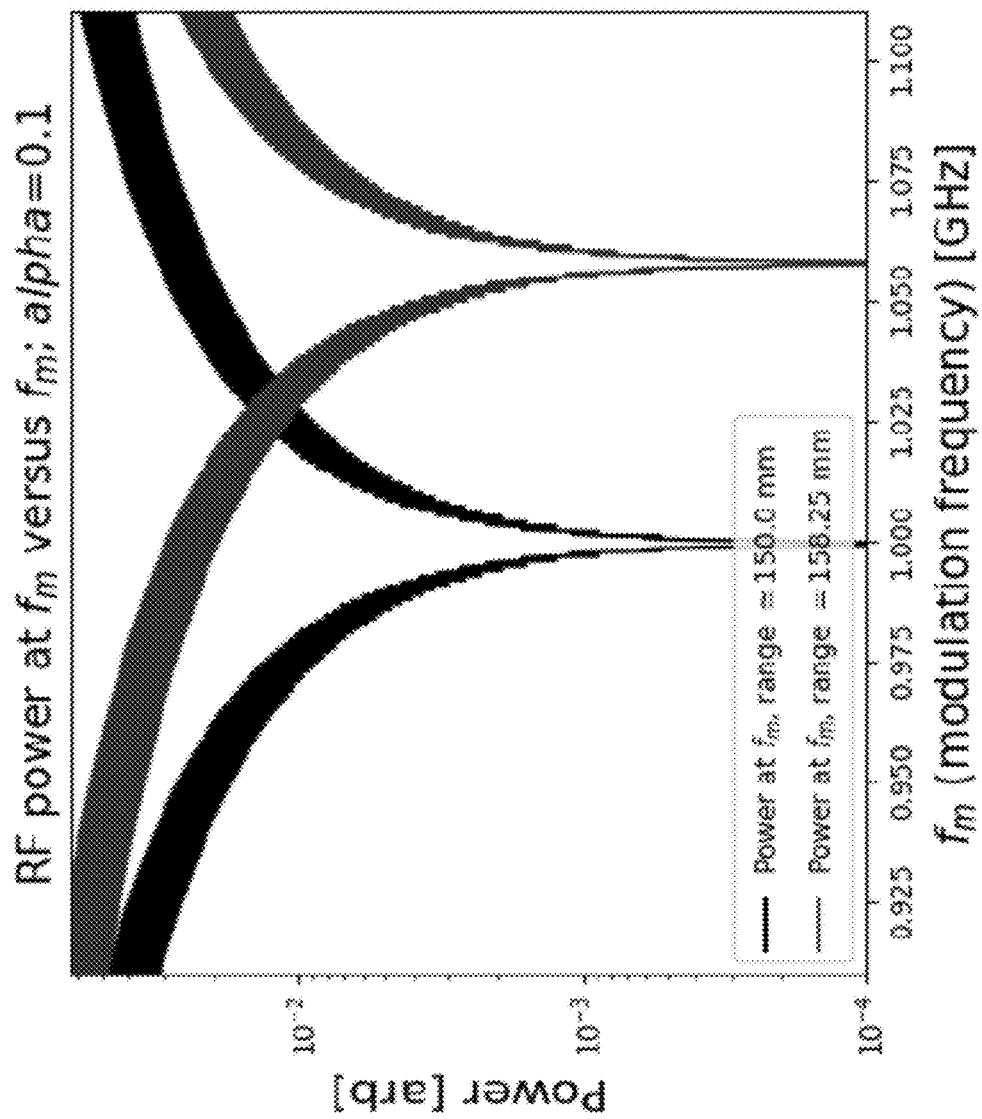
FIG. 8B is detail view of the plot of FIG. 8A.
Figure 9:
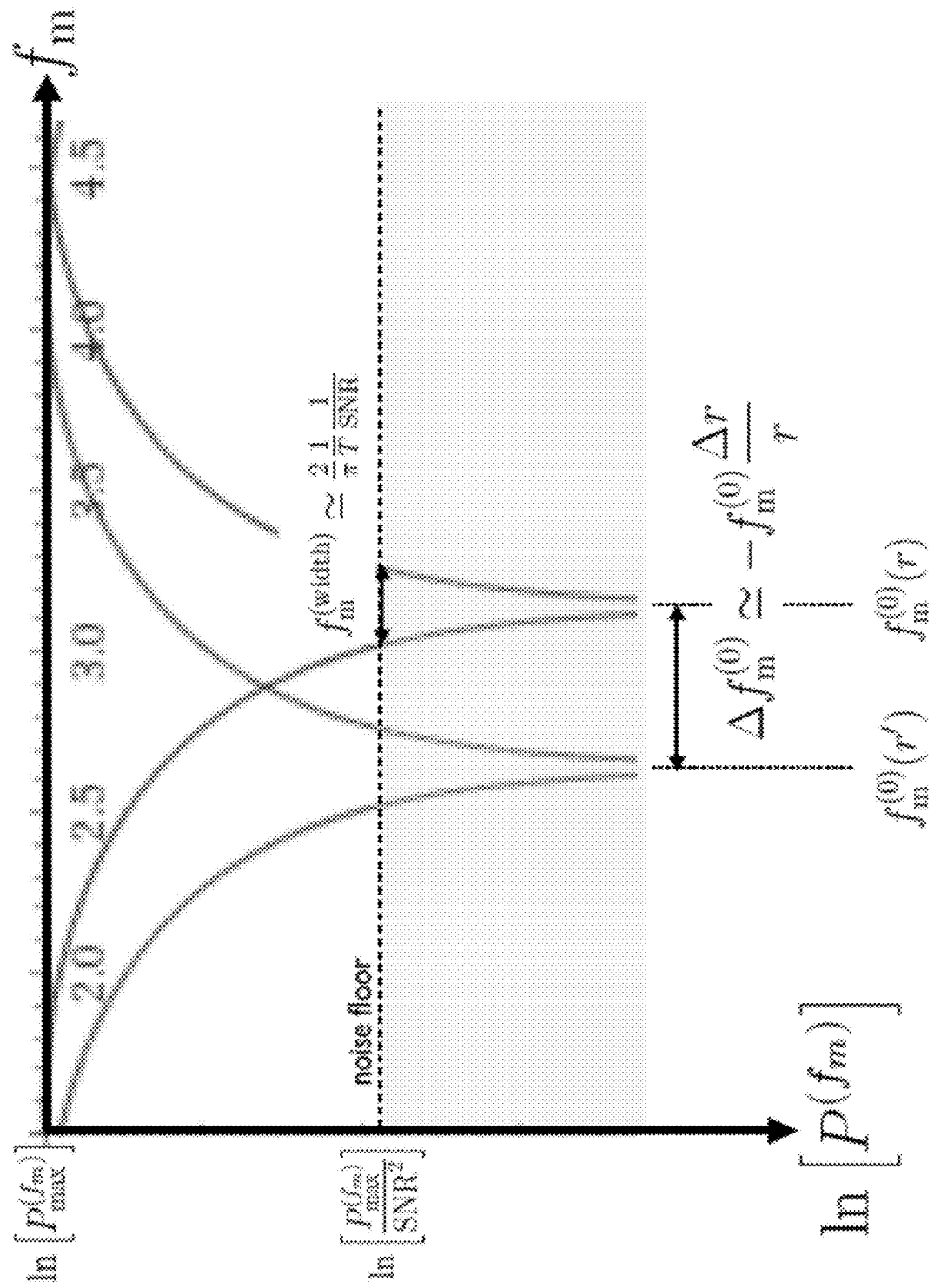
FIG. 9 is a logarithmic plot of total AC photocurrent power as a function of modulation frequency ($f_m$), illustrating the shift of the zero locations compared to their widths limited by the SNR of the detection system.

If the path-length difference of the interferometer changes, then T is different and the zero locations ($f_q^{(0)} = q/T$) will all move. This behavior is illustrated in FIG. 8A and FIG. 8B where the total RF power of the interferometer photocurrent is shown as a function of the modulation frequency $f_m$ for two different interferometer path length differences (150 mm and 158.25 mm). An 8 mm shift of the path length difference shifts $f_m^{(0)}$ by approximately 60 MHz. The $q^{th}$ zero (i.e. the value of $f_q^{(0)}$ will shift by a factor of q more than 60 MHz. In this plot, the phase excursion is $\alpha=0.1$. These figures illustrate that the power spectrum is unique for each distance.

We recall here that the $q^{th}$ zero location is related to the path length difference r in the interferometer according to $$f_q^{(0)} = \frac{q}{T} = \frac{q}{t_1 - t_2} = \frac{q}{\frac{l_1}{c} - \frac{l_2}{c}} = \frac{qc}{l_1 - l_2} = \frac{qc}{r} = qf_m^{(0)}, \quad \text{Equation 63}$$

and the zero location will differ by an amount $$\Delta f_q^{(0)} = f_q^{(0)}(r) - f_q^{(0)}(r') = \quad \text{Equation 64}$$

$$qc\frac{r'-r}{rr'} = \frac{qc}{r}\frac{r'-r}{r'} = f_q^{(0)}(r)\frac{r'-r}{r'} = -f_q^{(0)}(r)\frac{\Delta r}{r'}$$

where $\Delta r = r - r'$, and thus $$\frac{\Delta f_q^{(0)}}{f_q^{(0)}} = -\frac{\Delta r}{r'} = -\frac{\Delta r}{r - \Delta r}. \quad \text{Equation 65}$$

In the limit that $\Delta r \ll r$, this expression is $$\frac{\Delta f_q^{(0)}}{f_q^{(0)}} \cong -\frac{\Delta r}{r}. \quad \text{Equation 66}$$

The precision with which the range or path length difference can be measured is determined by the precision with which the minima (at $f_q^{(0)}=q/T$) can be located. This latter precision will depend on the number of samples taken, the SNR of the power measurement, the stability of the power during the measurement, and the shape of the power versus frequency function.

A range or path length difference measurement is conducted by sampling the RF power ((contained in the photocurrent at a set of values in some frequency interval $[f_m^{(min)}, f_m^{(max)}]$. From this sample, the values $f_1^{(0)}$, $f_2^{(0)}$, $f_3^{(0)}$ . . . for $f_m$ at which the RF power is observed to reach a minimum are used to determine an approximate value of 1/T. If the uncertainty in the determination of these minima is $\delta_{f^{(0)}}$, then $1/T \cong f_2^{(0)} - f_1^{(0)}$ where the uncertainty in 1/T is $\sqrt{2}\delta_{f^{(0)}}$. This approximate value can then be used to determine the value for q for the highest frequency zero found. For example, one might have $q_3 = \text{round}[f_3^{(0)}/(f_2^{(0)} - f_1^{(0)})/]$ where the function round [ ] rounds the value of the argument to the nearest integer, and this value of $q_3$ can then be used to determine a more exact value of 1/T $$\frac{1}{T} = \frac{f_3^{(0)}}{q_3} = \frac{f_3^{(0)}}{\text{round}\left[\frac{f_3^{(0)}}{f_2^{(0)} - f_1^{(0)}}\right]}.$$ Equation 67

The uncertainty in this value of 1/T is $\delta_{f^{(0)}}/q$ and thus the higher the frequency is for $f_3^{(0)}$ and the larger the value of q, the more precise the value for 1/T. Therefore the best mode is to conduct measurements is at the highest frequency range allowable by the bandwidth limit of the detection electronics.

However, this procedure only works if the frequency uncertainty is small enough. In particular, $$\delta_{f^{(0)}} < \frac{1}{\sqrt{2}\,Tq}$$

or equivalently $$q < \frac{1}{\sqrt{2}\,T\delta_{f^{(0)}}}.$$

This can be seen by examining the uncertainty of the determination of $q_3$ and requiring that it be smaller than 1. In particular, we have that $$q_3 = \frac{f_3^{(0)}}{f_2^{(0)} - f_1^{(0)}}$$ Equation 68 and the uncertainty in $q_3$ is $$\delta q = \sqrt{\left(\frac{\partial q}{\partial f_1^{(0)}}\cdot \delta_{f^{(0)}}\right)^2 + \left(\frac{\partial q}{\partial f_2^{(0)}}\cdot \delta_{f^{(0)}}\right)^2 + \left(\frac{\partial q}{\partial f_3^{(0)}}\cdot \delta_{f^{(0)}}\right)^2}$$ Equation 69

$$\delta q = \delta_{f^{(0)}}\sqrt{\left(\frac{\partial q}{\partial f_1^{(0)}}\right)^2 + \left(\frac{\partial q}{\partial f_2^{(0)}}\right)^2 + \left(\frac{\partial q}{\partial f_3^{(0)}}\right)^2}$$

$$\delta q = \delta_{f^{(0)}}\sqrt{\left(\frac{q}{f_2^{(0)} - f_1^{(0)}}\right)^2 + \left(-\frac{q}{f_2^{(0)} - f_1^{(0)}}\right)^2 + \left(\frac{q}{f_3^{(0)}}\right)^2}$$

$$\delta q = \delta_{f^{(0)}} q\sqrt{\left(\frac{1}{f_2^{(0)} - f_1^{(0)}}\right)^2 + \left(\frac{1}{f_2^{(0)} - f_1^{(0)}}\right)^2 + \left(\frac{1}{f_3^{(0)}}\right)^2}$$

$$\delta q = \delta_{f^{(0)}} q\sqrt{(T)^2 + (T)^2 + \left(\frac{T}{q}\right)^2}$$

$$\delta q = \delta_{f^{(0)}} Tq\sqrt{2 + \frac{1}{q^2}}$$

$$\delta q \approx \sqrt{2}\,\delta_{f^{(0)}} Tq.$$

Since the value of q is limited to $$q \leq \frac{1}{\sqrt{2}\,T\delta_{f^{(0)}}},$$

the improvement of the uncertainty in the value of 1/T by using the largest frequency minima and the value of q from the frequency differences is also limited. In particular, the bound on q implies that the uncertainty is $$\frac{\delta_{f^{(0)}}}{q} \geq$$

$\sqrt{2}\delta_{f^{(0)}}^2 T$. This is an improvement by $\delta_{f^{(0)}}T$ over the uncertainty of using just the frequency difference $1/T \cong f_2^{(0)} - f_1^{(0)}$ where the uncertainty is $\sqrt{2}\delta_{f^{(0)}}$.

Alternatively, if the measurement interval $[f_m^{(min)}, f_m^{(max)}]$ begins at $f_m^{(min)} = 0$ Hz and the number of minima (i.e. the integer value of q) can be determined without ambiguity or uncertainty for the highest frequency minima, then the uncertainty can be as small as $$\frac{\delta_{f^{(0)}}}{q}.$$

Alternatively, an unambiguous range measurement can still be obtained by sampling at successively higher modulation frequencies, beginning with a rough estimate of the time-of flight obtained either by the delay before RF power appears on the photodetector, or by standard time-of-flight LIDAR techniques, using either the existing PSI device or a separate device.

To convert this to a resolution limit for a range measurement, we recall that the range measurement corresponds to half of the path length difference ($\Delta d = \Delta r/2$). Thus, the range accuracy for this case is $$\Delta d \geq \frac{1}{2}c\left(\frac{1}{f_q^{(0)}}\right)\left(\frac{2}{\pi\sqrt{SNR}}\right).$$ Equation 70 when the measurements are conducted at a frequency near the $q^{th}$ zero $f_q^{(0)} = qf_m^{(0)}$ and any value of q can be chosen. This expression is similar in form to the resolution limit for phase based range measurements. Recall that for phase based range measurements, the resolution limit is $$\Delta d \geq \frac{1}{2}c\left(\frac{1}{f_m}\right)\left(\frac{\Delta_{cycle}}{\sqrt{f_m T_{mes}}}\right).$$ Equation 71

In both cases, the resolution improves as the frequency of the measurement increases but at the cost of a shorter ambiguity range ($c/(2f_m)$ or $c/(2f_q^{(0)})$). Nevertheless, the ambiguity can be resolved in both cases by making additional measurements at different frequencies (for the phase based measurement) or by making additional measurements in different frequency ranges.

The effect of a time-dependent pathlength difference on the PSI signals and how to extract the velocity of the target or scattering object in the probe path are now addressed. As discussed previously, the combined wave signal for PM-PSI (for phase modulated waves combined by multiplication or addition followed by a square law detector) is $$\frac{I_{12}(t'')}{2\sqrt{I_1 I_2}} = \cos\omega_{laser}T\cos\left(2\alpha\sin\left(\frac{\omega_m T}{2}\right)\cos(\omega_m t'')\right) -$$

$$\sin\omega_{laser}T\sin\left(2\alpha\sin\left(\frac{\omega_m T}{2}\right)\cos(\omega_m t'')\right)$$

$$= \cos\omega_{laser}T\cos(z\cos\Theta) - \sin\omega_{laser}T\sin(z\cos\Theta)$$

$$= \cos\omega_{laser}T\left[J_0(z) + 2\sum_{n=1}^{\infty}(-1)^n J_{2n}(z)\cos(2n\Theta)\right] +$$

$$\sin\omega_{laser}T\left[2\sum_{n=1}^{\infty}(-1)^n J_{2n-1}(z)\cos((2n-1)\Theta)\right]$$

$$= \cos\omega_{laser}T[J_0(z) - 2J_2(z)\cos2\Theta + \cdots$$

$$\sin\omega_{laser}T[-2J_1(z)\cos\Theta + 2J_3(z)\cos3\Theta + \cdots$$

Equation 72

$$z = 2\alpha\sin\left(\frac{\omega_m T}{2}\right).$$

Where $J_n(z)$ is the $n^{th}$ Bessel function of the first kind evaluated at $\Theta = \omega_m t''$, $t'' \equiv t - \bar{t} + \delta/\omega_m$, $T = t_1 - t_2$ and $\bar{t} = (t_1 + t_2)/2$. The power of the AC component of the combined wave signal in a frequency band that contains the modulation frequency is proportional to $I_1 I_2 [J_1(z)\cos\Theta \sin\omega_{laser}T]^2$. If the target in the probe path is moving at a velocity $v_{prb}$ towards the PSI detector, then the probe wave delay time will be changing according $$\text{to} = t_2 = t_2^{(0)} - \left(\frac{2 v_{prb}}{c}\right)t,$$

where is $t_2^{(0)}$ the nominal flight time of the wave along the probe path. This will produce a time varying time difference $$T = t_1 - t_2^{(0)} + \frac{2 v_{prb}}{c}t$$

and thus a modulation of the power of the AC component because of $\sin \omega_{laser}T$. The power of the AC component will vary from zero (when $\omega_{laser}T = n\pi$) to a maximum proportional to $I_1 I_2 [J_1(z)]^2$ (when $\omega_{laser}T = (2n+1)\pi/2$) at a frequency given by $$\frac{4 v_{prb}}{c}\omega_{laser}$$

corresponding to 4 times the frequency shift due to the Doppler effect of a moving source. The frequency of this time-dependent variation of the AC power allows the probe velocity to be measured and the maximum amplitude of the power variation, set by $I_1 I_2 [J_1(z)]^2$, allows the PSI range measurement to be made.

It will be appreciated that the time variation of T will also lead to a variation of the range as detected by the PSI signal since $$z = 2\alpha\sin\left(\frac{\omega_m T}{2}\right);$$

however, it is assumed here that the time duration of the PSI measurement time, $t_{mes}$, is small such that $$t_{mes}\frac{4 v_{prb}}{c}\omega_m \ll 1,$$

and the variation of the PSI extrema location during the measurement is negligible.

While measuring the frequency of the time dependence of the power of the AC component provides the magnitude of $v_{prb}$, it does not provide the sign. For a target moving at a velocity $v_{prb}$ towards the PSI receiver, the oscillation frequency of the power at the modulation frequency provides the Doppler shift of the target. However, the same oscillation frequency would be observed if the velocity were $v_{prb}$ away from the PSI receiver. This is referred to as the Doppler shift sign ambiguity. A technique for determining the sign of the Doppler shift is as follows: (i) the sinusoidal variation of the power at the modulation frequency is sampled at a rate high enough that the phase of the sinusoidal variation can be detected. At time $t = t_{up}$ the time delay of the reference wave $t_1$ (also referred to as $t_{ref}$) is increased by a small amount to $t_1 + t_+$ corresponding to a small phase increase $$\delta_+ = \omega_{laser}t_+ < \frac{\pi}{4}$$

for the optical wave and at time $t = t_{down}$, the time delay of the reference wave is changed back to $t_1$ (also referred to as $t_{ref}$). The sinusoidal oscillation of the power will (after a nominal delay of $t_1$) transition to and follow one of two different sinusoidal trajectories in time depending on the sign of $v_{prb}$. If $v_{prb} < 0$ the phase of the sinusoidal oscillation of the power will be advanced and if $v_{prb} > 0$ the phase will be delayed by deltaepsilon with respect to the oscillation before the change.

Figure 27:
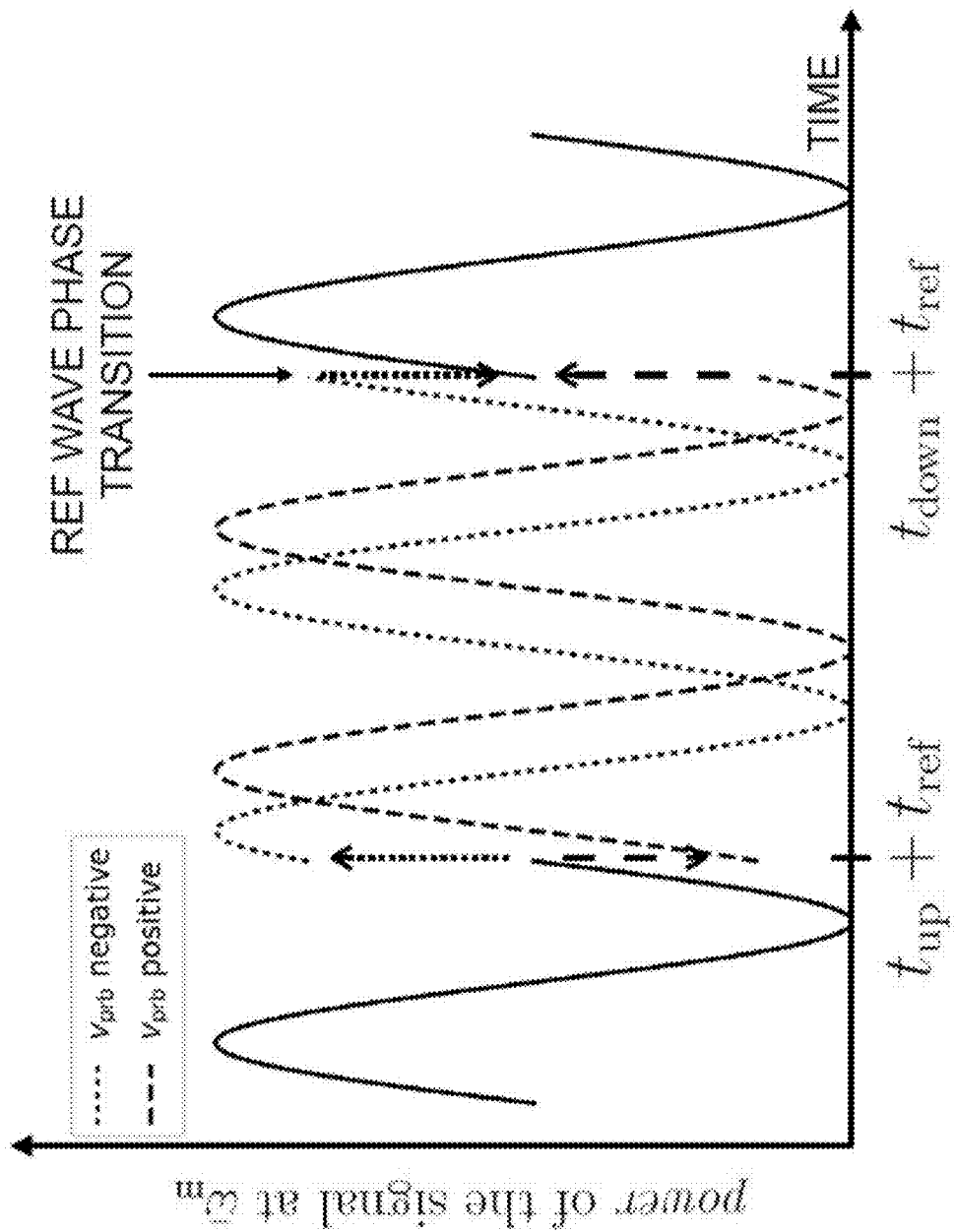
FIG. 27 is a graph of signal power over time, illustrating an exemplary PSI velocity measurement and Doppler sign ambiguity procedure according to embodiments of the present disclosure.

Referring now to FIG. 27, an exemplary PSI velocity measurement and Doppler sign ambiguity procedure is illustrated. In this example, the power of the AC component of the combined signal wave at the modulation frequency is plotted as a function of time. The time dependent sinusoidal variation of the power at the modulation frequency is due to a non-zero target velocity, $v_{prb}$. At time $t = t_{up}$, the time delay of the reference wave $t_1$ (also referred to as $t_{ref}$) is increased by a small amount to $t_1 + t_+$, corresponding to a small phase increase $$\delta_+ = \omega_{laser}t_+ < \frac{\pi}{4}$$

for the optical wave and at time $t = t_{down}$, the time delay of the reference wave is changed back to $t_1$. The sinusoidal oscillation of the power, after a nominal delay of $t_1$ (or $t_{ref}$), transitions to and follows one of two different trajectories in time depending on the sign of $v_{prb}$. By measuring the sinusoidal oscillation before and after the change, the sign of $v_{prb}$ can be determined.

For coherent detection systems (e.g., FMCW, PMCW, and PSI), the reference and probe waves must be temporally and spatially coherent across the face of the detector or they will destructively interfere and produce a weaker interference signal. When the signal wave is reflected from surface rough on the scale of the wavelength (or passes through optically turbulent media), the probe wavefront can become distorted producing what is often referred to as speckle in the interference pattern. Speckle is usually not an issue in RF or microwave detection since the antenna is typically smaller than the wavelength and thus much smaller than the size of the speckle pattern; therefore, the electrons excited by the EM wave all move coherently within the antenna.

Figure 28:
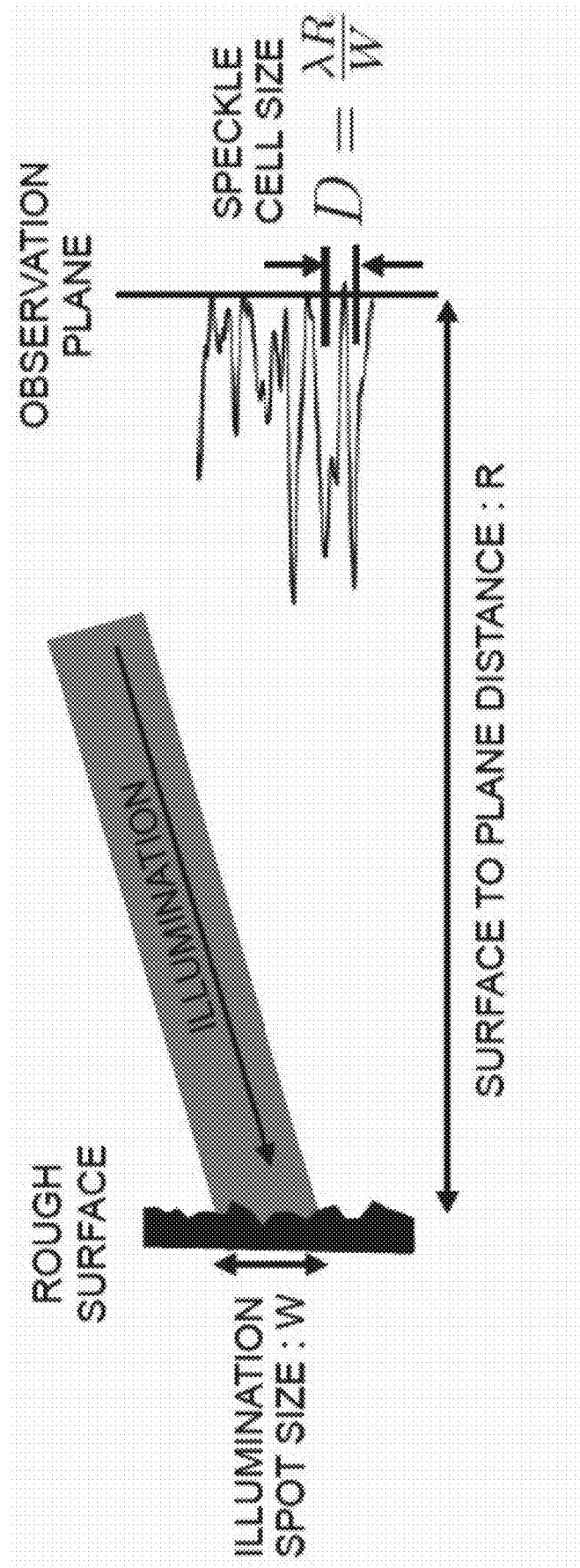
FIG. 28 is a schematic view of an exemplary speckle pattern generated in an observation plane by scattering of light according to embodiments of the present disclosure.

Referring now to FIG. 28, a schematic of the speckle pattern generated in the observation plane (receiver plane) by scattering of light from a rough surface is illustrated. The reference wave (not shown in this image) interferes with the scattered field from the surface in the observation plane and a random interference pattern of maxima and minima results from the random phase distribution (loss of spatial coherence) of a wave scattered from the rough surface (rough on the scale of a wavelength). The characteristic size of the speckle cell size (D) in the interference pattern can be derived using the van Cittert-Zernike theorem and depends on the size of the illuminated spot (W), the range (R), and the illumination wavelength.

The problem with speckle is that the instantaneous phase difference of the reference and probe beam varies randomly across the interference pattern creating out-of-phase photo-generated electrons within the detector. This destructive interference dramatically reduces the combined wave signal level and limits the usable aperture in a heterodyne detector to the coherence area as described by the van Cittert-Zernike theorem. In particular, the signal-to-noise ratio for heterodyne detection of a non-specular target does not increase proportionally to the aperture area but saturates. (The heterodyne mixing efficiency is related to the number of speckle cells within the receive aperture.) The result is that increasing the detector area to a size larger than the speckle cell size does not result in an appreciable increase in the signal or in the signal to noise ratio in a coherent receiver.

Speckle and other interference effects do lead to a variation of RF signal detection with antenna placement, and diversity reception is used to avoid signal loss because of these interference effects. In diversity reception, several antennas are used to simultaneously receive the signal and a system will adaptively switch to the antenna with the strongest signal or simply incoherently add all of the antenna signals. A key point is that the signals are added incoherently since adding the antenna signals coherently can produce signal loss due to destructive interference since the phase of the signal oscillation varies from antenna to antenna. This loss of signal is the same as that which occurs for optical detection when the total signal current results from a sum of out-of-phase photo-generated electrons produced within a detector that collects light from several different speckles.

Diversity reception for optical heterodyne is possible with arrays of photon-counting detectors. In an exemplary embodiment, the detector is composed of an array of pixels each containing several APDs to increase the pixel dynamic range, and each pixel had its own independent acquisition electronics to collect photon arrival times. The target is illuminated by a very brief pulse of light (the pulse duration was chosen to be shorter than the coherence time of the light) and each pixel generated signals and the acquisition recorded a time series of photon arrivals. A fast Fourier transform (FFT) of the photon arrival times for a single pulse for each pixel was computed. Then the magnitude of the FFT is computed to obtain the Power Spectral Density (PSD) of the timestream. The PSD provides the distribution of power into frequency components composing the time series. Since the range and Doppler information for chirped FMCW LIDAR is encoded in the frequency of the heterodyne beatnote but not its phase, the magnitude of the FFT (the PSD) is sufficient information. The resulting pixel channel PDSs were averaged/added (constituting an incoherent sum of the FFTs) for a single pulse and the averaged PSDs for different pulses were also then added. This method allowed signals from detection events both spatially separated (by distances larger than the speckle size) and temporally separated (by times larger than the coherence time of the source) to be averaged to produce a larger SNR than the detection of a single element.

Unlike standard FMCW and PMCW methods where the phase or frequency of the resulting heterodyne beatnote, PSI measurements involve measuring the amplitude or power of the heterodyne signal in a certain measurement band. This means that the PSI signals representing the power or amplitude of interest can simply be added to produce a larger SNR. One architecture to achieve this involves having multiple photodiodes placed in an array to collect light from different regions (each smaller than the coherence area) within the receive aperture. The output of each detector will be a heterodyne beatnote with similar frequencies but different phases. The currents cannot be added, but the square of the currents can be added. That is, the currents can each be rectified by a diode and the resulting rectified current can be added. Alternatively, each signal can be input into a separate power or amplitude detector and the outputs of the detectors can be combined (added) to produce a PSI signal with a larger SNR.

Figure 29:
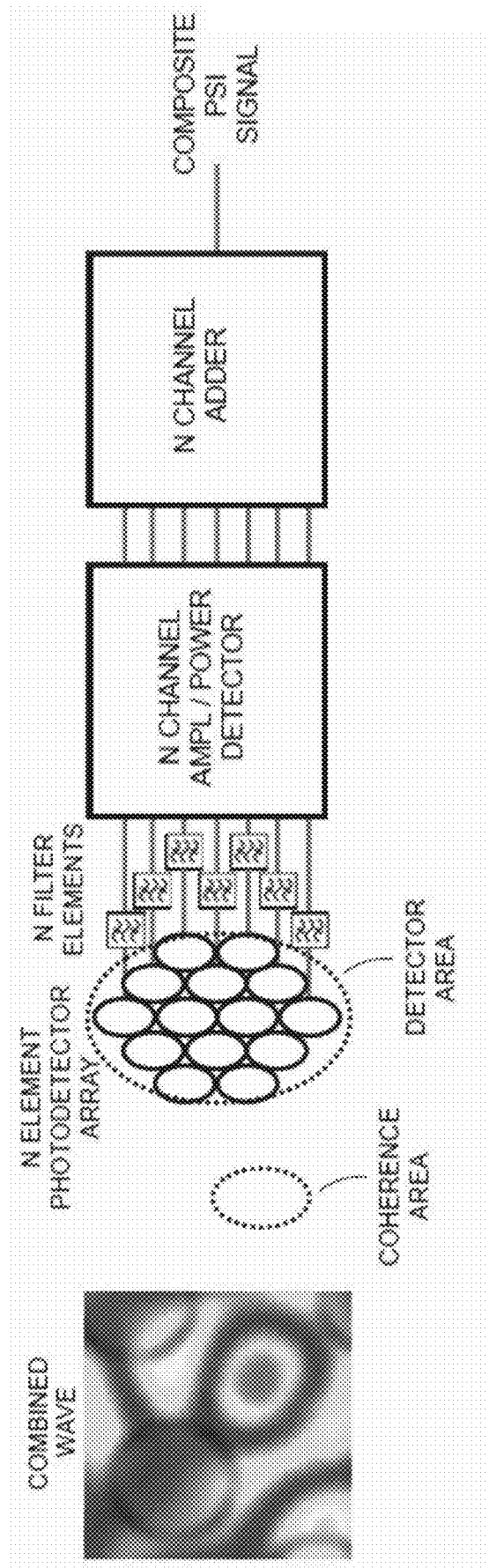
FIG. 29 is a schematic view of an exemplary PSI diversity receiver according to embodiments of the present disclosure.

Referring now to FIG. 29, an exemplary PSI diversity receiver is illustrated. A detector array larger than the coherence area (or speckle cell size) is composed of detection elements each smaller than the coherence area and measures the time dependent amplitude of the combined wave (the reference and problem waves combined). The oscillation of the combined wave on each detector will occur at the same frequencies set by the carrier and phase modulation frequencies, but the phase of the oscillations will be different at the different elements because of the speckle pattern. Thus, the signals from the different detection elements cannot be directly (coherently) added. Instead, the signals are filtered (to isolate the components in the PSI measurement band) and the amplitude or power of each is detected. The resulting signals proportional to the signal or amplitude are then summed to produce a composite PSI signal with a larger SNR than could be achieved with a single detector the size of the array.

Figure 10:
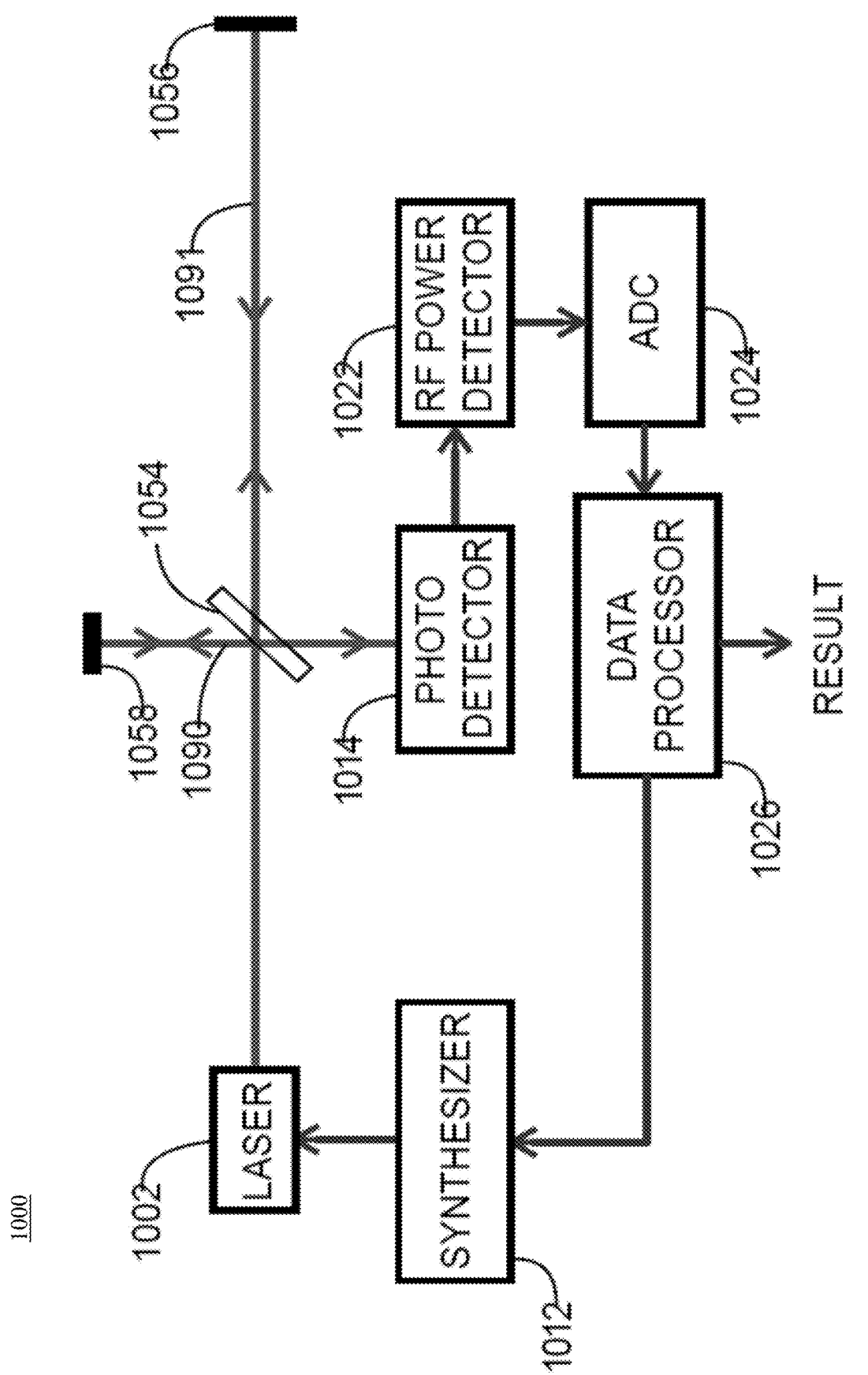
FIG. 10 is a schematic view of an exemplary phase-modulation frequency-stepping power spectrum interferometry apparatus according to embodiments of the present disclosure.

Referring now to FIG. 10, an exemplary frequency-stepping phase-modulation PSI (PM-PSI) apparatus is illustrated. In this example, the phase modulation of the optical field is generated by modulating the current to a diode laser. Device 1000 measures the difference of the optical path-length for light traveling along path 1 1090 and light traveling along path 2 1091. The optical phase of the light emerging from laser 1002 is modulated by varying the current sent to the laser diode, and the current modulation is provided by an electronic signal from synthesizer 1012. The output of synthesizer 1012 is controlled by data processor 1026. Beam splitter 1054 splits the light into the two paths of the interferometer. The light reflects from reflectors 1056, 1058, and the returning beams are recombined by beam splitter 1054 into a beam that is directed to photodetector 1014. The photocurrent generated by the square-law photodetector is proportional to the instantaneous intensity of the incident field and is sent into radio-frequency (RF) power detector 1022. Radio-frequency power detector 1022 produces an output voltage or current that is related to the power in the AC photocurrent and this output is digitized by analog-to-digital converter (ADC) 1024. The digital representation of the RF power is used by data processor 1026 to compute the path-length difference in the interferometer as set forth in greater detail above.

Figure 11:
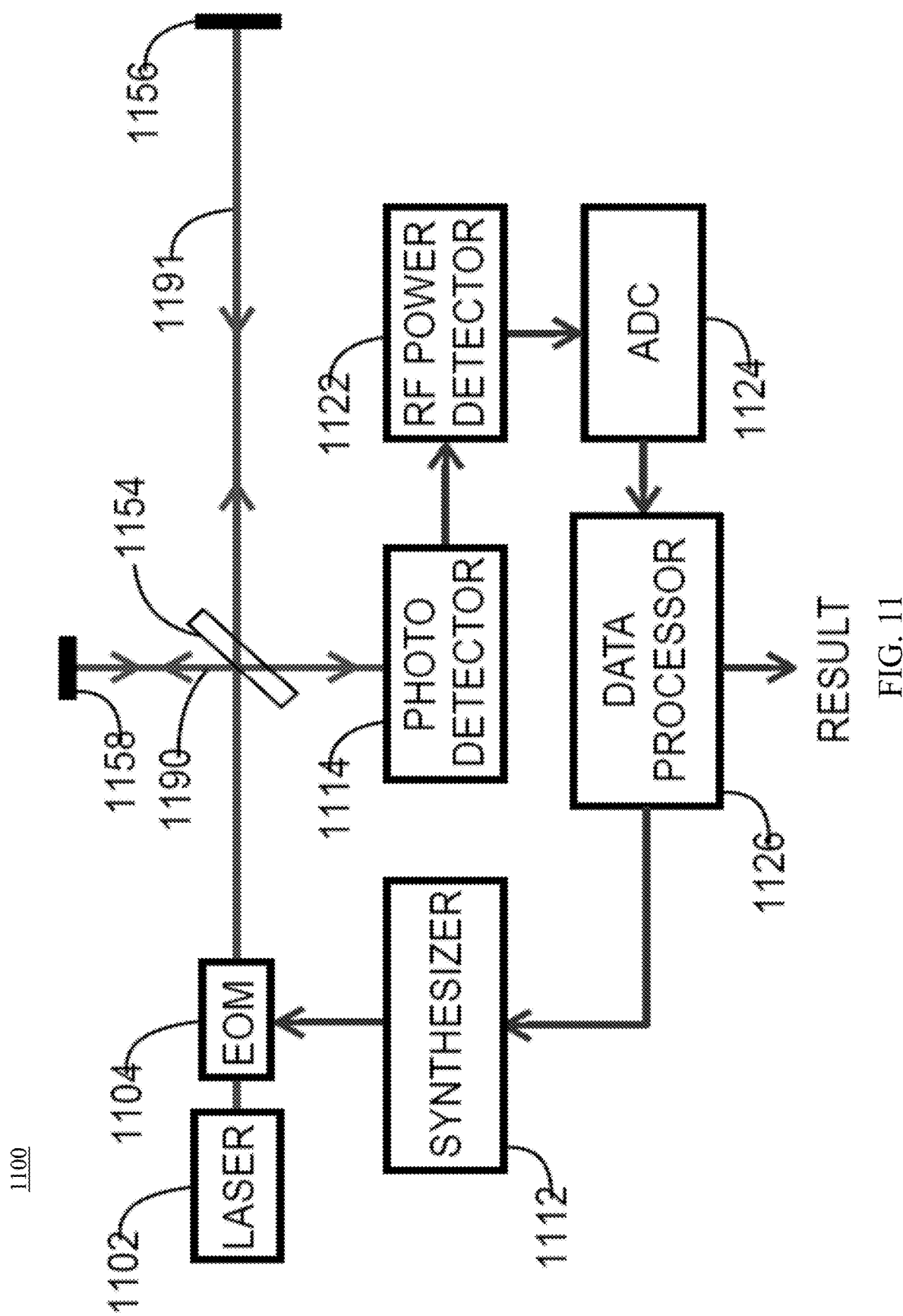
FIG. 11 is a schematic view of an exemplary phase-modulation frequency-stepping power spectrum interferometry apparatus according to embodiments of the present disclosure.

Referring now to FIG. 11, an exemplary frequency-stepping phase-modulation PSI (PM-PSI) apparatus is illustrated. In this example, the phase modulation of the optical field is generated by an electro-optic modulator. Device 1100 measures the difference of the optical pathlength for light traveling along path 1 1190 and light traveling along path 2 1191. The optical phase of the light emerging from laser 1102 is modulated by electro-optic modulator (EOM) 1104 driven by an electronic signal from synthesizer 1112. The output of synthesizer 1112 is controlled by data processor 1126. Beam splitter 1154 splits the light into the two paths of the interferometer. The light reflects from reflectors 1158, 1156 and the returning beams are recombined by beam splitter 1154 into a beam that is directed to photodetector 1114. The photocurrent generated by the square-law photodetector is proportional to the instantaneous intensity of the incident field and is sent into radio-frequency (RF) power detector 1122. Radio-frequency power detector 1122 produces an output voltage or current that is related to the power in the AC photocurrent and this output is digitized by analog-to-digital converter (ADC) 1124. The digital representation of the RF power is used by data processor 1126 to compute the path-length difference in the interferometer as set forth in greater detail above.

Figure 12:
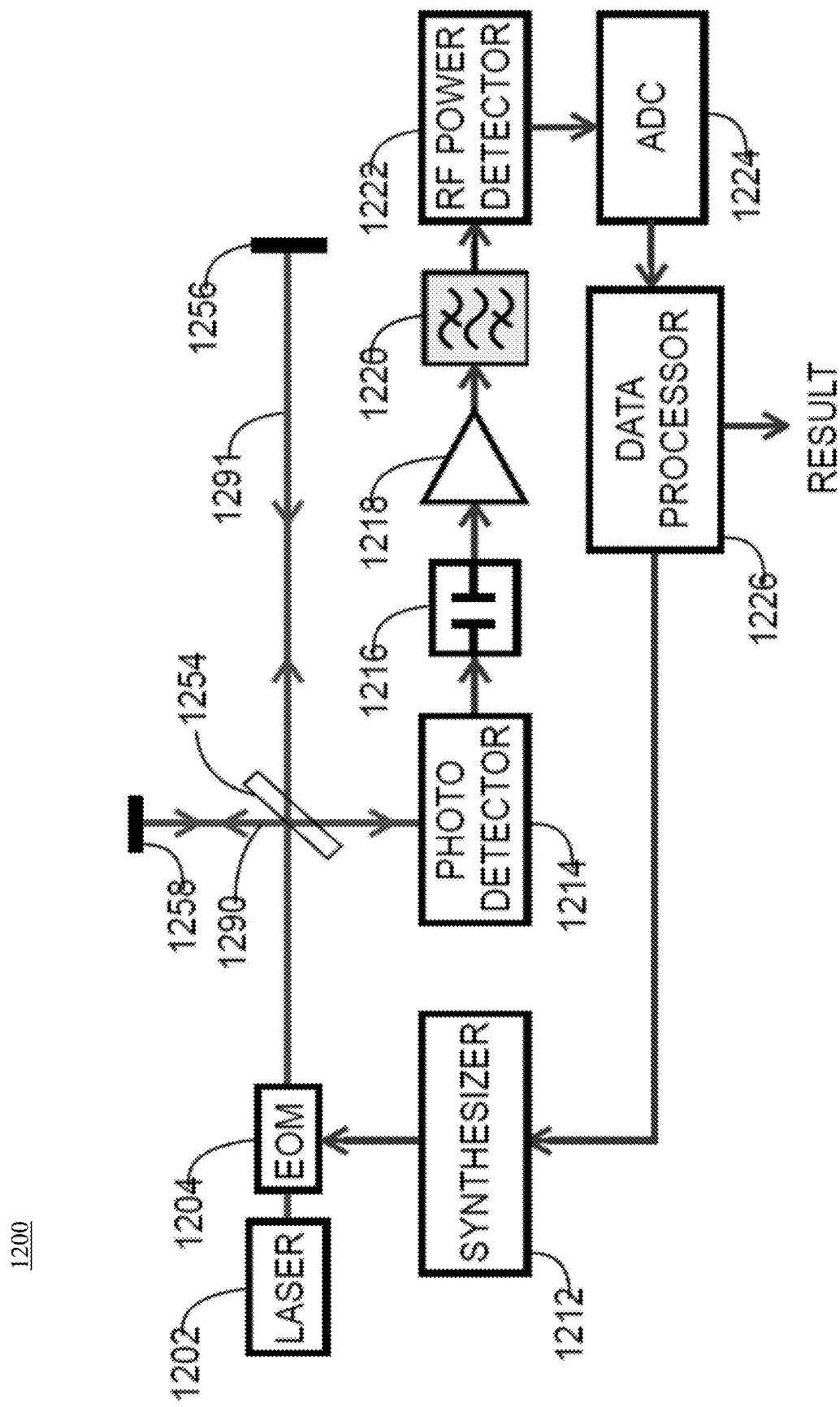
FIG. 12 is a schematic view of an exemplary phase-modulation frequency-stepping power spectrum interferometry apparatus according to embodiments of the present disclosure.

Referring now to FIG. 12, an exemplary frequency-stepping phase-modulation PSI (PM-PSI) apparatus is illustrated. In this example, device 1200 measures the difference of the optical pathlength for light traveling along path 1 1290 and light traveling along path 2 1291. The optical phase of the light emerging from laser 1202 is modulated by electro-optic modulator (EOM) 1204, driven by an electronic signal from synthesizer 1212. The output of synthesizer 1212 is controlled by data processor 1226. Beam splitter 1254 splits the light into the two paths of the interferometer. The light reflects from reflectors 1256, 1258 and the returning beams are recombined by beam splitter 1254 into a beam that is directed to photodetector 1214. The photocurrent generated by the square-law photodetector is proportional to the instantaneous intensity of the incident field and is sent through DC block 1216. The AC part of the photocurrent is passed into amplifier 1218 and then through band-pass filter 1220 into radio-frequency (RF) power detector 1222. Radio-frequency power detector 1222 produces an output voltage or current that is related to the power in the AC photocurrent. This output is digitized by analog-to-digital converter (ADC) 1224. The digital representation of the RF power is used by data processor 1226 to compute the path-length difference in the interferometer as set forth in greater detail above.

Figure 13:
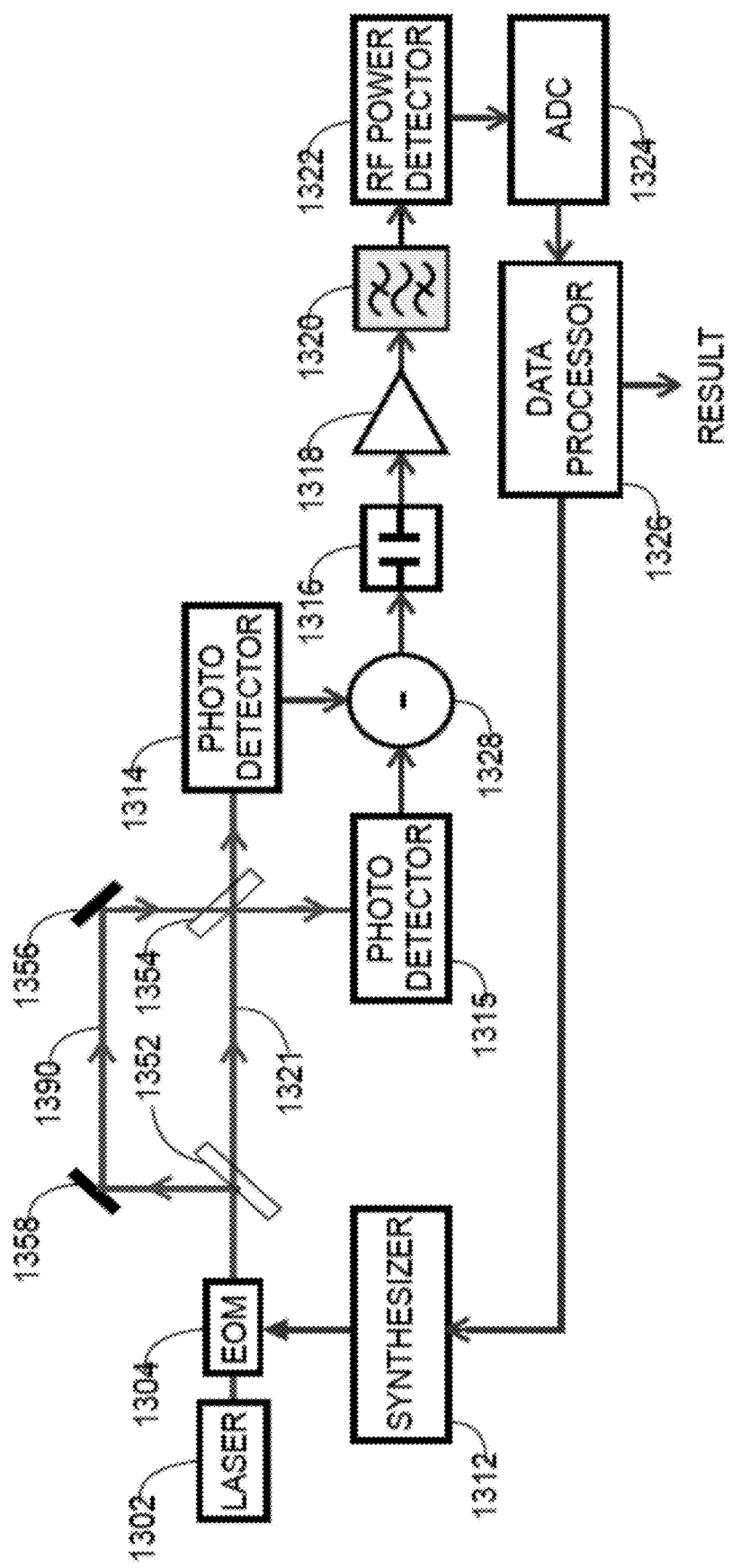
FIG. 13 is a schematic view of an exemplary phase-modulation frequency-stepping power spectrum interferometry apparatus with balanced photodetection according to embodiments of the present disclosure.

Referring now to FIG. 13, an exemplary frequency-stepping phase-modulation PSI (PM-PSI) apparatus with balanced photodetection is illustrated. In this example, device 1300 measures the difference of the optical path-length for light traveling along path 1 1390 and light traveling along path 2 1391. The optical phase of the light emerging from laser 1302 is modulated by electro-optic modulator (EOM) 1304 driven by an electronic signal from synthesizer 1312. The output of synthesizer 1312 is controlled by data processor 1326. Beam splitter 1352 splits the light into the two paths of the interferometer. The light in the upper arm of the interferometer reflects from reflector 1356 and from reflector 1358. The reflected light is recombined with the other beam by beam splitter 1354 and the beams are directed to photodetector 1314 and photodetector 1315. The photocurrents generated by the square-law photodetectors are proportional to the instantaneous intensity of the incident fields. A current proportional to the difference of the photocurrents is produced at 1328, and the resulting photocurrent difference is sent through DC block 1316. The AC part of the photocurrent difference is passed into amplifier 1318 and through band-pass filter 1320 into radio-frequency (RF) power detector 1322. Radio-frequency power detector 1322 produces an output voltage or current that is related to the power in the AC photocurrent. This output is digitized by analog-to-digital converter (ADC) 1324. The digital representation of the RF power is used by data processor 1326 to compute the path-length difference in the interferometer as set forth in greater detail above.

Figure 14:
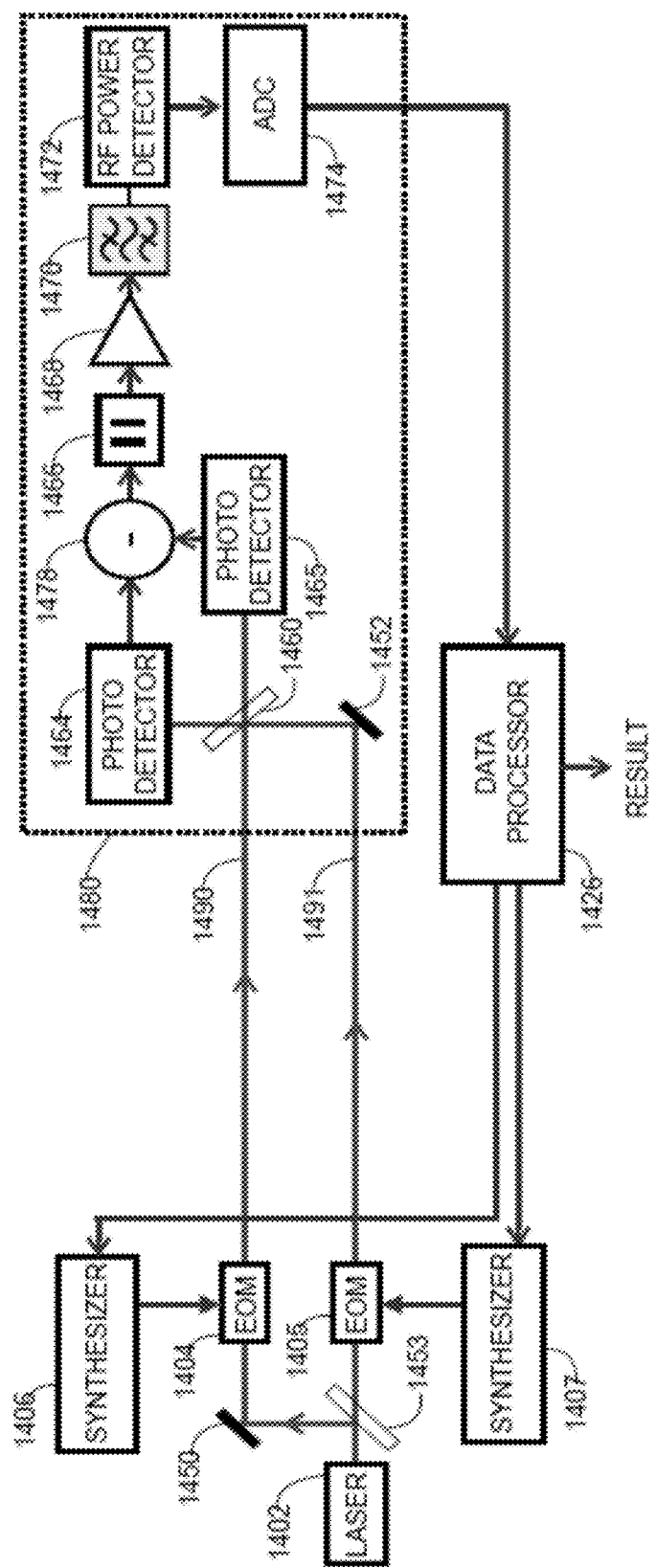
FIG. 14 is a schematic view of an exemplary phase-modulation phase-stepping power spectrum interferometry apparatus with balanced photodetection according to embodiments of the present disclosure.

Referring now to FIG. 14, an exemplary phase-stepping phase-modulation PSI (PM-PSI) apparatus with balanced photodetection is illustrated. In this example, device 1400 measures the difference of the optical pathlength for light traveling along path 1 1490 and light traveling along path 2 1491. Light emerging from the 1402 is split by beamsplitter 1453 into two paths. One passes through and is modulated by electro-optic modulator (EOM) 1405, driven by an electronic signal from synthesizer 1407. The other beam reflects from mirror 1450 and passes through and is modulated by electro-optic modulator (EOM) 1404, driven by an electronic signal from synthesizer 1406. The outputs of the two synthesizers 1406, 1407 are controlled by data processor 1426. The two beams travel along path 1 1490 and path 2 1491 and are recombined by mirror 1452 and beamsplitter 1460 into two beams that are directed to photodetectors 1464, 1465. The photocurrents generated by the square-law photodetectors are proportional to the instantaneous intensity of the incident fields. A current proportional to the difference of the photocurrents is provided at 1478, and the resulting photocurrent difference is sent through DC block 1466. The AC part of the photocurrent difference is passed into an amplifier 1468 and through a band-pass filter 1470 into radio-frequency (RF) power detector 1472. Radio-frequency power detector 1472 produces an output voltage or current that is related to the power in the AC photocurrent. This output is digitized by analog-to-digital converter (ADC) 1474. The digital representation of the RF power is used by data processor 1426 to compute the path-length difference in the interferometer as set forth in greater detail above.

Figure 15:
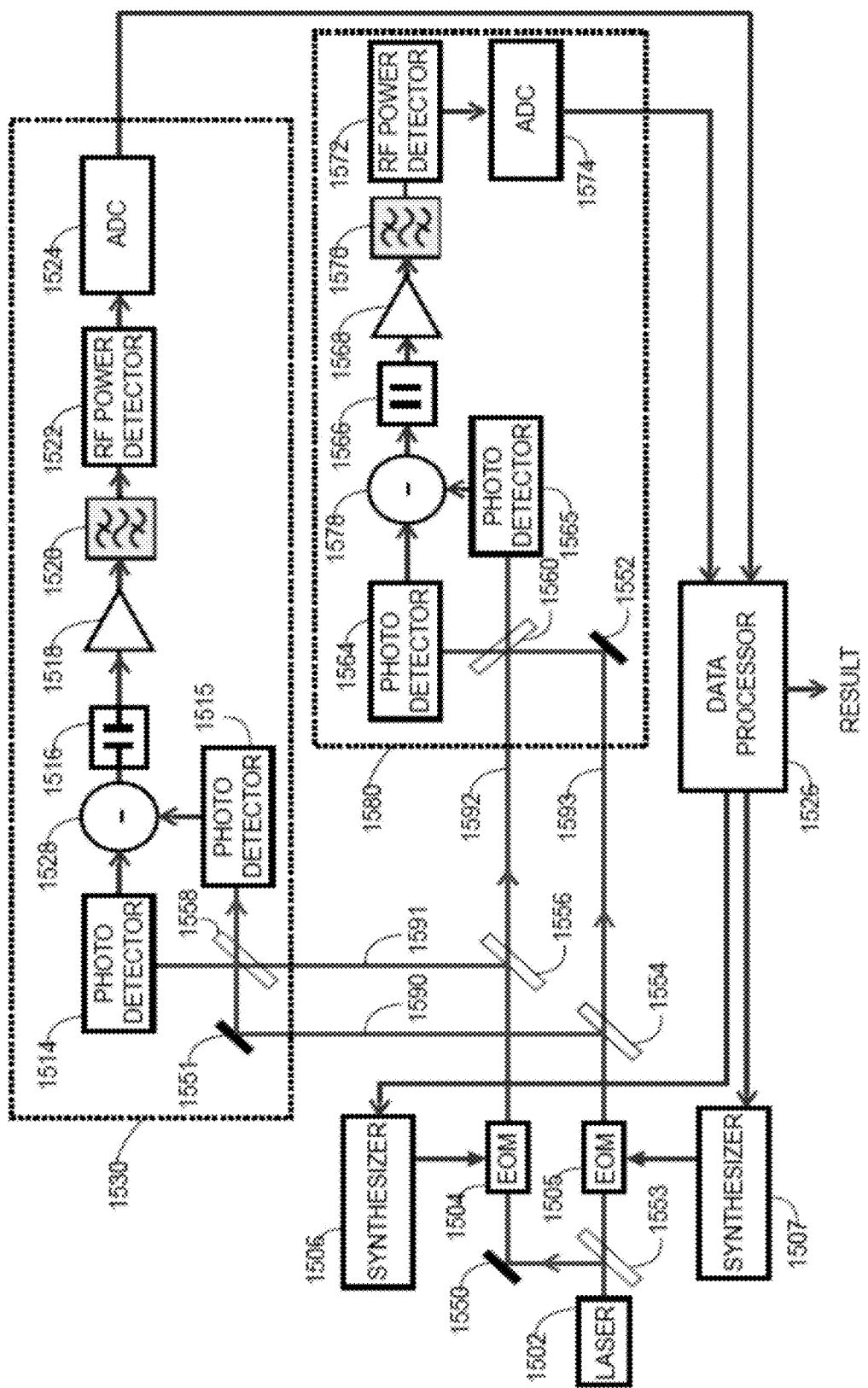
FIG. 15 is a schematic view of an exemplary phase-modulation phase-stepping power spectrum interferometry apparatus with balanced photodetection and a reference interferometer according to embodiments of the present disclosure.

Referring now to FIG. 15, an exemplary phase-stepping phase-modulation PSI (PM-PSI) apparatus with balanced photodetection and a reference interferometer is illustrated. In this example, device 1500 measures the difference of the optical pathlength for light traveling along path 1 1590 and path 2 1591 as well as the optical pathlength for light traveling along path 1 1592 and path 2 1593. The upper detection block 1530 is the reference interferometer, and is used to provide a local measurement of the output of electro-optic modulators 1504, 1505. This local measurement is used to provide feedback through data processor 1526 to control the amplitude of the RF of synthesizers 1506, 1507 in order to equalize the modulation depth produced by electro-optic modulators 1504, 1505. This local measurement is also used to determine the instantaneous phase difference of the light emerging from the two EOMs.

Light emerging from laser 1502 is split by beamsplitter 1553 into two paths. One passes through and is modulated by electro-optic modulator (EOM) 1505 driven by an electronic signal from the synthesizer 1507 while the other beam reflects from mirror 1550 and passes through and is modulated by the (EOM) electro-optic modulator 1504 driven by an electronic signal from the synthesizer 1506. The outputs of the two synthesizers 1506, 1507 are controlled by the data processor 1526.

The two beams that emerge from EOMs 1504, 1505 are split by beamsplitters 1554, 1556 into two pairs of paths. The first pair follows paths 1590, 1591 into the reference interferometer 1530. The second pair follows paths 1592, 1593, whose path length difference is measured by detection block 1580. Each detection block is similarly configured. The beam pairs of the interferometers are recombined on beamsplitters 1560, 1558 after reflection by mirrors 1552, 1551. The intensity of the beams emerging from the beamsplitters are measured by photodetectors 1565, 1564, 1515, 1514. The photocurrents generated by the square-law photodetectors are used to produce a current proportional to the difference of the photocurrents at 1578, 1528. The resulting photocurrent differences are sent through DC blocks 1566, 1516. The AC part of the photocurrent difference is passed into amplifiers 1568, 1518, through band-pass filters 1570, 1520, and into radio-frequency (RF) power detectors 1572, 1522. The radio-frequency power detector output signals are digitized by analog-to-digital converters (ADC) 1574, 1524. The digital representation of the RF power signals are used by data processor 1526 to compute the path-length difference in the interferometers as set forth in greater detail above.

One of skill in the art will appreciate that a variety of lasers are suitable for use in the various embodiments described herein. By way of illustration, and not limitation, such suitable lasers include: visible laser diodes, for example those having center wavelengths from 404 nm to 690 nm available from Thorlabs, Inc.; NIR laser diodes, for example those having center wavelengths from 705 nm to 2000 nm available from Thorlabs, Inc.; Quantum Cascade Lasers (QCLs), for example those available from Thorlabs, Inc.; $CO_2$ and CO Lasers, for example those available from Coherent Inc.; Diode-Pumped Solid-State Lasers, for example those available from Coherent Inc.; Laser Diode Modules, for example those available from Coherent Inc.; OBIS Lasers, for example those available from Coherent Inc.; sapphire lasers, for example those available from Coherent Inc.; continuous wave (CW) solid-state lasers, for example those available from Coherent Inc. including those under the OBIS, Genesis, CUBE, and Compass names; optically pumped semiconductor lasers, for example those available from Coherent Inc. including those under the Verdi name; and visible mini diode laser modules, for example those available from Coherent Inc.

One of skill in the art will appreciate that a variety of modulators are suitable for use in the various embodiments described herein. By way of illustration, and not limitation, such suitable modulators include: free-space electro-optic modulators, for example those available from Thorlabs, Inc.; liquid crystal EO amplitude modulators, for example those available from Thorlabs, Inc.; lithium niobate modulators, for example those available from Thorlabs, Inc.; high frequency analog intensity modulators, for example those available from Thorlabs, Inc.; electro-optic modulators available from Newport Corporation; and electro-optic modulators available from QUBIG GmbH.

As used above, a data processor may refer to a computing node or other device for performing the data processing methods described above.

Various exemplary embodiments above are described in terms of minima of the representation of the power of an AC component. However, it will be appreciated that either the minima or maxima (collectively, extrema) may be used as set forth above.

As set out above, a target range (or the path length difference in the interferometer) may be determined by examining the location of the extrema of the power contained in the AC photocurrent as a function of the modulation frequency or as a function of the phase offset of the modulation. In addition, a target range may also be found by examining the shape of the AC power as a function of the frequency or phase offset of the modulation. As shown in FIG. 6A, the power contained in the AC photocurrent at the modulation frequency $f_m$ is proportional to $|J_1(z)|^2$ where $z=2\alpha \sin(\omega_m T/2)$. For small modulation depths ($\alpha<<1$), z is small enough that $J_1(z)$ is simply proportional to z. Thus, the power at $f_m$ is proportional to the function $f(\omega_m)=\sin^2(\omega_m T/2)$. By varying $\omega_m$ and fitting the AC power detected to $f(\omega_m)$, the value of T can be found.

More generally, for any value of a, the shape of the AC power versus phase offset or frequency can be fit to the expected function, where the fit determines both T and $\alpha$. That is, the power as a function of frequency can be fit to the function $A|J_1(z)|^2$ where A is an overall scale factor and $z=2\alpha \sin(\omega_m T/2)$. For small $\alpha$, $J_1$ is monotonic in z, making the fitting easier. As an example, for $z<1.8$, a should be less than 0.9.

Figure 17:
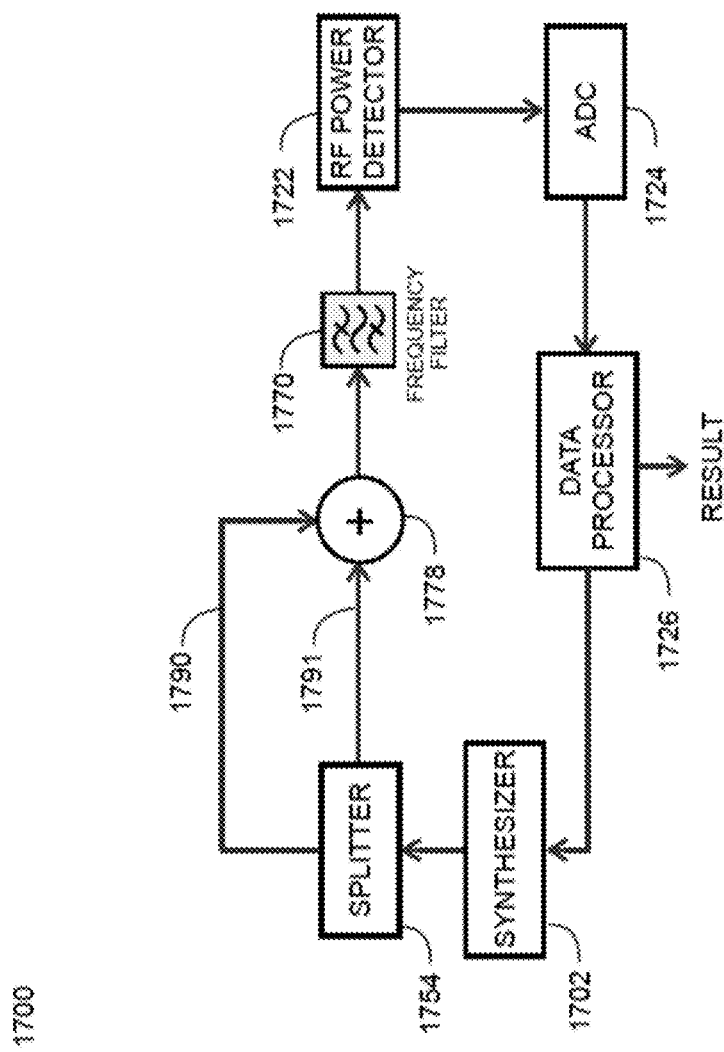
FIG. 17 is a schematic view of an exemplary frequency PSI (C-PSI) apparatus according to embodiments of the present disclosure.

Referring now to FIG. 17, an exemplary carrier frequency PSI (C-PSI) apparatus is illustrated. In this example, a microwave field with a variable carrier frequency is generated by a synthesizer. Device 1700 measures the difference of the time delay for the electro-magnetic (EM) wave traveling along the probe path 1790 and the wave traveling along the reference path 1791. The carrier frequency of the wave emerging from synthesizer 1702 is controlled by data processor 1726. Wave splitter 1754 splits the wave into the two paths of the interferometer, the probe path 1790 and the reference path 1791. The waves are combined by an adder element 1778. The resulting combined wave signal is passed through a band-pass filter 1770 and into a power detector 1722. The power detector 1722 produces an output voltage or current that is related to the power in the AC component of the combined wave signal and this output is digitized by analog-to-digital converter (ADC) 1724. The digital representation of the AC power is used by data processor 1726 to compute the path-length difference in the interferometer as set forth in greater detail above.

Figure 18:
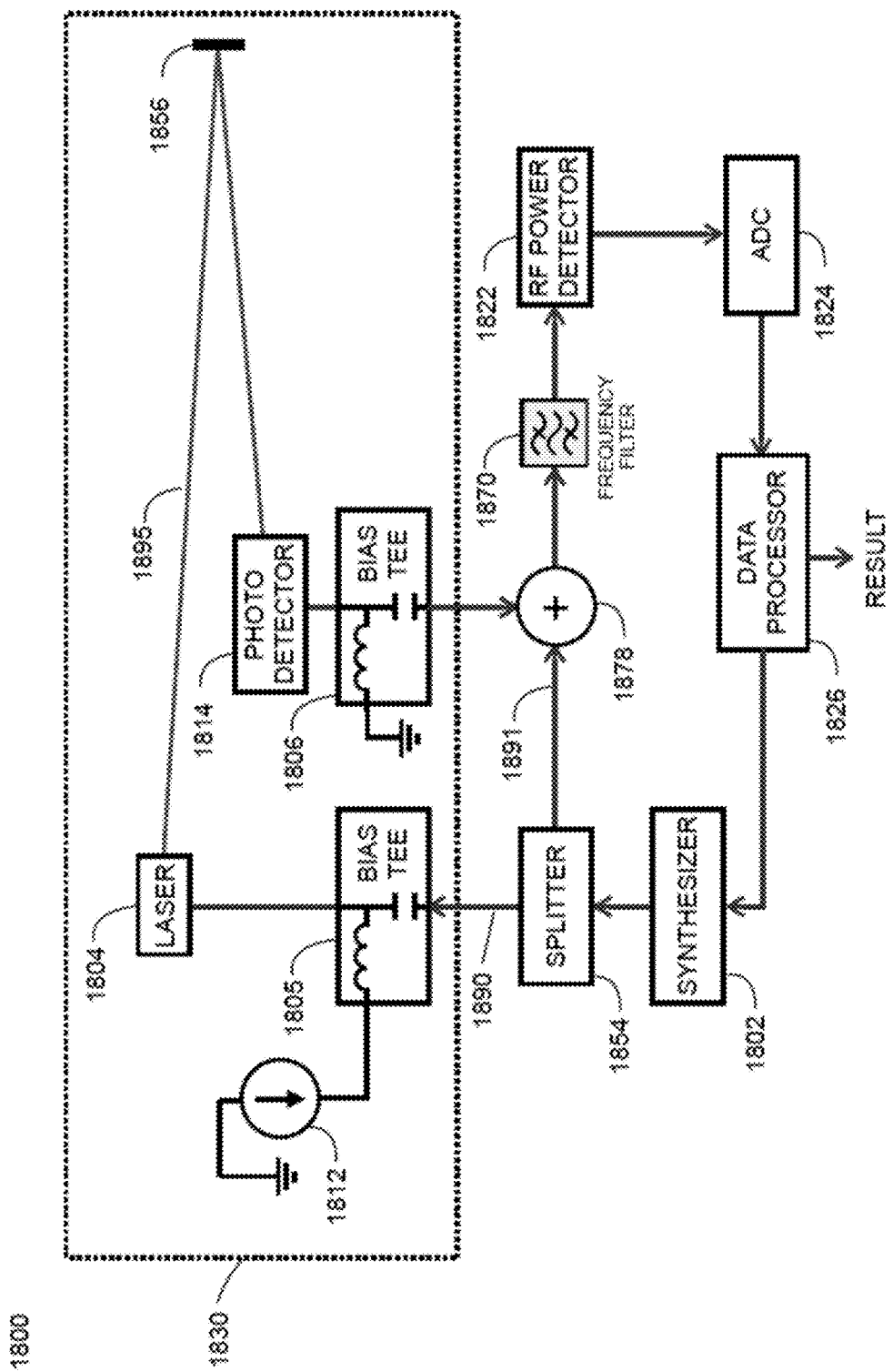
FIG. 18 is a schematic view of an exemplary carrier frequency PSI (C-PSI) apparatus with amplitude encoding or amplitude modulation according to embodiments of the present disclosure.

Referring now to FIG. 18, an exemplary carrier frequency PSI (C-PSI) apparatus with amplitude encoding or amplitude modulation is illustrated. In this example, a microwave field with a variable carrier frequency is generated by a synthesizer. Device 1800 measures the difference of the time delay for the electro-magnetic (EM) wave traveling along the probe path 1890 and the wave traveling along the reference path 1891. The probe path 1890 includes an encoding of the probe wave into and a decoding of the probe wave from the amplitude of an optical wave illustrated in block 1830. The carrier frequency of the wave emerging from the synthesizer 1802 is controlled by data processor 1826. Wave splitter 1854 splits the wave into the two paths of the interferometer, the probe path 1890 and the reference path 1891. The probe wave is passed through a bias tee (diplexer) 1805 and combined with a DC current generated by a current source 1812. The combined current drives a laser diode 1804 producing an optical wave whose amplitude encodes the probe wave. This optical wave propagates along path 1895, reflects or scatters from a target 1856, and returns to and is detected by a photodetector 1814. The photocurrent including a DC and AC component is separated in a bias tee 1806 and the AC component, corresponding to the probe wave, is combined with the reference wave by an adder element 1878. The resulting combined wave signal is passed through a band-pass filter 1870 and into a power detector 1822. The power detector 1822 produces an output voltage or current that is related to the power in the AC component of the combined wave signal and this output is digitized by analog-to-digital converter (ADC) 1824. The digital representation of the AC power is used by data processor 1826 to compute the path-length difference in the interferometer as set forth in greater detail above.

Figure 19:
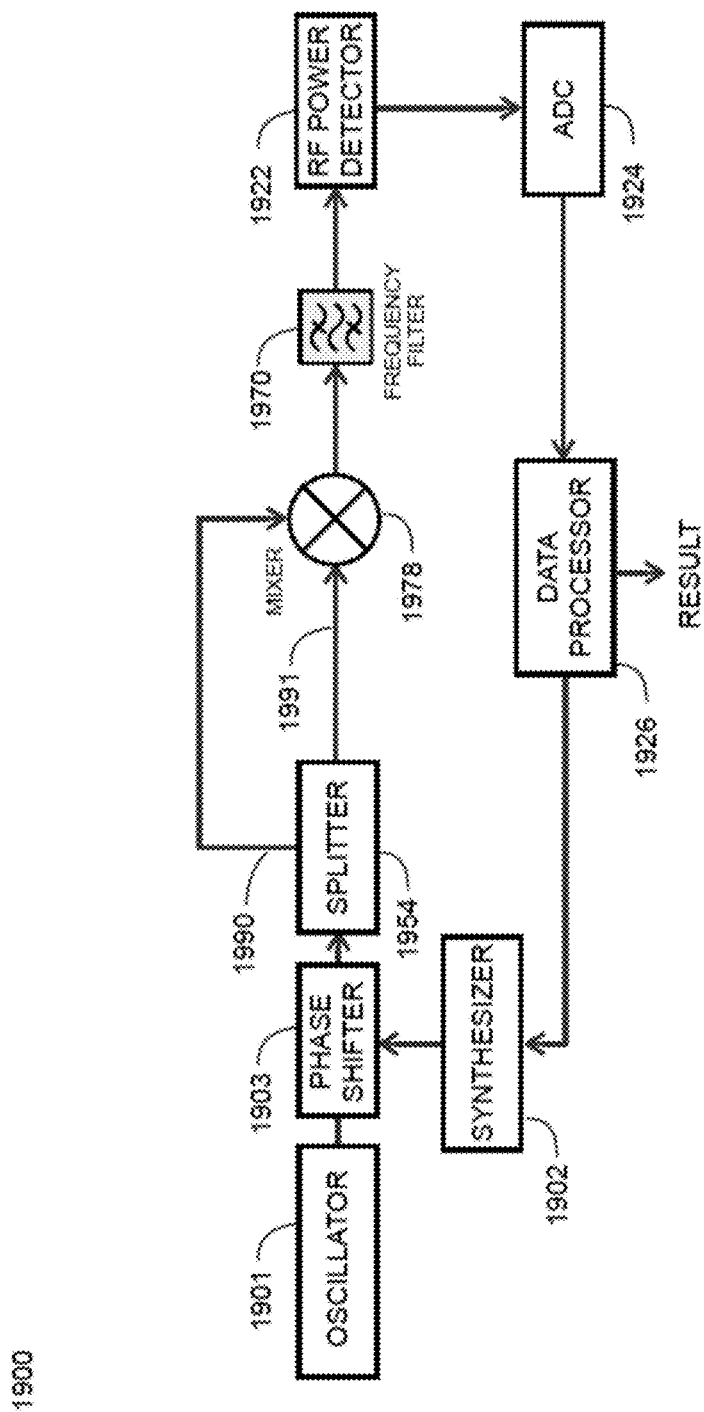
FIG. 19 is a schematic view of an exemplary phase modulation PSI (PM-PSI) apparatus with wave combination by wave multiplication according to embodiments of the present disclosure.

Referring now to FIG. 19, an exemplary phase modulation PSI (PM-PSI) apparatus with wave combination by wave multiplication is illustrated. In this example, a microwave field is generated by an oscillator. Device 1900 measures the difference of the time delay for the electro-magnetic (EM) wave traveling along the probe path 1990 and the wave traveling along the reference path 1991. The phase of the wave emerging from the oscillator 1901 is modulated by a voltage controlled phase shifting element 1903 driven by an electronic signal from synthesizer 1902. The output of synthesizer 1902 is controlled by data processor 1926. Wave splitter 1954 splits the wave into the two paths of the interferometer, the probe path 1990 and the reference path 1991. The waves are combined by multiplication in a mixer 1978. The resulting combined wave signal is passed through a band-pass filter 1970 and into a power detector 1922. The power detector 1922 produces an output voltage or current that is related to the power in the AC component of the combined wave signal and this output is digitized by analog-to-digital converter (ADC) 1924. The digital representation of the AC power is used by data processor 1926 to compute the path-length difference in the interferometer as set forth in greater detail above.

Figure 20:
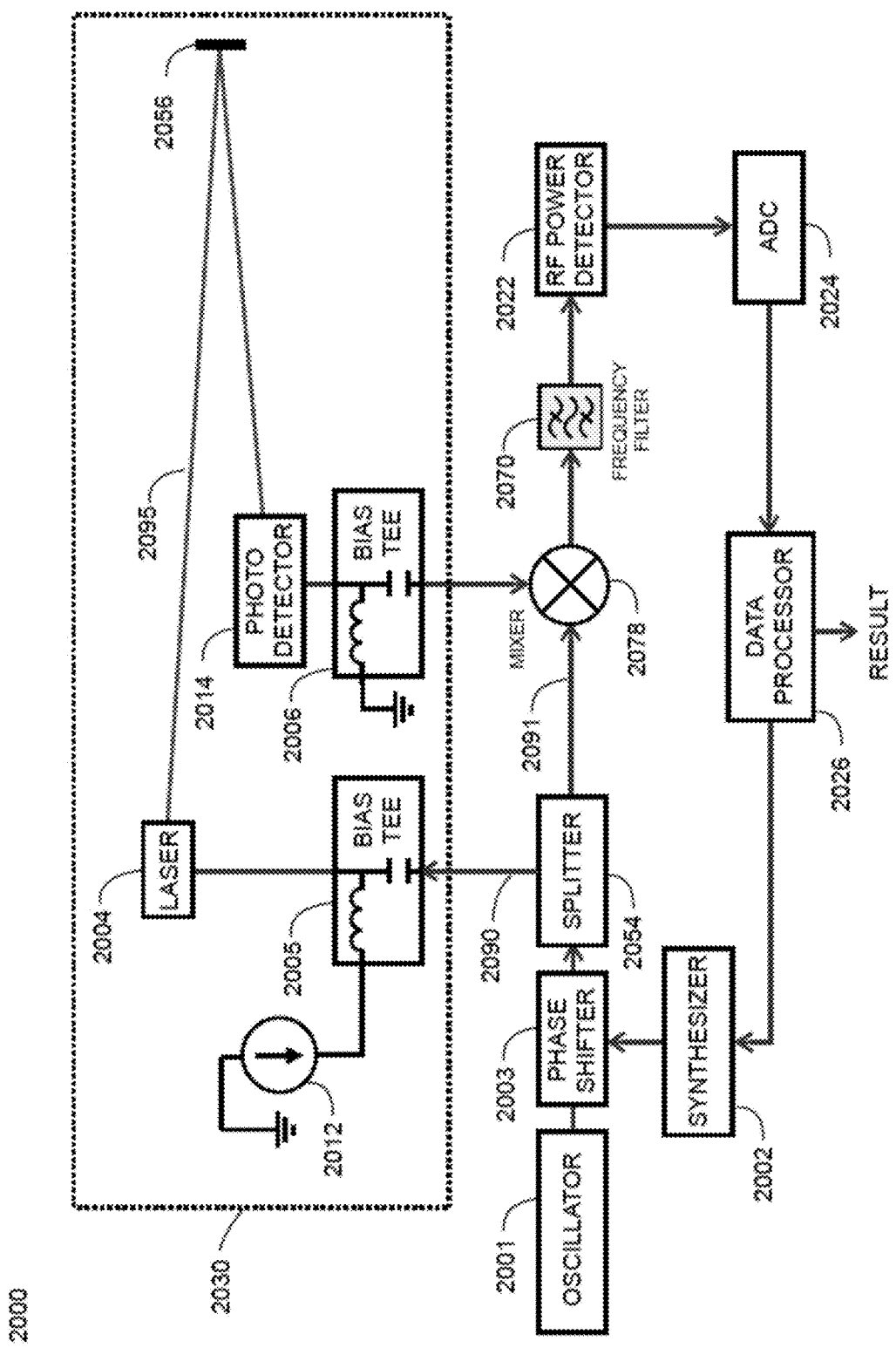
FIG. 20 is a schematic view of an exemplary phase modulation PSI (PM-PSI) apparatus with amplitude encoding (amplitude modulation) and wave combination by wave multiplication according to embodiments of the present disclosure.

Referring now to FIG. 20, an exemplary phase modulation PSI (PM-PSI) apparatus with amplitude encoding (amplitude modulation) and wave combination by wave multiplication is illustrated. In this example, a microwave field is generated by an oscillator. Device 2000 measures the difference of the time delay for the electro-magnetic (EM) wave traveling along the probe path 2090 and the wave traveling along the reference path 2091. The probe path 2090 includes an encoding of the probe wave into and a decoding of the probe wave from the amplitude of an optical wave illustrated in block 2030. The phase of the wave emerging from the oscillator 2001 is modulated by a voltage controlled phase shifting element 2003 driven by an electronic signal from synthesizer 2002. The output of synthesizer 2002 is controlled by data processor 2026. Wave splitter 2054 splits the wave into the two paths of the interferometer, the probe path 2090 and the reference path 2091. The probe wave is passed through a bias tee (diplexer) 2005 and combined with a DC current generated by a current source 2012. The combined current drives a laser diode 2004 producing an optical wave whose amplitude encodes the probe wave. This optical wave propagates along path 2095, reflects or scatters from a 2056, and returns to and is detected by a photodetector 2014. The photocurrent including a DC and AC component is separated in a bias tee 2006 and the AC component, corresponding to the probe wave, is combined with the reference wave traveling along 2091 by multiplication in a mixer 2078. The resulting combined wave signal is passed through a band-pass filter 2070 and into a power detector 2022. The power detector 2022 produces an output voltage or current that is related to the power in the AC component of the combined wave signal and this output is digitized by analog-to-digital converter (ADC) 2024. The digital representation of the AC power is used by data processor 2026 to compute the path-length difference in the interferometer as set forth in greater detail above.

Figure 21:
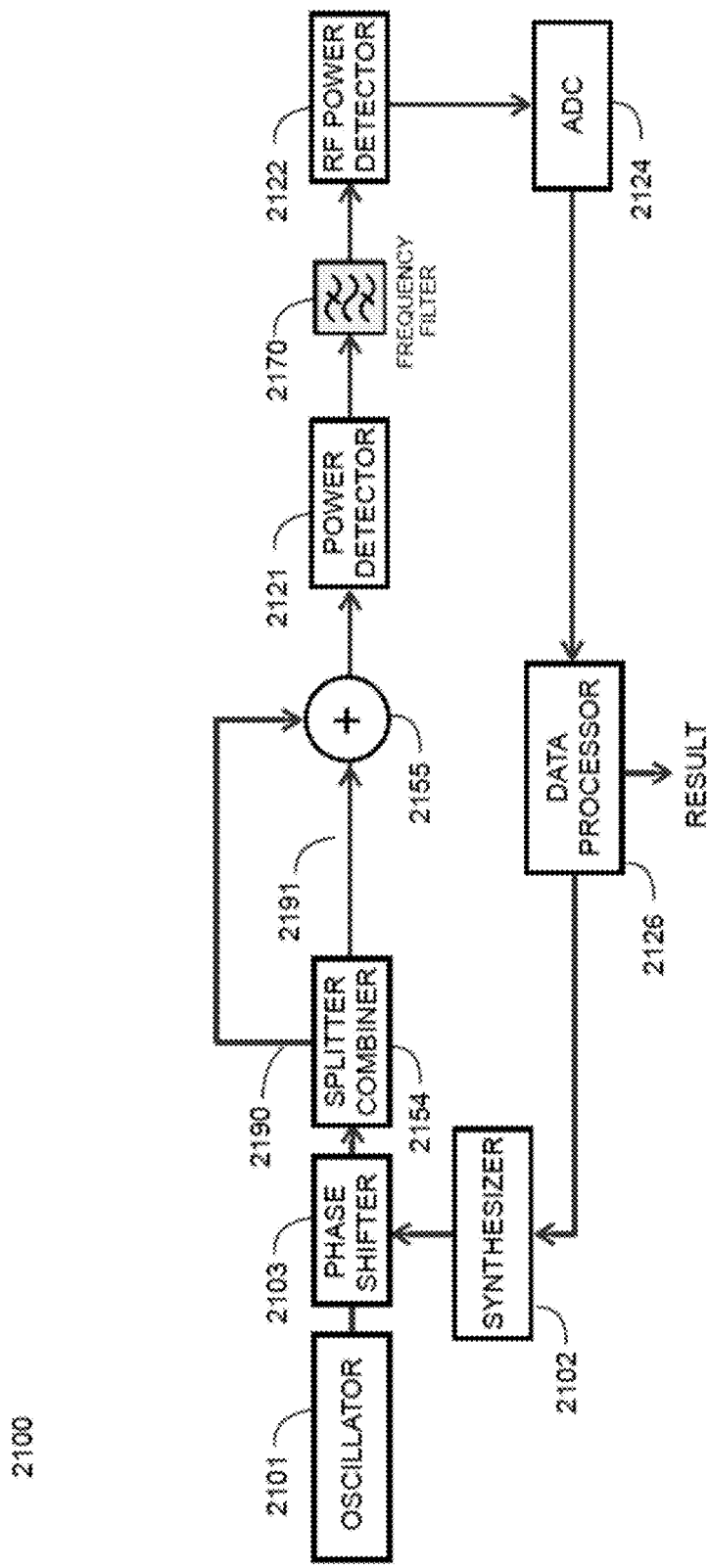
FIG. 21 depicts an exemplary phase modulation PSI (PM-PSI) apparatus with wave combination by wave addition followed by a square law detector according to embodiments of the present disclosure.

Referring now to FIG. 21, an exemplary phase modulation PSI (PM-PSI) apparatus with wave combination by wave addition followed by a square law detector is illustrated. In this example, a microwave field is generated by an oscillator. Device 2100 measures the difference of the time delay for the electro-magnetic (EM) wave traveling along the probe path 2190 and the wave traveling along the reference path 2191. The phase of the wave emerging from the oscillator 2101 is modulated by a voltage controlled phase shifting element 2103 driven by an electronic signal from synthesizer 2102. The output of synthesizer 2102 is controlled by data processor 2126. Wave splitter 2154 splits the wave into the two paths of the interferometer, the probe path 2190 and the reference path 2191. The waves are combined by an adder 2155 followed by square law detection 2121. The resulting combined wave signal is passed through a band-pass filter 2170 and into a power detector 2122. The power detector 2122 produces an output voltage or current that is related to the power in the AC component of the combined wave signal and this output is digitized by analog-to-digital converter (ADC) 2124. The digital representation of the AC power is used by data processor 2126 to compute the path-length difference in the interferometer as set forth in greater detail above.

Figure 22:
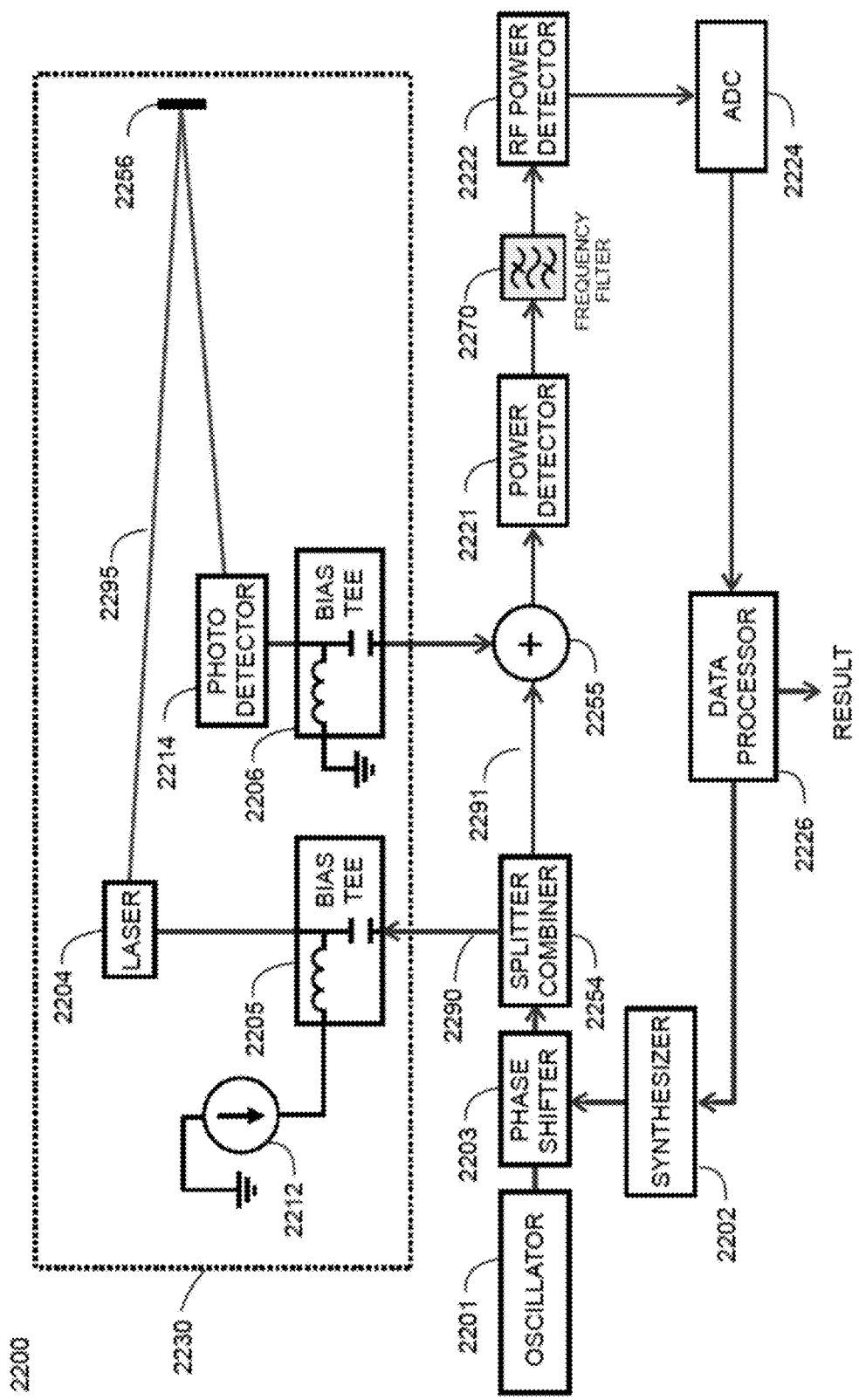
FIG. 22 depicts an exemplary phase modulation PSI (PM-PSI) apparatus with amplitude encoding and with wave combination by wave addition followed by a square law detector according to embodiments of the present disclosure.

Referring now to FIG. 22, an exemplary phase modulation PSI (PM-PSI) apparatus with amplitude encoding and with wave combination by wave addition followed by a square law detector is illustrated. In this example, a microwave field is generated by an oscillator. Device 2200 measures the difference of the time delay for the electro-magnetic (EM) wave traveling along the probe path 2290 and the wave traveling along the reference path 2291. The probe path 2290 includes an encoding of the probe wave into and a decoding of the probe wave from the amplitude of an optical wave illustrated in block 2230. The phase of the wave emerging from the oscillator 2101 is modulated by a voltage controlled phase shifting element 2103 driven by an electronic signal from synthesizer 2102. The output of synthesizer 2102 is controlled by data processor 2126. Wave splitter 2154 splits the wave into the two paths of the interferometer, the probe path 2190 and the reference path 2191. The probe wave is passed through a bias tee (diplexer) 2205 and combined with a DC current generated by a current source 2212. The combined current drives a laser diode 2204 producing an optical wave whose amplitude encodes the probe wave. This optical wave propagates along path 2295, reflects or scatters from a 2256, and returns to and is detected by a photodetector 2214. The photocurrent including a DC and AC component is separated in a bias tee 2206 and the AC component, corresponding to the probe wave, is combined with the reference wave traveling along 2291 by an adder 2255 followed by square law detection 2221. The resulting combined wave signal is passed through a band-pass filter 2270 and into a power detector 2222. The power detector 2222 produces an output voltage or current that is related to the power in the AC component of the combined wave signal and this output is digitized by analog-to-digital converter (ADC) 2224. The digital representation of the AC power is used by data processor 2226 to compute the path-length difference in the interferometer as set forth in greater detail above.

Figure 25:
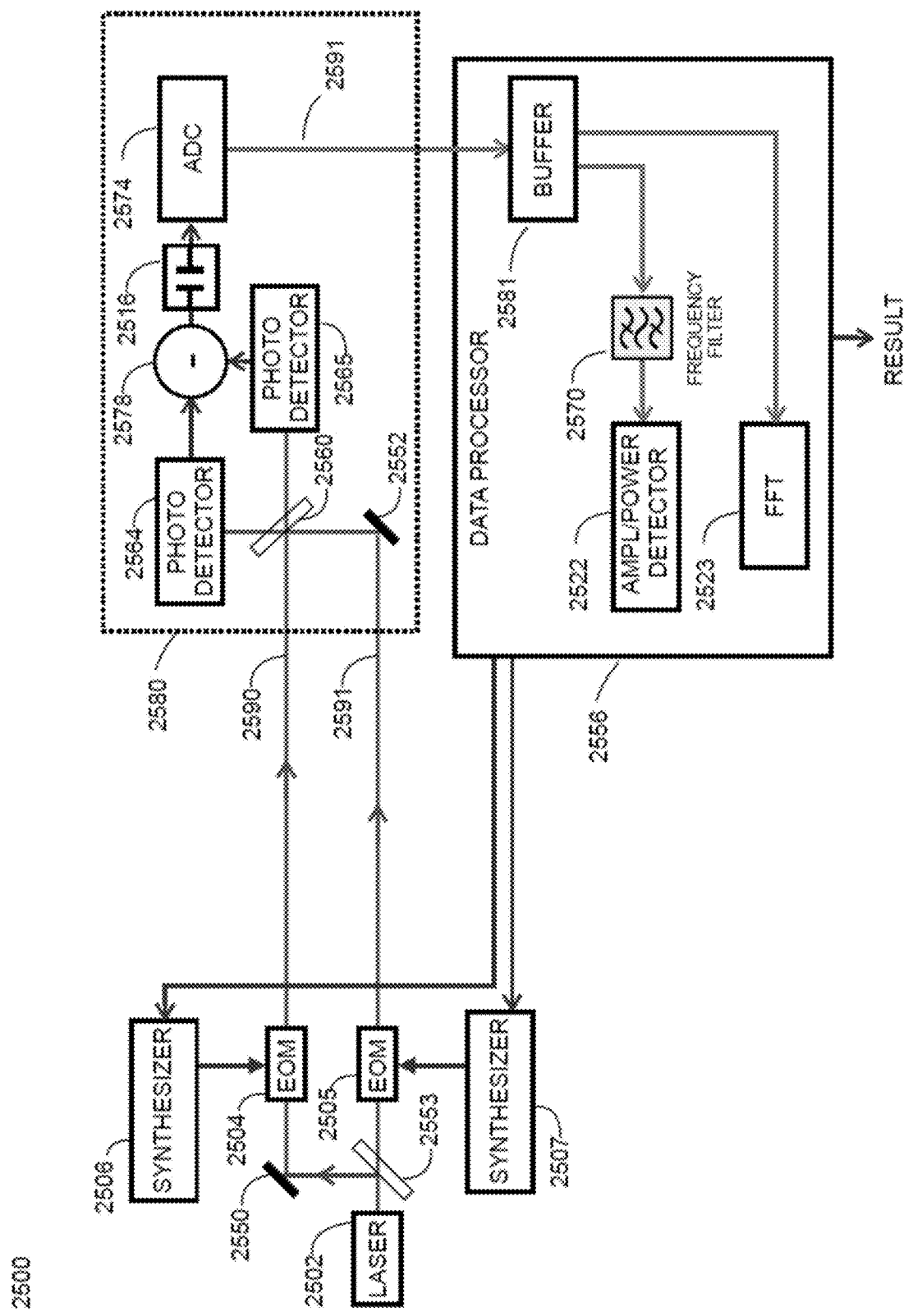
FIG. 25 is a schematic view of an exemplary phase modulation PSI (PM-PSI) apparatus with digital sampling and digital analysis of the combined wave signal according to embodiments of the present disclosure.

Referring now to FIG. 25, an exemplary phase modulation PSI (PM-PSI) apparatus with digital sampling and digital analysis of the combined wave signal is illustrated. In this example, device 2500 measures the difference of the optical path length for light traveling along path 2590 and light traveling along path 2591. Light emerging from the laser 2502 is split by beamsplitter 2553 into two paths. One passes through and is modulated by electro-optic modulator (EOM) 2505, driven by an electronic signal from synthesizer 2507. The other beam reflects from mirror 2550 and passes through and is modulated by electro-optic modulator (EOM) 2504, driven by an electronic signal from synthesizer 2506. The outputs of the two synthesizers 2506, 2507 are controlled by data processor 2556. The two beams travel along path 2590 and path 2591 and are recombined by mirror 2552 and beamsplitter 2560 into two beams that are directed to photodetectors 2564, 2565. The photocurrents generated by the square-law photodetectors are proportional to the instantaneous intensity of the incident fields. A current proportional to the difference of the photocurrents is provided at 2578, and the resulting photocurrent difference is sent through DC block 2516. The AC part of the photocurrent difference is digitized by an analog to digital converter 2574 and sent into a memory buffer 2581 inside the data processor 2556.

The signal is then passed through a digital filter configured as a band pass filter and a digital representation of the amplitude of the resulting signal is computed by block 2522. Alternatively, or in addition, the stored signal can be analyzed using a fast Fourier transform (FFT) computing node 2523 to extract the amplitudes and phases of the harmonics present in the signal and a digital representation of the time dependent PSI signal can be constructed from those values found by the FFT node.

The digital representation of the PSI signal, either from the FFT node or the output of the amplitude detector 2522 is used by data processor 2556 to compute the path-length difference in the interferometer as set forth in greater detail above.

In FIG. 25, the stored signal created by digitizing the output of the interferometer can be pre-processed using a fast Fourier transform (FFT) computing node. The FFT produces an output representing the amplitudes and phases of the frequencies present in the signal. These components will include noise components from shot noise and other electronic noise in the detectors as well as frequency components produced by the combined probe and reference wave signal. Those components of interest, produced by the combined signal, can be identified since they are located at the probe and reference wave phase modulation frequencies. A nonzero velocity of the target will lead to a symmetric splitting of each frequency component into two sidebands located at a distance given by the Doppler frequency from the original component location dictated by the probe or reference modulation frequencies. Once those components of interest are identified, a new noise filtered FFT spectrum of the PSI signal can be constructed by, for example, setting all other component amplitudes to zero. An inverse FFT can be performed on this new spectrum to recover a noise filtered time-domain PSI signal that can then be analyzed to compute the path-length difference in the interferometer as set forth in greater detail above.

Figure 26:
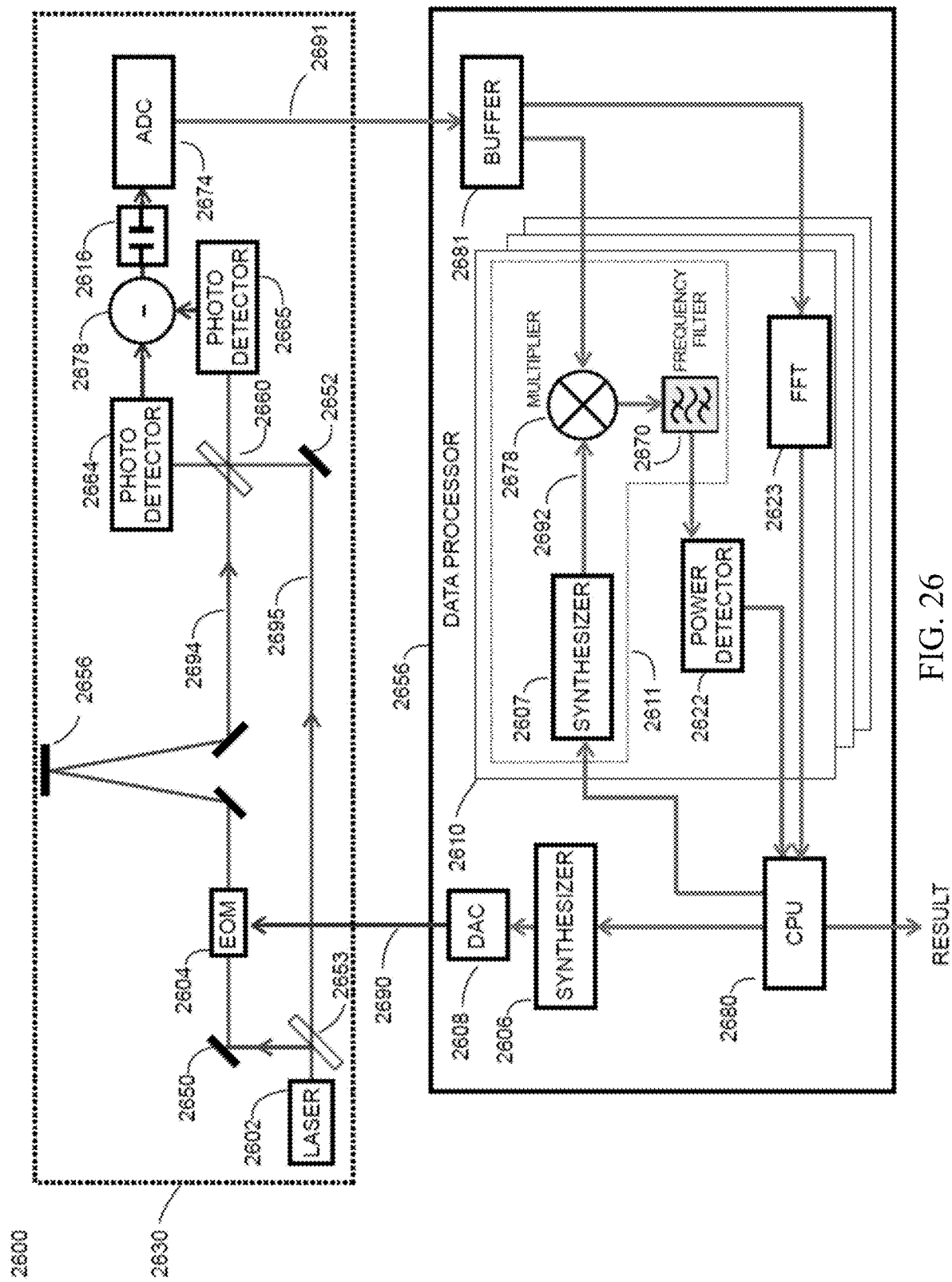
FIG. 26 is a schematic view of an exemplary phase modulation PSI (PM-PSI) apparatus with phase encoding of the probe wave, phase decoding of the probe wave, digital sampling of the decoded probe wave, and wave combination in the digital domain by wave multiplication according to embodiments of the present disclosure.

Referring now to FIG. 26, an exemplary phase modulation PSI (PM-PSI) apparatus with phase encoding of the probe wave, phase decoding of the probe wave, digital sampling of the decoded probe wave, and wave combination in the digital domain by wave multiplication is illustrated. In this example, the probe and reference waves are generated digitally inside the data processor 2656. Device 2600 measures the difference of the time delay for the probe wave traveling along the probe path including 2690, 2694, and 2691 and the reference wave traveling along path 2692.

The probe path 2690 includes an encoding of the probe wave into and a decoding of the probe wave from the phase of an optical wave illustrated in block 2630. The frequency and phase of the probe wave is controlled by the digital synthesizer 2606 and the frequency and phase of the reference wave is controlled by the digital synthesizer 2607. The output of synthesizer 2606 drives a digital to analog converter 2608 and the output is sent to an electro-optic modulator (EOM) 2604. This signal encodes the probe wave by phase modulation onto the optical field traveling along path 2694. The optical field is generated in an optical oscillator (laser) 2602. This field is split by beamsplitter 2653 and travels along two paths 2695 and 2694. Path 2605 is the local oscillator field used for phase demodulation and travels to mirror 2652 and combines with the probe field on beamsplitter 2660. The optical wave reflecting from beamsplitter 2653 travels to mirror 2650 which directs it through an electro-optic modulator (EOM) 2604 driven by the signal from synthesizer 2606. The phase of the optical field is modulated by the EOM imprinting the probe wave onto the phase of the optical field. The optical field then travels to and scatters from the target 2656 and is directed along path 2694 where it is combined with the local oscillator on beamsplitter 2660. The combined fields enter photodetectors (square law detectors) 2665 and 2664 where their intensity is converted into a photocurrent. A current proportional to the difference of the photocurrents is provided by a subtracting element at 2678, and the resulting photocurrent difference is sent through DC block 2616. The AC part of the photocurrent difference is digitized by an analog to digital converter 2674 and sent into a memory buffer 2681 inside the data processor 2656. This digital representation of the demodulated probe signal stored in 2681 is then used to compute the PSI signal using one or more processors 2610 which include a reference signal synthesizer whose frequency and phase is controlled by a central processing unit 2680. The reference signal is combined with the probe signal in a digital multiplier 2678 and the output is sent through a digital filter 2670 configured as a band pass filter. The block 2611, containing the reference synthesizer 2607, digital multiplier 2678, and digital filter 2670, could be replaced with a digital downconverter (DDC), a standard digital signal processing element. A digital representation of the amplitude of the resulting signal generated by block 2611 is computed by block 2622. Alternatively, or in addition, the stored signal can be analyzed using a fast Fourier transform (FFT) computing node 2623 to extract the amplitudes and phases of the harmonics present in the signal and a digital representation of the time dependent PSI signal can be computed by the CPU 2680 using those values found by the FFT node 2623.

The digital representation of the PSI signal, either that computed from the FFT data or the output of the amplitude detector 2622 is used by data processor 2680 to compute the path-length difference in the interferometer as set forth in greater detail above.

In some embodiments, the interferometer is balanced at the quadrature point to maintain equivalency between phase encoding and amplitude modulation. Alternatively, in some embodiments, an optical IQ demodulation scheme is applied in block 2580.

In FIG. 26, the stored signal representing the demodulated probe wave signal created by digitizing the output of the phase-demodulating interferometer can be pre-processed using a Fourier transform (FFT) computing node. The FFT produces an output representing the amplitudes and phases of the frequencies present in the signal. These components will include noise components from shot noise and other electronic noise in the detectors as well as frequency components produced by the demodulation of the probe wave. Those components of interest, produced by the probe wave demodulation, can be identified since they are located at the probe wave modulation frequency or frequencies. A nonzero velocity of the target will lead to a symmetric splitting of each frequency component into two sidebands located at a distance given by the Doppler frequency from the original component locations dictated by the probe wave modulation frequency or frequencies. Once those components of interest are identified, a new "noise filtered" FFT spectrum of the demodulated probe wave signal can be constructed by setting all other component amplitudes to zero. An inverse FFT can be performed on this new spectrum to recover a noise filtered time-domain demodulated probe wave signal that can then be analyzed to compute the path-length difference in the interferometer by combining this probe wave with the reference wave as set forth in greater detail above.

Figure 23:
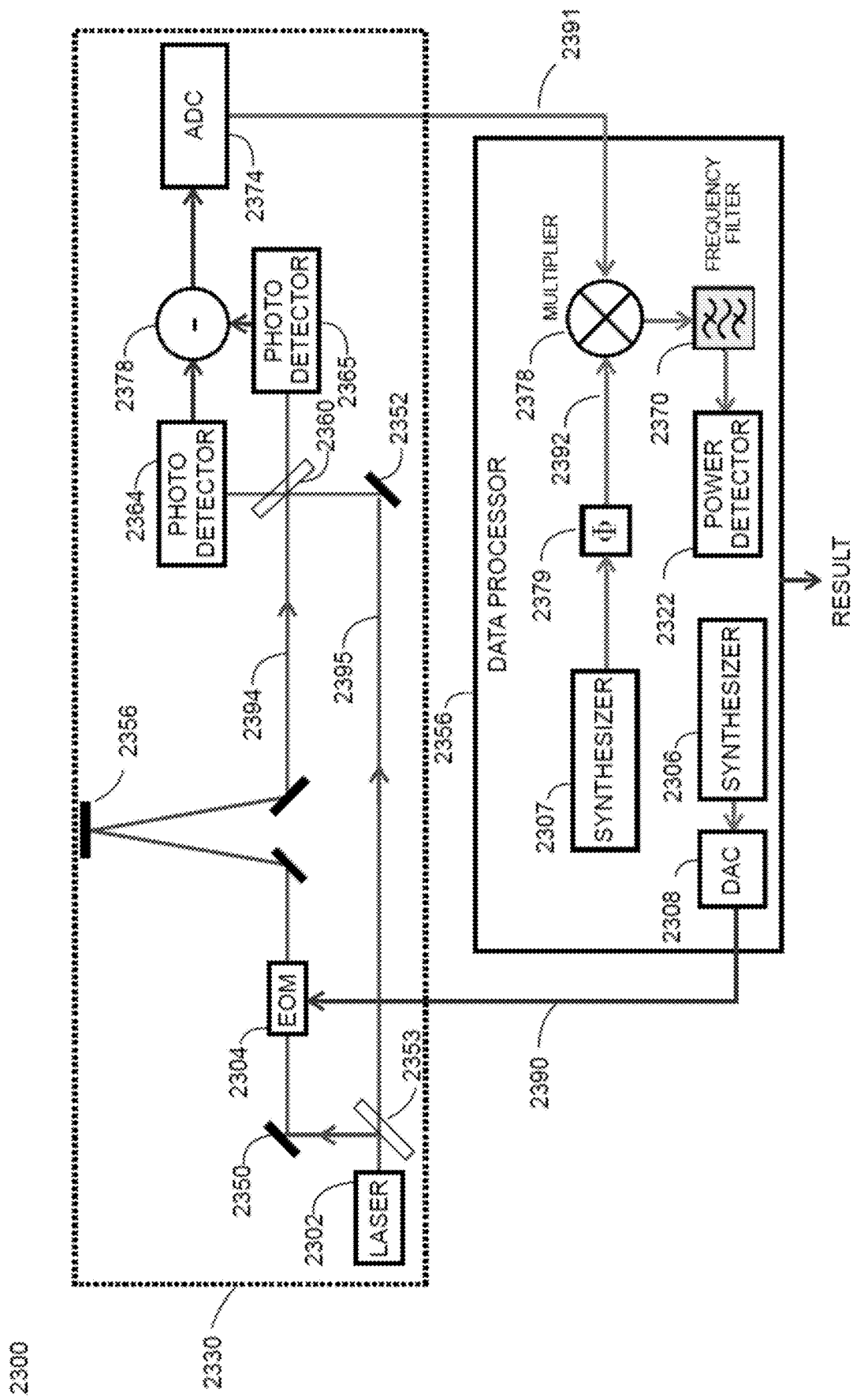
FIG. 23 is a schematic view of an exemplary phase modulation PSI (PM-PSI) apparatus with phase encoding of the probe wave according to embodiments of the present disclosure.

Referring now to FIG. 23, an exemplary phase modulation PSI (PM-PSI) apparatus is illustrated. In this example, probe wave 2390 is phase encoded and phase decoded, as modulation is applied to the phase of the laser beam along path 2394 and the local oscillator for the decoding travels along path 2395. These waves are combined and detected and the time dependent interference is digitized. The data processor is then responsible for further processing. In some embodiments, the further signal processing comprises multiplying a signal 2391 by a phase shifted sinusoidal signal generated by 2307 and integrating (e.g., by frequency filter). In such embodiments, detecting the power is equivalent to a modified Fast Fourier Transform (FFT).

Figure 24:
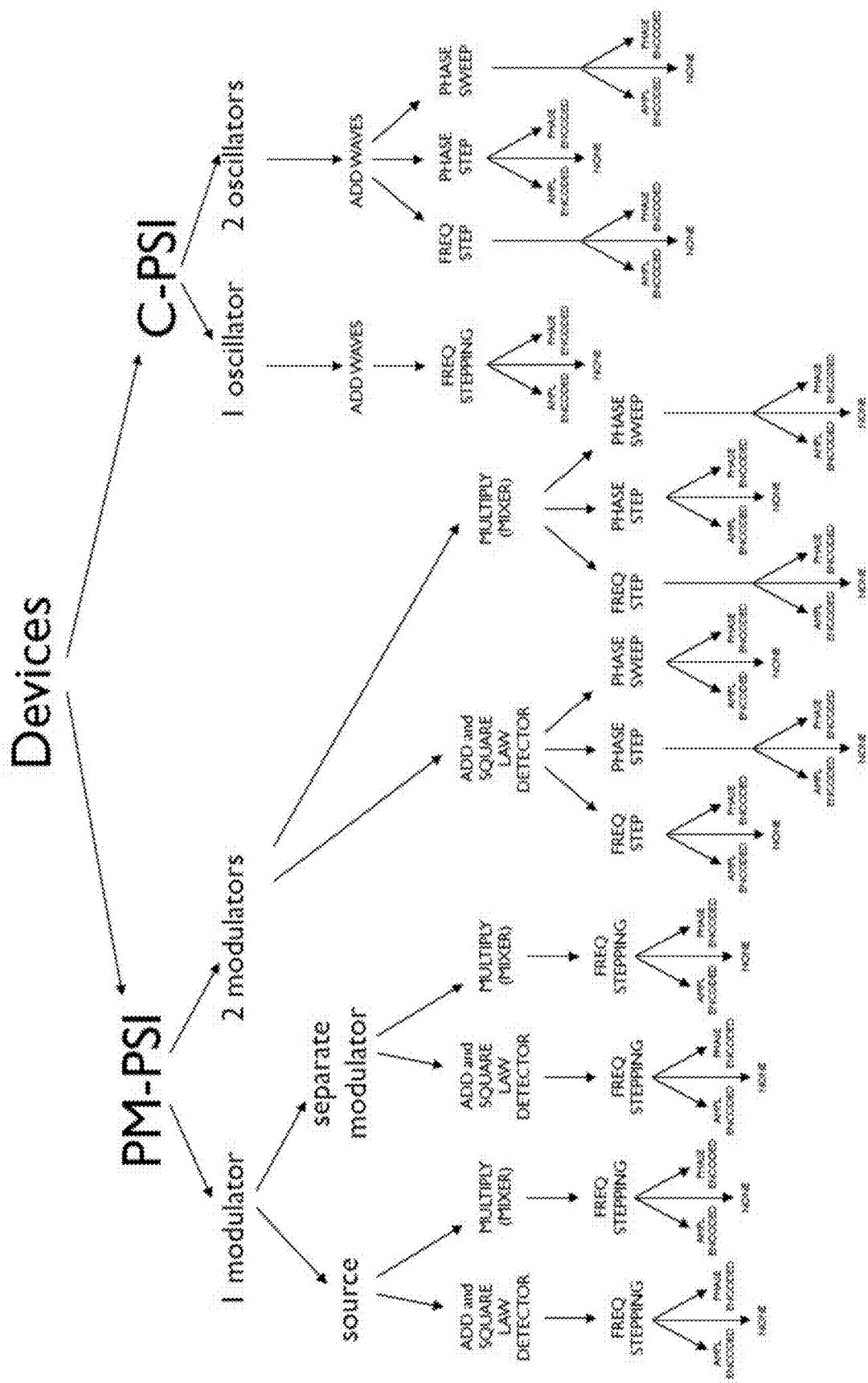
FIG. 24 is a chart of a plurality of exemplary embodiments of power spectrum interferometry according to the present disclosure.

Referring now to FIG. 24, a chart is provided, illustrating a plurality of embodiments of power spectrum interferometry according to the present disclosure. It will be appreciated from the above description that a variety of devices are provided for PSI. These includes phase modulation PSI (PM-PSI) and carrier frequency PSI (C-PSI). PM-PSI may be implemented with one or more than one modulator. In various embodiments, a probe and reference field are added, and then provided to a square law detector. In various RF embodiments, a mixer is used to multiple a probe and reference field. In various embodiments, frequency stepping, phase stepping, or phase sweeping are provided. In various embodiments, amplitude encoding is applied. C-PSI may be implemented with one or more oscillators. In various embodiments, frequency stepping is used. In various embodiments, amplitude encoding is applied.

Various methods are provided above for locating power minima. These methods include frequency stepping, phase stepping, and phase sweeping. All three modes are applicable to the various embodiments of PSI.

One method is to find the modulation parameters at which the power or amplitude of $M_-$ or $C_{int-mod}$ vanishes or reaches a minimum. The term $\sin\theta_-$ reaches zero when $\theta_-=\theta_-^{(zero)}$ $=m\pi$ where m is an integer.

$$m\pi = \theta_-^{(zero)} \quad \text{Equation 73}$$
$$= \Delta\omega_m t_0 - \delta_-$$
$$= \frac{\omega_{ref} - \omega_{prb}}{2} t_0 -$$
$$\frac{\delta_{ref} - \delta_{prb} - \omega_{ref} t_{ref} + \omega_{prb} t_{prb}}{2}$$

$$m = (f_{ref} - f_{prb})t_0 + f_{ref}t_{ref} - f_{prb}t_{prb} - \frac{\delta_{ref} - \delta_{prb}}{2\pi}$$

where $t_0$ is the time at which $\theta_-=\theta_-^{(zero)}$. The various PSI techniques that determine $t_{ref}-t_{prb}$ by varying and finding the modulation parameters at which the power or amplitude of $M_-$ or $C_{int-mod}$ vanishes or reaches a minimum can be categorized into three types: frequency stepping PSI, phase stepping PSI, and phase sweeping PSI.

In frequency stepping PSI, the reference and probe modulation frequencies are chosen equal $f_{ref}=f_{prb}=f_m$ and the phase offsets equal $\delta_{ref}=\delta_{prb}$. In this case $\theta_-$ is constant in time and $\theta_-=\theta_-^{(zero)}$ if $f_m=f_m^{(zero)}$ where $$m = f_m^{(zero)}(t_{ref} - t_{prp}) \quad \text{Equation 74}$$

$$f_m^{(zero)} = \frac{m}{t_{ref} - t_{prp}} = mf_0 \quad \text{Equation 75}$$

Thus, $f_m$ is varied or stepped to find where the amplitude or power reaches a minimum, (and this determines $f_m^{(zero)}$ assuming we know the value of the integer m (that is there is an ambiguity in the measurement because of the unknown value of m). There are several ways of determining m, which are referred to as ambiguity breaking techniques. One way to break the ambiguity is to measure the distance in frequency between two successive zeros. In that case, the two integers are m and m+1 and the frequency difference is equal to $f_0$ and thus provides the difference $t_{ref}-t_{prb}$.

In phase stepping PSI, the reference and probe modulation frequencies are chosen $f_{ref}=f_{prb}=f_m$ and the phase offset of either the reference wave or the probe wave is varied until $\theta_-=\theta_-^{(zero)}$. The minimum occurs when $$m = f_m(t_{ref} - t_{prp}) - \frac{\delta_{ref} - \delta_{prp}}{2\pi} \quad \text{Equation 76}$$

If the values of $\delta_{ref}^{(zero)}$ and $\delta_{prb}^{(zero)}$ at which the minimum occurs are known, then the time difference can be determined $$t_{ref} - t_{prp} = \frac{\delta_{ref}^{(zero)} - \delta_{prp}^{(zero)}}{\omega_m} + \frac{m}{f_m} \quad \text{Equation 77}$$

Here again, the time difference is known assuming the value of m is known. One way of determining m is to measure the phase zero locations at two different modulation frequencies. In particular, let the phase difference at which a minimum occurs be $\Delta\delta^{(zero)}=\delta_{ref}^{(zero)}-\delta_{prb}^{(zero)}$. Then:

$$t_{ref} - t_{prp} = \frac{\Delta\delta^{(zero)}}{\omega_m} + \frac{m}{f_m}$$

$$\omega_m(t_{ref} - t_{prp}) - 2\pi m = \Delta\delta^{(zero)}$$

Equation 78

From this expression, $$\frac{\partial \Delta\delta^{(zero)}}{\partial \omega_m} = t_{ref} - t_{prb}.$$

That is, the zero location change due to an infinitesimal change in the modulation frequency provides the time difference. For practical measurements, infinitesimal changes in the zero location cannot be observed and so a larger change must be performed. This procedure still works so long as the integer value m is changing by a known amount.

In phase sweeping PSI, the reference and probe modulation frequencies are changed to be different $f_{ref} \neq f_{prb}$. In this case, the phase difference of the reference and probe waves is swept out at the frequency difference. The resulting combined wave signal amplitude at the average modulation frequency will reach a minimum at a time $t=t_0$ given by $$m = (f_{ref} - f_{prb})t_0 + f_{ref}t_{ref} - f_{prb}t_{prb} - \frac{\delta_{ref} - \delta_{prb}}{2\pi}$$

Equation 79

By measuring the time $t_0$, the time difference can be found assuming the other quantities are known. The challenge is to know m. There are several ways of doing this, but they all involve changing $f_{prb}$ and observing the change in the minima locations. To simplify the discussion, assume that $t_{ref}$ is known and that $$t_{ref}f_{ref} - \frac{\delta_{ref} - \delta_{prb}}{2\pi} = 0.$$

In this case, we have $$m = (f_{ref} - f_{prb})t_0 - f_{prb}t_{prb}$$

$$t_{prb} = \frac{(f_{ref} - f_{prb})t_0 - m}{f_{prb}}$$

Equation 80

If two measurements of the zero location ($t_0$ and $t_0'$) are made for two different modulation frequencies, $f_{prb}$ and $f_{prb}'$, that are sufficiently close together $((f_{prb}-f_{prb}')t_{prb}<1)$ that the integer value of m is the same, $t_{prb}$ can be found by the variation as follows:

$$(f_{ref} - f_{prb})t_0 - f_{prb}t_{prb} = (f_{ref} - f_{prb}')t_0' - f_{prb}'t_{prb}$$

Equation 81

$$t_{prb} = \left(\frac{f_{ref} - f_{prb}}{f_{prb} - f_{prb}'}\right)(t_0 - t_0') - t_0'$$

$$t_{prb} = \frac{\partial t_0}{\partial f_{prb}}(f_{ref} - f_{prb}) - t_0$$

where the last line represents infinitesimal changes. For practical measurements, infinitesimal changes in the zero location cannot be observed and so a larger change must be performed. This procedure still works so long as the integer value m is changing by a known amount.

Figure 16:
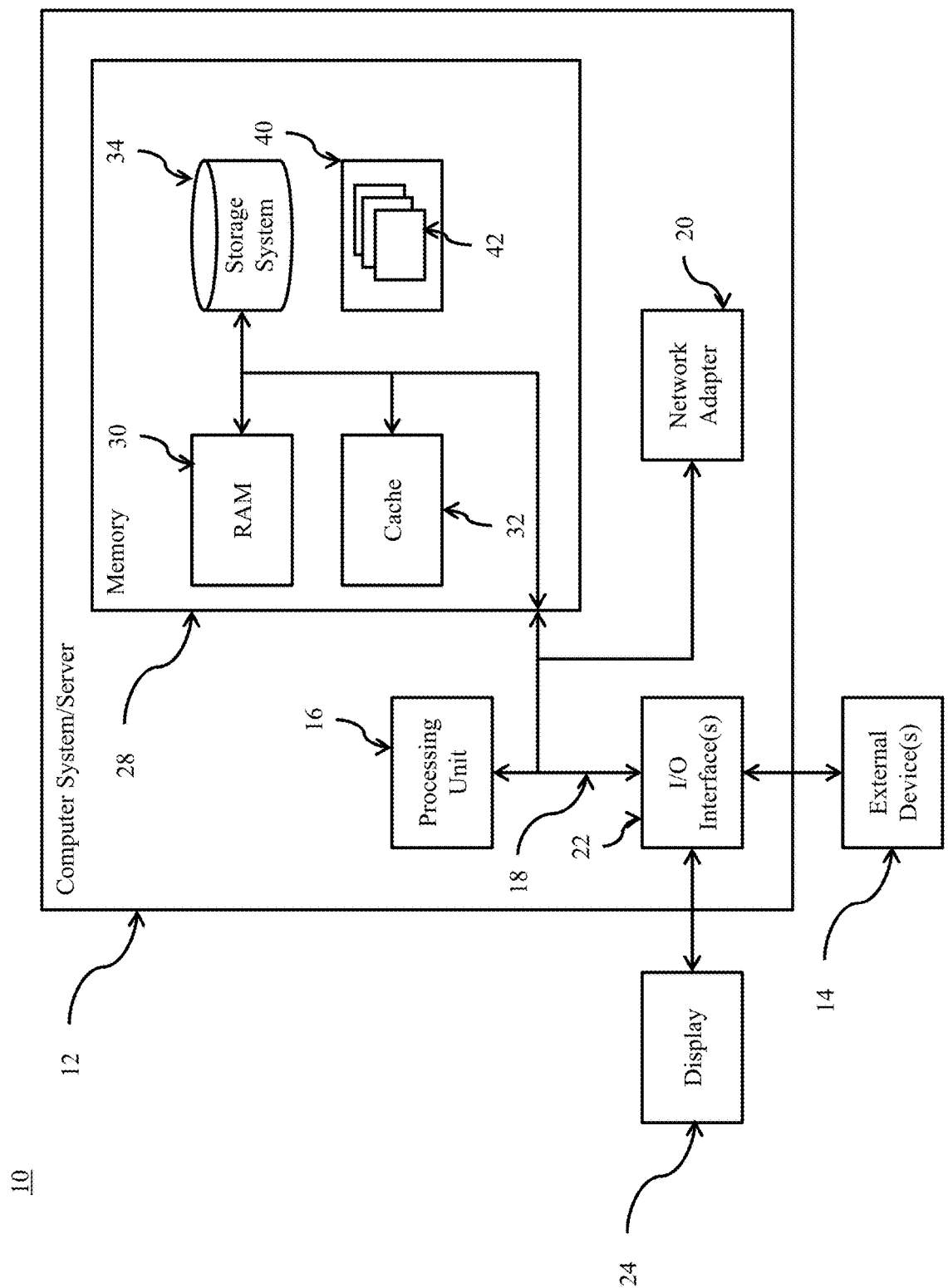
FIG. 16 depicts a computing node according to embodiments of the present disclosure.

Referring now to FIG. 16, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the present disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus for determining a range to one or more targets, the apparatus comprising: a field transceiver module and a computing node in communication with each other, the field transceiver module configured to: generate an electromagnetic probe carrier field; under the control of the computing node, phase-modulate the carrier probe field according to a time-periodic probe modulation waveform having a probe modulation phase that includes a probe modulation frequency and a probe modulation phase offset, thereby generating a modulated probe field; direct the modulated probe field at one or more targets and to receive a modulated reflected probe field from one or more targets; demodulate the modulated reflected probe field and generate a probe signal corresponding to the probe modulation waveform; the computing node configured to: generate a control signal corresponding to the probe modulation waveform; receive the probe signal from the field transceiver module; compute a product of the probe signal and one or more time periodic reference waveform, each having a reference phase that includes a reference frequency and a reference phase offset; compute an amplitude or a power of the product; determine one or more reference waveforms corresponding to extrema of the amplitude or the power of the product; and determine the range to the one or more targets based on the extrema of the amplitude or the power of the product.

2. The apparatus of claim 1, wherein the field transceiver module includes: an electromagnetic carrier field source, configured to generate the source carrier field; and an interferometer, wherein the interferometer comprises: a probe arm having a probe detector; a reference arm having a reference detector; a carrier field phase modulator under the control of the processing unit; the interferometer configured to: receive the source carrier field and divide the source carrier field into a carrier probe field and a carrier reference field, phase-modulate the carrier probe field according to the probe modulation time-periodic waveform and to generate the modulated probe field, direct the modulated probe field to the one or more targets and to receive a modulated reflected probe field from the one or more targets, direct the modulated reflected probe field to the probe detector and the carrier reference field to the reference detector, thereby generating a modulated reflected probe signal and a carrier reference signal; the field transceiver module further comprising a demodulator module, configured to: receive the modulated reflected probe signal and the carrier reference signal, demodulate the modulated reflected probe signal, and generate a modulated carrier signal corresponding to the probe modulation waveform.

3. The apparatus of claim 1, wherein the carrier field phase modulator comprises an electro-optical modulator.

4. The apparatus of claim 1, wherein the probe modulation waveform and the reference waveform are sinusoidal.

5. The apparatus of claim 2, wherein the carrier field source comprises a laser.

6. The apparatus of claim 2, wherein the carrier field source comprises a light-emitting diode.

7. The apparatus of claim 1, wherein the probe modulation frequency is substantially equal to the reference frequency, and the probe modulation phase offset and the reference phase offset constant and substantially equal to each other, the apparatus being further configured to vary the probe modulation frequency and the reference frequency overtime, and wherein the computing node is configured to determine the probe modulation frequency and the reference frequency corresponding to the extrema of the amplitude or the power of the product signal.

8. The apparatus of claim 7, wherein the computing node is further configured to determine two successive extrema of the amplitude or the power of the product signal, and to determine the probe modulation frequencies and the reference frequencies corresponding to said extrema.

9. The apparatus of claim 1, wherein the probe modulation frequency and the reference frequency are substantially constant and substantially equal to each other, the apparatus being further configured to vary overtime the difference between the probe modulation phase offset and the reference phase offset, and wherein the computing node is configured to determine the difference between the probe modulation phase offset and the reference phase offset corresponding to the extrema of the amplitude or the power of the product signal.

10. The apparatus of claim 9, wherein the computing node is further configured to change the probe modulation frequency and the reference frequency, and to determine two extrema of the amplitude or the power of the product signal, and to determine the probe modulation frequency and the reference frequency corresponding to said extrema.

11. The apparatus of claim 1, wherein apparatus is configured to vary overtime the difference between the probe modulation phase and the reference phase, and wherein the computing node is configured to determine the difference between the probe modulation phase and the reference phase corresponding to the extrema of the amplitude or the power of the product signal.

12. The apparatus of claim 11, wherein the computing node is further configured to change the probe modulation frequency or the reference frequency, to determine two extrema of the amplitude or the power of the product signal, and to determine the probe modulation frequency or the reference frequency corresponding to said extrema.

13. The apparatus of claim 1, wherein the computing node is further configured to measure an oscillation frequency of a periodic waveform corresponding to the amplitude or the power of the product signal at its extrema, and to determine a Doppler shift of the reflected modulated probe field based on said oscillation frequency.

14. The apparatus of claim 13, the computing node being further configured to add to the reference phase a DC offset, and to measure a phase change of the periodic waveform corresponding to the amplitude or the power of the product signal at its extrema, and to determine the velocity of the one or more targets based on the oscillation frequency and the phase change of the periodic waveform corresponding to the amplitude or the power of product signal.

15. The apparatus of claim 1, wherein the computing node is further configured to apply a fast Fourier transform to the probe signal, thereby extracting amplitudes and phases of a frequency component of the probe modulation waveform, and wherein the one or more reference waveforms is determined based on said amplitudes and phases.

16. A method for determining a range to one or more targets, the method comprising: generating an electromagnetic carrier probe field; generating a control signal corresponding to a time-periodic probe modulation waveform having a probe modulation phase that includes a probe modulation frequency and a probe modulation phase offset, thereby generating a modulated probe field; phase-modulating the carrier probe field according to the probe modulation waveform; directing the modulated probe field at one or more targets and receiving a modulated reflected probe field from one or more targets; demodulating the modulated reflected probe field and generating a probe signal corresponding to the probe modulation waveform; receiving the probe signal; computing a product of the probe signal and one or more time periodic reference waveform, each having a reference phase that includes a reference frequency and a reference phase offset; computing an amplitude or a power of the product; determining one or more reference waveforms corresponding to extrema of the amplitude or the power of the product; and determining the range to the one or more targets based on the extrema of the amplitude or the power of the product.

* * * * *